US009445341B2

(12) United States Patent
Spinelli et al.

(10) Patent No.: US 9,445,341 B2
(45) Date of Patent: Sep. 13, 2016

(54) APPARATUS, SYSTEMS, AND METHODS FOR PROVIDING INTERWORKING GATEWAY

(71) Applicant: Cisco Technology, Inc., San Jose, CA (US)

(72) Inventors: Vincent Spinelli, Turnersville, NJ (US); John DePietro, Sandwich, MA (US); Vijay Kathuria, North Andover, MA (US); Mohan Rangan, Nashua, NH (US); Rajat Ghai, Sandwich, MA (US); Ashraf M. Dahod, Andover, MA (US); Rajesh Ramankutty, Westford, MA (US); Sanil Kumar Puthiyandyil, Nashua, NH (US); Shaji E. Radhakrishnan, Nashua, NH (US)

(73) Assignee: CISCO TECHNOLOGY, INC., San Jose, CA (US)

(*) Notice: Subject to any disclaimer, the term of this patent is extended or adjusted under 35 U.S.C. 154(b) by 33 days.

(21) Appl. No.: 14/222,328

(22) Filed: Mar. 21, 2014

(65) Prior Publication Data
US 2014/0287760 A1 Sep. 25, 2014

Related U.S. Application Data

(63) Continuation of application No. 13/287,609, filed on Nov. 2, 2011, now Pat. No. 8,699,462, which is a continuation of application No. 12/259,266, filed on Oct. 27, 2008, now Pat. No. 8,064,909.

(Continued)

(51) Int. Cl.
*H04W 4/00* (2009.01)
*H04W 36/36* (2009.01)
(Continued)

(52) U.S. Cl.
CPC ............. *H04W 36/36* (2013.01); *H04W 92/02* (2013.01); *H04W 84/045* (2013.01); *H04W 84/105* (2013.01); *H04W 88/16* (2013.01)

(58) Field of Classification Search
CPC ............. H04W 36/36; H04W 84/045; H04W 84/105; H04W 88/16; H04W 92/02; H04W 88/08
See application file for complete search history.

(56) References Cited

U.S. PATENT DOCUMENTS

| 5,898,713 A | 4/1999 | Melzer et al. |
| 6,643,621 B1 | 11/2003 | Dodrill et al. |

(Continued)

FOREIGN PATENT DOCUMENTS

| EP | 1250022 A1 | 10/2002 |
| EP | 1619917 A1 | 1/2006 |

(Continued)

OTHER PUBLICATIONS

3GPP TR 25.820 v8.0.0 (Mar. 2008), 3rd Generation Partnership Project; Technical Specification Group Radio Access Networks; 3G Home NobeB Study Item Technical Report (Release 8) (37 pages).

(Continued)

*Primary Examiner* — Ajit Patel
(74) *Attorney, Agent, or Firm* — Patent Capital Group

(57) ABSTRACT

Systems and methods are provided that allow inter-working between communication networks for the delivery of service to mobile nodes. A gateway is provided that communicates with a femto cell to extend service to an area that otherwise does not receive coverage from a service provider. The femto cell is a small scale base station used to provide coverage over a small area (such as a home or business), and connect to a home or enterprise network. The femto cell provides service for a mobile node and a gateway permits communication over a broadband network. The gateway integrates the mobile nodes connecting via a femto cell into the service provider's network. The gateway also allows provisioning of services and applications, control of service levels, and provides seamless handoffs to marco base stations and other types of access technologies such as Wi-Fi.

23 Claims, 36 Drawing Sheets

Related U.S. Application Data

(60) Provisional application No. 61/108,266, filed on Oct. 24, 2008, provisional application No. 61/032,370, filed on Feb. 28, 2008, provisional application No. 61/022,053, filed on Jan. 18, 2008, provisional application No. 61/004,046, filed on Nov. 21, 2007, provisional application No. 61/000,429, filed on Oct. 25, 2007.

(51) Int. Cl.
*H04W 92/02* (2009.01)
*H04W 84/04* (2009.01)
*H04W 84/10* (2009.01)
*H04W 88/16* (2009.01)

(56) References Cited

U.S. PATENT DOCUMENTS

| | | | |
|---|---|---|---|
| 6,917,592 | B1 | 7/2005 | Ramankutty et al. |
| 6,993,359 | B1 | 1/2006 | Nelakanti et al. |
| 7,623,530 | B2* | 11/2009 | Hurtta ............... 370/401 |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |
| 8,064,909 | B2 | 11/2011 | Spinelli et al. |
| 8,204,543 | B2* | 6/2012 | Keevill et al. ........... 455/561 |
| 8,699,462 | B2 | 4/2014 | Spinelli et al. |
| 8,837,441 | B2* | 9/2014 | Semper .......... H04W 92/02 370/236 |
| 2003/0028644 | A1 | 2/2003 | Maguire et al. |
| 2004/0224678 | A1 | 11/2004 | Dahod et al. |
| 2005/0091371 | A1 | 4/2005 | Delegue et al. |
| 2005/0239473 | A1 | 10/2005 | Pan et al. |
| 2006/0018328 | A1 | 1/2006 | Mody et al. |
| 2006/0056446 | A1 | 3/2006 | Lee et al. |
| 2007/0004415 | A1* | 1/2007 | Abedi .............. H04W 36/18 455/442 |
| 2007/0097983 | A1 | 5/2007 | Nylander et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0243872 | A1 | 10/2007 | Gallagher et al. |
| 2007/0253328 | A1 | 11/2007 | Harper et al. |
| 2008/0137541 | A1 | 6/2008 | Agarwal et al. |
| 2008/0316980 | A1 | 12/2008 | Ahlen et al. |
| 2009/0011763 | A1* | 1/2009 | Torres ............ H04L 65/1016 455/435.1 |
| 2009/0047931 | A1 | 2/2009 | Nanda et al. |
| 2009/0061821 | A1 | 3/2009 | Chen et al. |
| 2009/0061873 | A1* | 3/2009 | Bao .............. H04W 36/22 455/436 |
| 2009/0067417 | A1 | 3/2009 | Kalavade et al. |
| 2009/0086742 | A1 | 4/2009 | Ghai et al. |
| 2009/0089447 | A1* | 4/2009 | Balachandran ......... G06F 15/16 709/231 |
| 2009/0093246 | A1 | 4/2009 | Czaja et al. |
| 2009/0097448 | A1 | 4/2009 | Vasudevan et al. |
| 2009/0098872 | A1 | 4/2009 | Deshpande et al. |
| 2009/0215438 | A1 | 8/2009 | Mittal et al. |
| 2010/0077102 | A1 | 3/2010 | Lim et al. |
| 2010/0091653 | A1 | 4/2010 | Koodli et al. |
| 2010/0124933 | A1 | 5/2010 | Chowdhury et al. |
| 2010/0195640 | A1 | 8/2010 | Park et al. |
| 2010/0291897 | A1 | 11/2010 | Ghai |
| 2011/0021192 | A1 | 1/2011 | Grayson et al. |
| 2011/0021196 | A1 | 1/2011 | Grayson et al. |
| 2011/0058479 | A1 | 3/2011 | Chowdhury |
| 2011/0075557 | A1 | 3/2011 | Chowdhury et al. |
| 2011/0075675 | A1 | 3/2011 | Koodli et al. |

FOREIGN PATENT DOCUMENTS

| | | |
|---|---|---|
| EP | 1622314 A1 | 2/2006 |
| EP | 1978685 A1 | 10/2008 |
| WO | WO/2009055827 | 4/2009 |
| WO | WO-2009089455 A1 | 7/2009 |

OTHER PUBLICATIONS

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications (19 pages).

3GPP TR 23.829 v. 10.0.1 Technical Specification. "3rd Generation Partnership Project; Technical Specification Group Services and System Aspects; Local IP Access and Selected IP Traffic Offload (LIPA-SIPTO) (Release 10)." Oct. 2011, 43 pages.

3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.

3GPP TS 22.220 v0.3.0 (Jul. 2008), 3rd Generation Partnership Project; Technical Specification Group Services and System Aspects; Service requirements for Home NodeBs and Home eNodeBs; (Release 9), http://www.3gpp.org, 2008. 13 pages.

3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.

3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.

3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.

3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.

3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.

3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.

3GPP TS 23.236 v. 10 Technical Specification. "3rd Generation Partnership Project; Technical Specification Group Services and Systems Aspects; Intra-Domain Connection of Radio Access Network (RAN) Nodes to Multiple Core Network (CN) Nodes (Release 10)." Mar. 2010. 39 pages.

3GPP Ts 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.

3GPP TS 23.251 v7.0.0 (Jun. 2007), 3rd Generation Partnership Project; Technical Specification Group Services and System Aspects; Network Sharing; Architecture and functional description (Release 7), Global System for Mobile Communications, http://www.3gpp.org, 2007. 18 pages.

3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network

(56) References Cited

OTHER PUBLICATIONS protocols; Stage 3 (Release 7), Global System for Mobile Communications, http://www.3gpp.org, 2007. 32 pages.

3GPP TS 25.412 v7.1.0 (Jun. 2006), 3rd Generation Partnership Project; Technical Specification Group Radio Access Network; UTRAN Iu interface signaling transport (Release 7), http://www.3gpp.org, 2006, 11 pages.

3GPP TS 25.410 v7.0.0 (Mar. 2006), 3rd Generation Partnership Project; Technical Specification Group Radio Access Network; UTRAN Iu Interface: general aspects and principles (Release 7), http://www.3gpp.org, 2006, 28 pages.

3GPP TS 25.411 v7.1.0 (Sep. 2007); 3rd Generation Partnership Project; Technical Specification Group Radio Access Network; UTRAN Iu interface layer 1 (Release 7), http://www.3gpp.org, 2007, 9 pages.

3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007, 359 pages.

3GPP TS 25.414 v7.1.0 (Sep. 2006), 3rd Generation Partnership Project; Technical Specification Group Radio Access Network; UTRAN Iu interface transport and transport signaling (Release 7), http://www.3gpp.org, 2006, 20 pages.

3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.

3GPP TS 25.419 v7.0.0 (Mar. 2006), 3rd Generation Partnership Project; Technical Specification Group RAN; UTRAN Iu-BC Interface: Service Area Broadcast Protocol (SABP) (Release 7), http://www.3gpp.org, 2006. 77 pages.

3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.

3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.

3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.

3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.

3GPP TS 29.414 v8.1.0 (May 2008), 3rd Generation Partnership Project; Technical Specification Group Core Network and Terminals; Core network Nb data transport and transport signaling (Release 8), Global System for Mobile Communications, http://www.3gpp.org, 2008, 29 pages.

3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.

3GPP TS 33.234 v8.1.0 (Mar. 2008), 3rd Generation Partnership Project; Technical Specification Group Service and System Aspects; 3G Security; Wireless Local Area Network (WLAN) interworking security (Release 8), http://www.3gpp.org, 2008. 101 pages.

3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.

3GPP TS. 23.203 v. 11.3.0 Technical Specification. "3rd Generation Partnership Project; Technical Specification Group Services and System Aspects; Policy and charging control architecture (Release 11)", Sep. 2011, 167 pages.

3GPP TS. 23.401 v. 10.5.0 Technical Specification. "3rd Generation Partnership Project; Technical Specification Group Services and System Aspects: General Packet Radio Service (GPRS) enhancements for Evolved Universal Terrestrial Radio Access Network (E-UTRAN) access (Release 10)." Sep. 2011, 282 pages.

International Search Report and Written Opinion issued for corresponding International Patent Application No. PCT/US2008/081389, dated Dec. 29, 2008, 7 pages.

European Search Report and Written Opinion Issued by the European Patent Office for European Application No. 08842061.7-1855 mailed Apr. 14, 2014 (6 pgs.).

Starent Networks, Corp. ST Series, Multimedia Core Platforms. 4 pages.

Starent Networks. ST40. Security Gateway. Intelligent Performance. 4 pages.

Starent Networks. XT30 Service Convergence Platform. Intelligent Performance. 2009. 4 pages.

T. Dierks et al. The TLS Protocol: Version 1.0. Network Working Group. Certicom, Jan. 1999. 21 pages.

T. Dierks et al. The Transport Layer Security (TLS) Protocol: Version 1.2. Network Working Group. RTFM, Inc. Aug. 2008. 27 pages.

\* cited by examiner

APPARATUS, SYSTEMS, AND METHODS FOR PROVIDING INTERWORKING GATEWAY

CROSS REFERENCE TO RELATED APPLICATIONS

This application is a continuation of currently pending U.S. patent application Ser. No. 13/287,609, entitled "Interworking Gateway for Mobile Nodes," filed Nov. 2, 2011, which is a continuation of U.S. patent application Ser. No. 12/259,266, entitled "Interlocking Gateway for Mobile Nodes," filed Oct. 27, 2008, now U.S. Pat. No. 8,064,909, which claims benefit under 35 U.S.C. §119(e) of U.S. Provisional Patent Application Nos. 61/000,429, entitled "Interworking Gateway For Mobile Nodes," filed Oct. 25, 2007; 61/004,046, entitled "Interworking Gateway For Mobile Nodes," filed Nov. 21, 2007; 61/022,053, entitled "Interworking Gateway For Mobile Nodes," filed Jan. 18, 2008; 61/032,370, entitled "Interworking Gateway For Mobile Nodes," filed Feb. 28, 2008; and 61/108,266, entitled "Interworking Gateway For Mobile Nodes," filed Oct. 24, 2008, each of which is hereby incorporated by reference herein in its entirety.

FIELD OF THE DISCLOSURE

This disclosure relates to a system and method for providing inter-working between communication networks at a gateway.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

Among other things mobile node users may be faced with a situation where their mobile node does not receive adequate service in their home or business. For example, a company may provide mobile nodes to its employees so that they can receive emails, such as a Blackberry device. However, the coverage provided by the service provider may not be adequate within the building or in certain areas due to cell tower coverage. This is a problem for both the service provider and the user because the service provider would like to be able to provide service to its customer, and the user would like to have the service.

SUMMARY OF THE DISCLOSURE

Systems and methods for providing inter-working between communication networks at a gateway are disclosed. In some embodiments, services and applications are extended over a broadband network to a femto cell to one or more mobile nodes. The gateway can also provide handoffs from a femto cell to a macro base station. In some embodiments, the gateway provides for inter-technology handoffs as well as between macro, femto, and enterprise networks.

In some embodiments, a gateway is provided that includes a femto gateway functionality residing in the gateway that communicates with at least one femto cell and acts as a proxy for each femto cell with which the femto gateway communicates by aggregating communications from the at least one femto cell and communicating as proxy with a core network on behalf of the at least one femto cell, a security gateway functionality residing in the gateway that provides a secure connection and tunnels different protocols over a broadband network between each femto cell and the gateway, and the proxy of the femto gateway functionality communicates with other radio access network equipment to provide for a handoff of a mobile node.

In certain embodiments, a method of providing access to a communications network includes receiving a communication from a first femto cell to establish a connectivity to a gateway, establishing a secure connection from the gateway to the first femto cell, wherein the secure connection provides a secure connection and tunnels different protocols over a broadband network between each femto cell and the gateway, aggregating communications from the first and a second femto cell at the gateway and communicating as proxy with a core network on behalf of the first and second femto cell, and communicating with other radio access network equipment to provide for a handoff of a mobile node.

DETAILED DESCRIPTION

Figure 1:
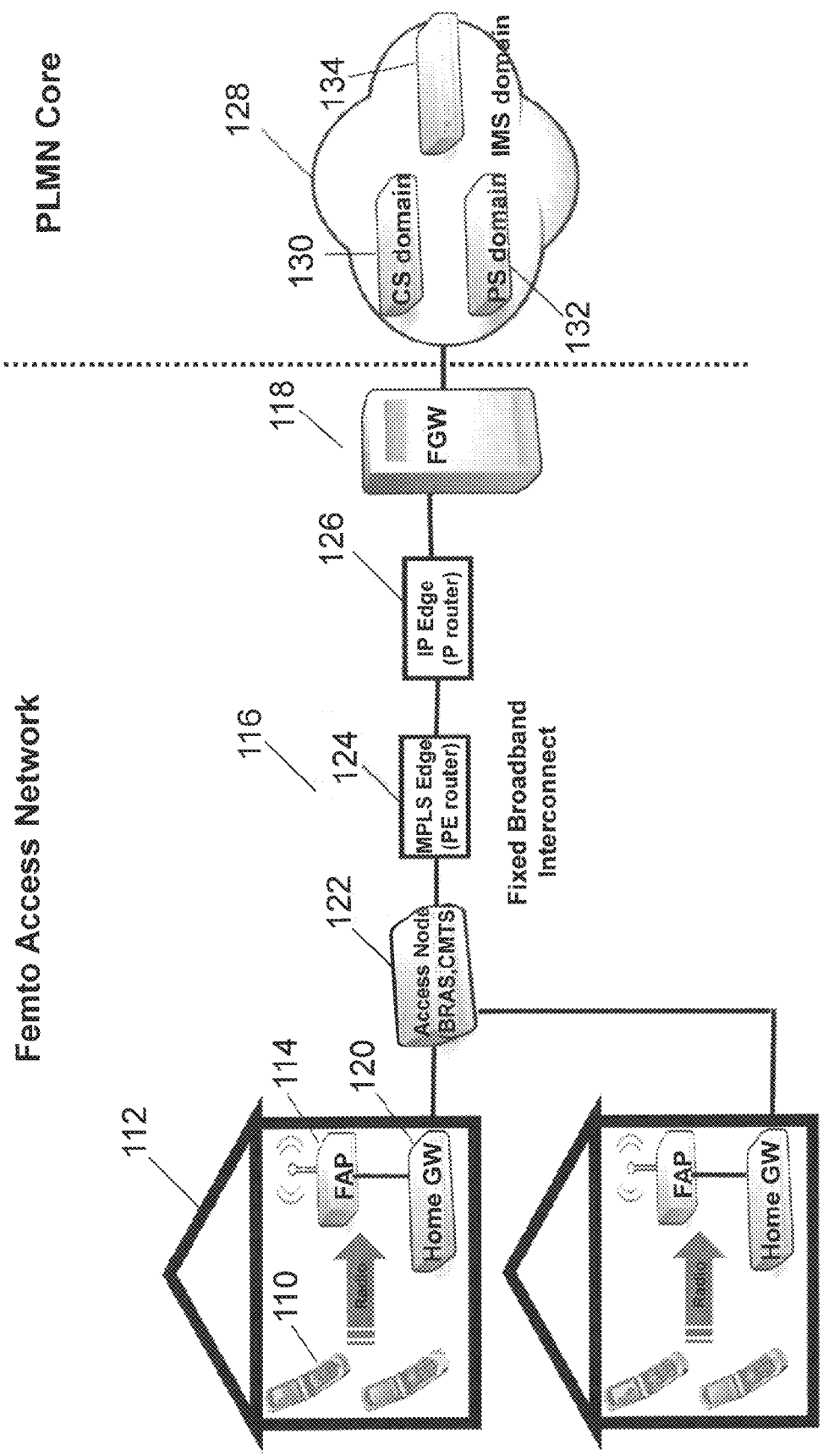
FIGS. 1, 2, 14, 15, 16, 25, 32, 33, and 35 illustrate femto access networks architectures in accordance with certain embodiments.

Systems and methods are provided that allow inter-working between communication networks for the delivery of service to mobile nodes in certain embodiments. In some embodiments, a gateway is provided that allows a femto base station or femto cell that is positioned by a user to extend service to an area that otherwise does not receive coverage from a service provider. For example, a service provider, such as Verizon Wireless, can sell or give a customer a femto cell for placement in the customer's home to extend service to the mobile node in, for example, a 50 meter area. The femto cell then can communicate over a broadband connection to a gateway, which can integrate the call into the service provider's network. The benefits to a customer include reduced cost calls and the attractions of fixed-mobile-convergence (FMC), such as the convenience of using a single device. The benefits to a service provider include the opportunity to increase average revenue per user and increase network capacity while reducing expenses by moving communication flows from expensive outdoor macrocells to cheaper domestic systems, dropping the need for new macrocell equipment and reducing the demand for backhaul and power.

Femto based telephony systems provide for mobile phone service over a very short distance. A femto cell provides an air interface for mobile nodes and transmission of this information over a broadband connection. A femto gateway (FGW) or femto network gateway (FNG), which are implemented in a gateway, communicates with one or more femto cells and provides access to the service provider's network. The femto gateway can allow the femto cell to be a simple device to lower the cost of manufacturing the unit. In some embodiments, the femto gateway acts on behalf of the femto cell to reduce the number of capabilities the femto cell might otherwise need to perform. For example, the femto gateway can create a logical packet control function (PCF) to exchange signal messaging with another PCF in the network to allow for a handoff. The femto gateway can also act like an access network (AN) or base station controller (BSC), for example, to provide information to allow handoffs or other network signaling.

The femto gateway can also provide a connection to the femto cell that allows the femto cell to provide different air interfaces, for example, UMTS, GSM, and CDMA2000, while communications between the femto gateway and the femto cell are in a common protocol. This feature allows the development of femto cells that can switch air interfaces as a subscriber switches from a service provider that supports UMTS to a service provider that supports CDMA2000. A multiple access technology femto cell can also provide service to more than one device. For example, in a family if the father has a business phone that was with one service provider and a personal phone that was with another service provider. The femto cell could inter-operate with more than one carrier, in some embodiments.

The femto gateway supports existing 2nd generation (2G) and 3rd generation (3G) mobile nodes such as GSM, W-CDMA, UMTS, CDMA 2000, and WiMAX as well as emerging mobile node technologies and 2G/3G dual mode mobile nodes. The femto gateway also supports a number of handoffs and handover situations. For example, in the same micro and macro radio access network (RAN) transitions from and to femto cell/macro GSM, femto cell/macro W-CDMA, femto cell/macro CDMA 2000, and femto cell/femto cell. Another example of the mobility provided by a femto gateway is a transition to/from a CDMA femto cell and WiMAX macro or a W-CDMA femto cell and GSM macro. The femto gateway provides service coverage and consistency in voice and packet data, for example, in a transition to/from existing macrocellular services and femto cell RAN. The femto gateway can also provide local routing of data, in some embodiments, to avoid any delays that might be caused by backhaul links.

The femto gateway can provide timing and frequency synchronization in the femto cell RAN and the core network. New femto cell specific services are provided by the femto gateway. These services can include friends and family usage, sharing femto zone with friends and family, providing closed user group in a femtozone, local data/media access within a single femtozone, access to femtozone local data/media from a macro RAN, and providing data/media access between femtozones of single/multiple operators. The femto gateway, in some embodiments, by virtue of its setup can reduce the complexity of the femto cell with which the femto gateway communicates. This allows the femto gateway to provide a femto cell that works with automatic discovery of the femto gateway and automatic or minimal configuration of the femto access point. The femto gateway can also perform statistics gathering, optimizations, and software upgrades.

The femto gateway can also recognize the femto cell as a distinct network entity for the purposes of charging or assigning a different rate structure and works with pre-paid tariffs, post paid tariffs, and provides ITC for charging purposes. Various quality of service (QoS) features are provided by the femto gateway. The femto gateway can provide performance targets and measurements of the service provided as well as signaling and bearer separation and assurance. QoS relating to link layer mechanisms and mapped to IP layer can be provided. Also QoE or quality of experience can be provided over an unmanaged FBI (feedback information) mechanism. Security features such as signaling and bearer encryption are provided by the femto gateway. Access authorization and mutual authentication between the network and the femto cell can be provided. The femto gateway can allow service authorization for users including friends and family access control lists, denial of service prevention, and location management of a femto cell. The location management can be tied to a macro cell, a radio access identifier (RAI), a location access identifier (LAI), or a cell global identification (CGI).

The femto gateway allows session management in a femtozone. This can be provided by policies that dictate, for example, whether to drop calls or allow best effort. The policies can be based on the time-of-day, day-of-week, or other periodic points for access. There can be a local breakout of voice, an internet offload, and differentiation of policy application depending on the type of traffic. In some embodiments the placement of nodes in the operator's public land mobile network (PLMN) can be with aggregation and IP-peering and/or co-location of various nodes. The femto gateway also provides support for enterprise applications. This can include allowing multiple femto cell operators, each with subscribers in a given location and each operator using a separate path through a broadband connection to their services domain. The femto cell can also be deployed in a number of coverage types with the femto gateway. For example, in indoor settings at residences and/or businesses in single and multi-tenant deployments as well as in industrial settings. In outdoor settings, the coverage types can be private or public, for example. Collapsed radio arbitration and connection management selection can be provided for collapsed femto and WiFi cells in some embodiments. In customer premise equipment (CPE), contention policies between femto and WiFi for the broadband link can be provided. In certain embodiments, discrimination and optimization for QoS can be provided in mobile operator peering to broadband backhaul service.

The femto gateway can be configured to meet country specific regulations/standards such as lawful intercept, health (e.g., ERP of femto cells), interference at national borders, emergency service with location verification. In some embodiments, the femto gateway uses existing signaling and functions, and extends them to a femto cell to provide backwards compatibility and broad support for devices, for example. The femto gateway supports a wide range of multimedia and data services and can be agnostic to radio technologies in providing services. For example, code division multiple access (CDMA), CDMA2000, evolution data only (EVDO), global system for mobile communications (GSM), universal mobile telecommunications system (UMTS), long term evolution (LTE), WiMAX, wireless local area network (WLAN), iBurst, HIPERMAN, and WiBro can be supported by the femto gateway. The UMTS supported can include E-UTRAN (evolved UMTS terrestrial radio access network), HSDPA (high-speed downlink packet access), HSUPA (high-speed uplink packet access), Evolved HSPA, and UMTS-TDD (UMTS time division duplexing). The femto gateway can also be agnostic to the core network (CN) and can support 2G network switching subsystem (NSS), UMTS CN, CDMA CN, and common IMS CN for example. The femto gateway also provides interworking between different technologies and core networks. This allows operators to minimize core network changes and can minimize the complexity of femto cells or femto access points deployed.

A femto cell or femto access point is a home BTS, nodeB or an e-nodeB, in some embodiments. Combined with gateway supporting femto functionality, it acts as a BSS/RNC for micro cellular environment. For CDMA2000, the combination acts as a PCF. The gateway also provides a proxy functionality that when acting like a RNC, for example, hides the femto cell from the core network and handles the processing to remove complexity from the core network having to communicate with many femto cells. Where applicable the gateway also provides seamless mobility between macro and femto cellular network. A femto cell connects to the gateway over a Fixed Broadband transport using a security association with the gateway. The security association between the femto cell and gateway is based on IPSec. IKEv2 is used as an IPSec protocol. In some embodiments, all the user plane and management plane traffic between the femto cell and the gateway is encrypted and integrity protected. The gateway creates a security association with the femto cell to provide a secure transport of signaling, bearer and management plane traffic. The gateway also provides a radio access network (RAN) aggregation function by including a signaling concentrator function. The signaling concentrator abstracts all the femto cells as a single radio network controller (RNC) to the public land mobile network core network (PLMN CN). The Femto Gateway may implement a policy and charging enforcement function (PCEF) to provide policy and charging control of subscriber service data flows. The gateway also provides authorized QoS to the flows. The gateway gets the policy and charging control (PCC) rules from a policy and charging rules function (PCRF).

FIG. 1 illustrates a femto access network (FAN) in accordance with some embodiments. As shown, a femto access point (FAP) or femto cell 114 is placed in a home or other structure 112. The femto access point 114 can provide the functionality of a base transceiver station (BTS), a base station controller (BSC), a nodeB, and/or an eNodeB in certain embodiments. The Femto access point 114 can also broadcast to mobile node 110 in a variety of licensed and unlincensed wireless spectrum and employing radio frequency (RF) technologies such as code division multiple access (CDMA), CDMA2000, universal mobile telecommunications system (UMTS), long term evolution (LTE), global system for mobile communications (GSM), iBurst, HIPERMAN, WiMAX, WiBro, and Wi-Fi. In some embodiments, Femto access point supports more than one RF technology for various mobile nodes, for example, CDMA and Wi-Fi. The Femto access point 114 can connect to a broadband network 116 to transmit data received from one or more mobile nodes. Broadband network 116 can be a cable network, a digital subscriber line, satellite based service, and fiber optic based service. Broadband network 116 provides communication between Femto access point 114 and gateway 118. Gateway 118, which is further described below, provides interworking between the communication networks and allow extension of services to mobile node 110. In some embodiments, gateway 118 includes a femto gateway functionality.

Gateway 118 can be deployed in a service provider's network to implement a femto gateway and provide communication to one or more femto cells. The femto cells can be located in a home network or an enterprise network (e.g., a private branch exchange). Gateway 118 establishes secure Internet Protocol (IP) sessions to femto cell or femto access point 114. This secure session can be using IP security (IPsec) ESP/IKEv2 or any other applicable security mechanism. The session provided to mobile node 110 can include voice over IP (VoIP), video applications and services, gaming services, email, web services, location based services, music services, as well as other data and video applications and services.

Gateway 118 can also provide inter-working between a femto cell and a service provider's network. This can include bridging or extending service over another network through protocols not commonly used by the service provider. For example, gateway 118 can receive data through an IPsec session and communicate the data in protocols used in the service provider's network. Gateway 118 utilizes both bearer-based protocols and session-based protocols to route and process sessions received from the femto cell. The bearer-based protocols and session-based protocols can be based on service provider configured service policies. Service policies such as Quality of Service (QoS) can be extended over to the femto cell and can remain intact in a handoff to a service provider base station. In other embodiments, different service policies can be assigned to femto cell for a mobile node, such as higher levels of QoS than with a service provider base station. The femto cell can also control service level agreements (SLA) set by the service provider to govern the session(s) running on gateway 118.

In some embodiments, the gateway 118 provides secure and seamless mobile access to a mobile node that connects to the service provider's network via gateway 118. Gateway 118 uses both session-based protocols and bearer-based protocols to route and process session based data and services. The bearer-based protocols can be used to manage bearer traffic which can include data, video, and voice. The bearer-based protocols include real time protocol (RTP), file transfer protocol (FTP), and hypertext markup language (HTML). Session-based protocols include session initiation protocol (SIP), hypertext protocol (HTTP), and real time streaming protocol (RTSP).

The femto access network includes femto access points (FAP) 114 and a home gateway 120 in two structures 112. The femto access point 114 can be used to communicate with one or more mobile nodes 110 using radio frequencies and with a home gateway using wireline or wireless communications. In some embodiments, the femto access point 114 and the home gateway can be implemented in a single device. The home gateway 120 can be implemented as a cable modem, a digital subscriber line (DSL) modem, a router, a wireless router, a switch, a voice over IP (VoIP) analog telephony adapter (ATA), or a wireless access point. The home gateway 120 provides means of communicating between networks, and can communicate with an access node 122 in a fixed broadband interconnect (broadband network) 116. The access node 122 can be a broadband remote access server (BRAS) or a cable modem termination system (CMTS), for example. The fixed broadband interconnect 116 may also include a multi-protocol label switching (MPLS) provider edge (PE) router 124 and an Internet Protocol (IP) edge router 126. The gateway 118 communicates with the fixed broadband interconnect 116 as well as the private land mobile network (PLMN) core 128 in some embodiments as shown in FIG. 1. The PLMN core 128 can include a circuit switching domain 130, a packet switched domain 132, and an IP multimedia subsystem (IMS) domain 134. The femto gateway in gateway 118 can provide inter-working between femto access network and the PLMN core.

Figure 2:
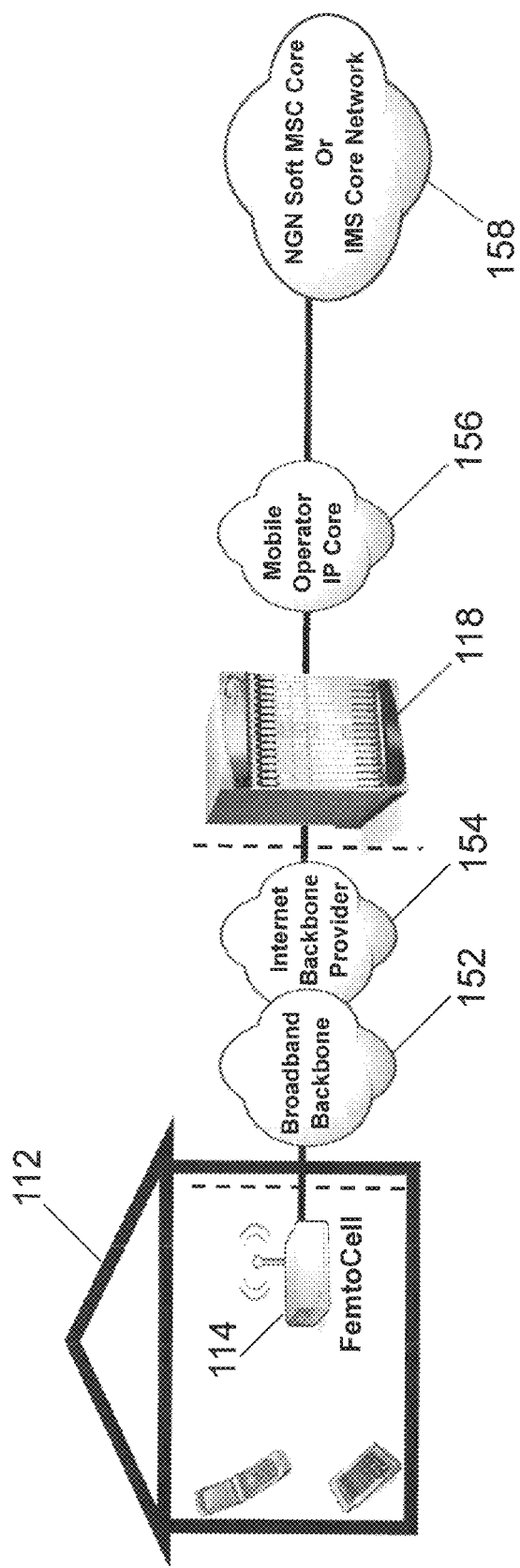

FIG. 2 illustrates a femto based service in accordance with certain embodiments. The network of FIG. 2 includes a femto cell or femto access point 114, a broadband backbone 152, an internet backbone provider 154, a gateway 118, a mobile operator IP core 156, and next generation network (NGN) soft mobile switching center (MSC) core or IMS core network 158. As shown, the broadband network can be provided by a different service provider than the mobile operator. Additionally, the femto cell can be implemented as a device that connects to the broadband backbone 152 and communicates with gateway 118. The broadband backbone 152 can be any type of wide area network (WAN), and can be in communication with the internet backbone 154, in some embodiments. The femto gateway in gateway 118 can provide one or more of the following functionalities: terminate an IP security (IPsec) tunnel from the femto cell 114, convert A1p signaling to session initiation protocol (SIP) and forward the data to a convergence server (not shown), forward CDMA data session packet flows to the packet core, forward A2p/RTP to the voice network (e.g., media gateway), offload Internet data sessions, and provide call localization for femto-to-femto sessions. The call localization feature can involve bridging a voice call session at the gateway 118 to remove the backhaul link when the gateway is handling a call session from a first mobile node in its coverage area to a second mobile node in its coverage area. The call localization feature is further explained in the published application US 2007025337, which is hereby incorporated by reference herein in its entirety. The femto cell 114 provides one or more of the following functions: establishes an IPsec tunnel to the femto gateway, supports one or more simultaneous mobile node sessions to the femto gateway, and provides remote management and configuration by the gateway 118 or another network device.

Figure 3:
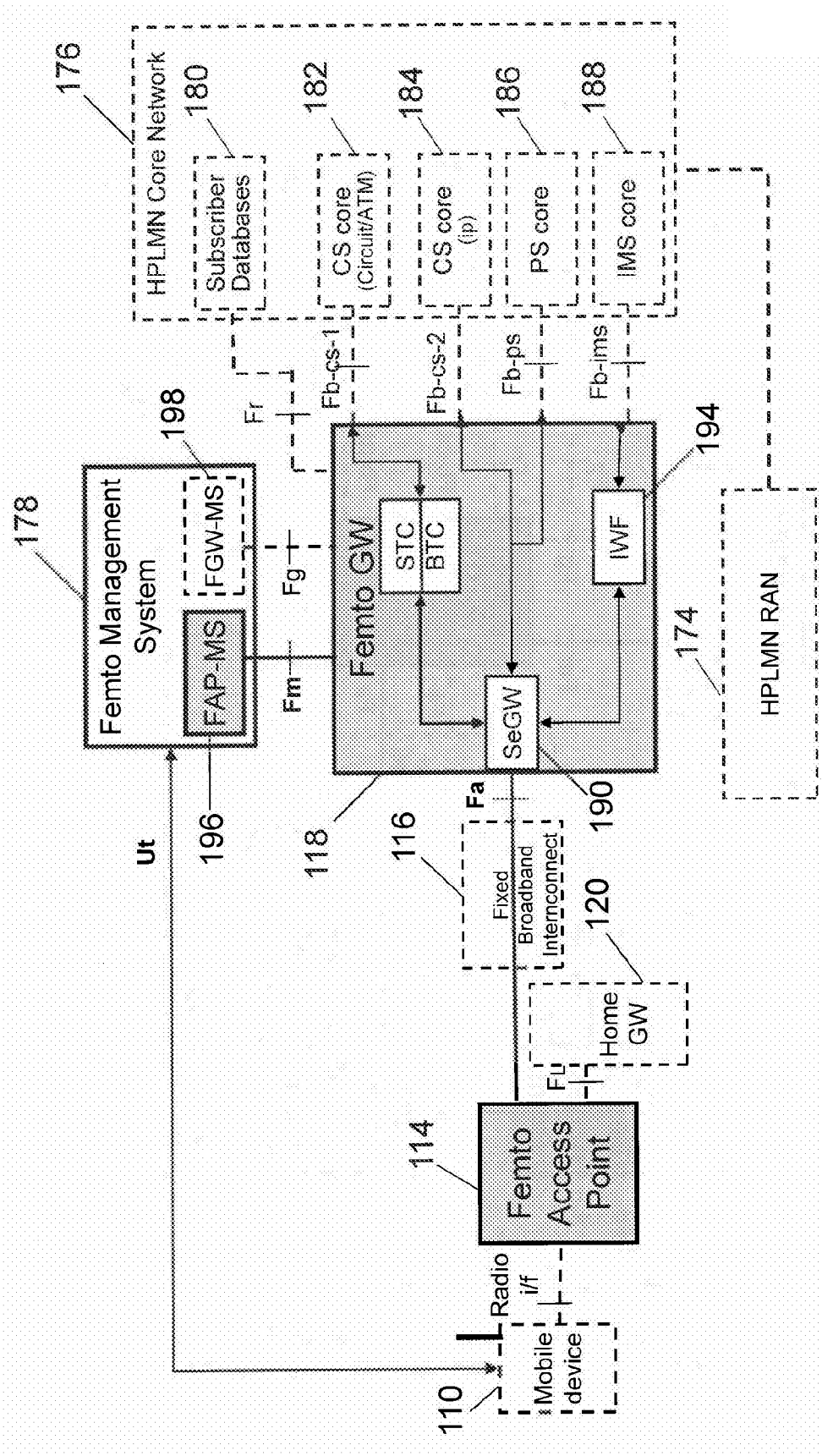
FIGS. 3, 4, 26, 27, and 28 illustrate interfaces and various functions implemented in network devices in a femto access network architecture in accordance with certain embodiments.

FIG. 3 illustrates interfaces in a baseline femto architecture in accordance with certain embodiments. FIG. 3 includes a mobile node 110, a femto access point or femto cell 114, a home gateway 120, a fixed broadband interconnect 116, a femto gateway 118, a home public land mobile network (HPLMN) radio access network (RAN) 174, a HPLMN core network 176, and a femto management system 178. The HPLMN is the network in which the subscriber's profile is stored and mobility functionality can be provided through the HPLMN. The HPLMN core network includes subscriber databases 180, a circuit switched (CS) core (circuit/ATM based) 182, a circuit switched core (ip based) 184, a packet switched (PS) core 186, and an IP multimedia subsystem (IMS) core 188. The femto management system can include a femto access point-management system (FAP-MS) 196 function and a femto gateway-management system (FGW-MS) 198. The femto management system may be implemented in a server computer, a Starent ST16 or ST40 intelligent mobile gateway, or any other applicable device.

The femto gateway includes a security gateway (SeGW) function 190, a signaling transport converter (STC) 192, a bearer transport converter (BTC) 192, and a signaling inter-working function (IWF) 194. The security gateway 190 can communicate between various security protocols and can provide a tunnel endpoint for security protocols and secure communications between the femto access point and the HPLMN. The signaling transport converter 192 can convert from one signaling protocol to a second signaling protocol, e.g., Iu (an interface from the radio network core to the core network) to ip and Iu to ATM (asynchronous transfer mode). The bearer transport converter can convert from one bearer protocol to a second bearer protocol, e.g., from VoIP to voice over time-division multiplexing (VoTDM) or VoIP to voice over asynchronous transfer mode (VoATM). The interworking function 194 provides a signaling interworking function that provides translation and communication between different network entities. For example, between the radio access network application part (RANAP) used in UMTS signaling to IMS-SIP. The RANAP resides in the control plane of the radio network layer of the Iu interance in the UMTS protocol stack, while IMS resides in the control plane of the core network and can communicate in a SIP variant. In some embodiments, the transport converters change how the underlying data is carried through the network without modifying the underlying data, while the interworking function translates the substantive content of the underlying data or message from a first type or format to a second type or format. The femto gateway can provide interworking among a number of signals and protocols and can include a proxy to enable interworking among and between protocols.

FIG. 3 also illustrates various types of signaling that can be used in a variety of embodiments. The reference point mappings include: Fa, Fb-CS-1, Fb-CS-2, Fb-PS, Fb-PS, Fb-IMS, Fr, Fl, Fm, and Ut. Fa can be, for example, 1) IOS A type signaling/internet protocol for use with 1xCDMA and high rate packet data (HRPD); 2) A/IP signaling for use with global system for mobile communications (GSM), and 3) Iu/IP signaling for use with universal mobile telephone system (UMTS). Fb-CS-1 can be, for example, 1) A1, A2 over SS7(TDM) for CDMA, 2) Iu over ATM for UMTS, 3) A over SS7 (TDMt) for GSM. Fb-CS-2 can be, for example, A1p, A2p over IP to a softswitch (MSCe) and media gateway (MGW) in a CDMA2000 implementation, 2) Iu over IP to MSC server and CS-MGW (circuit switched-media gateway) in a UMTS implementation, and 3) A over IP to MSC in a GSM core network implementation. Fb-PS can be, for example, 1) mobile IP (MIP) for HRPD, 2) Iu-PS for UMTS/GPRS, 3) S2a/S2b based on a trust model, 4) Gn for UMTS/GPRS for a collapsed SGSN function, and 5) SIP to a convergence server. Fb-IMS can be, for example, Gm based signaling. Fr can be, for example, A12 signaling for HRPD with an access node authorization, 2) Wm/Wx signaling for UMTS and RADIUS for CDMA implementations. Fl can be, for example, universal plug and play (UPnP) signaling. Fm can be, for example, TR-069 signaling (broadband form specification to define an application layer protocol for remote management of end-user devices). Ut can be, for example, HTTP (hypertext transfer protocol) signaling.

Figure 4:
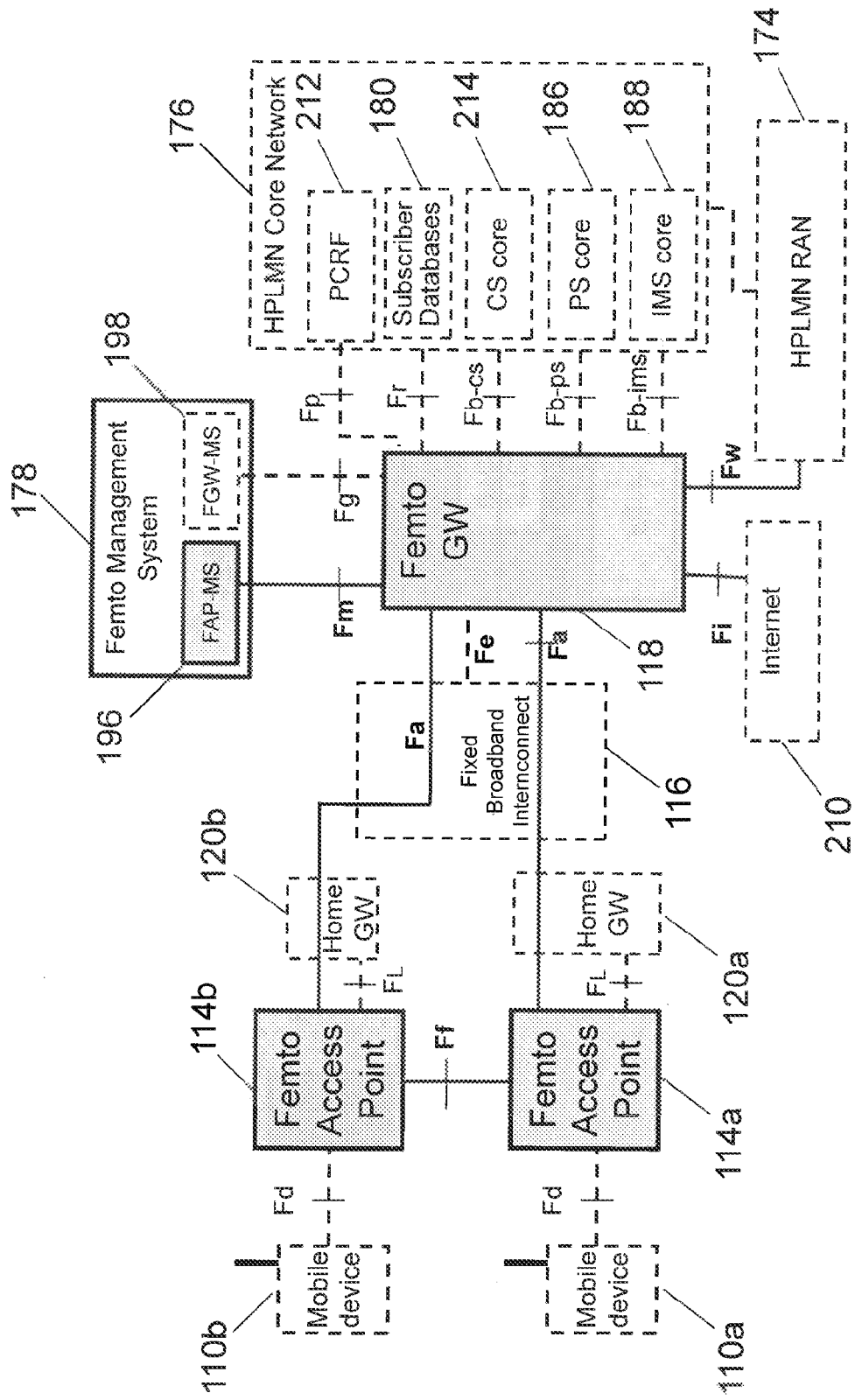

FIG. 4 illustrates a femto architecture with mobility in accordance with certain embodiments. FIG. 4 includes a mobile nodes 110a and 110b, femto access points 114a and 114b, home gateways 120a and 120b, a fixed broadband interconnect 116, a femto gateway 118, a femto management system 178, the internet 210, a HPLMN RAN 174, and a HPLMN core network 176. The HPLMN core network 176 includes a policy control resource function (PCRF) 212, subscriber databases 180, a circuit switched (CS) core 214 (e.g., IP, ATM, and/or circuit based), a PS core 186, and an IMS core 188. FIG. 4 shows the signaling that can be used when mobile nodes 110 roam in various embodiments. The reference point mappings include: Fa, Fd, Ff, Fw, Fi, Fp, and Fe. Fd can be, for example, CDMA2000, WCDMA, WiMAX, LTE, UMTS, EVDO, WiFi (radio layers), CS over WiFi (signaling), and Uu (a radio interface). Ff can be, for example, signaling for intra femto access node mobility such as Iur or A3/A7 relayed via the femto gateway. Fw can be, for example, inter femto access node/macro cellular network mobility and use signaling such as Iur or A3/A7. Fi can be signaling for a packet data interface to the internet such as Gi. Fp can be a policy interface such as Gx or Ty depending on the deployment. Fe can be a policy or QoS control interface to the access network such as Rq. The user control plane for the Fa reference point for circuit switched (CS) services maps to A1p for CDMA2000, for UMTS it maps to Iu-CS, and for LTE it maps to S1-U & S1-MME. The user data plane for CS services for CDMA2000 maps to A2p. The user control plane for packet services for CDMA2000 maps to A11 while data plane for CDMA2000 maps to A10. For UMTS PS services the Fa interface maps to Iu-PS.

Figure 5:
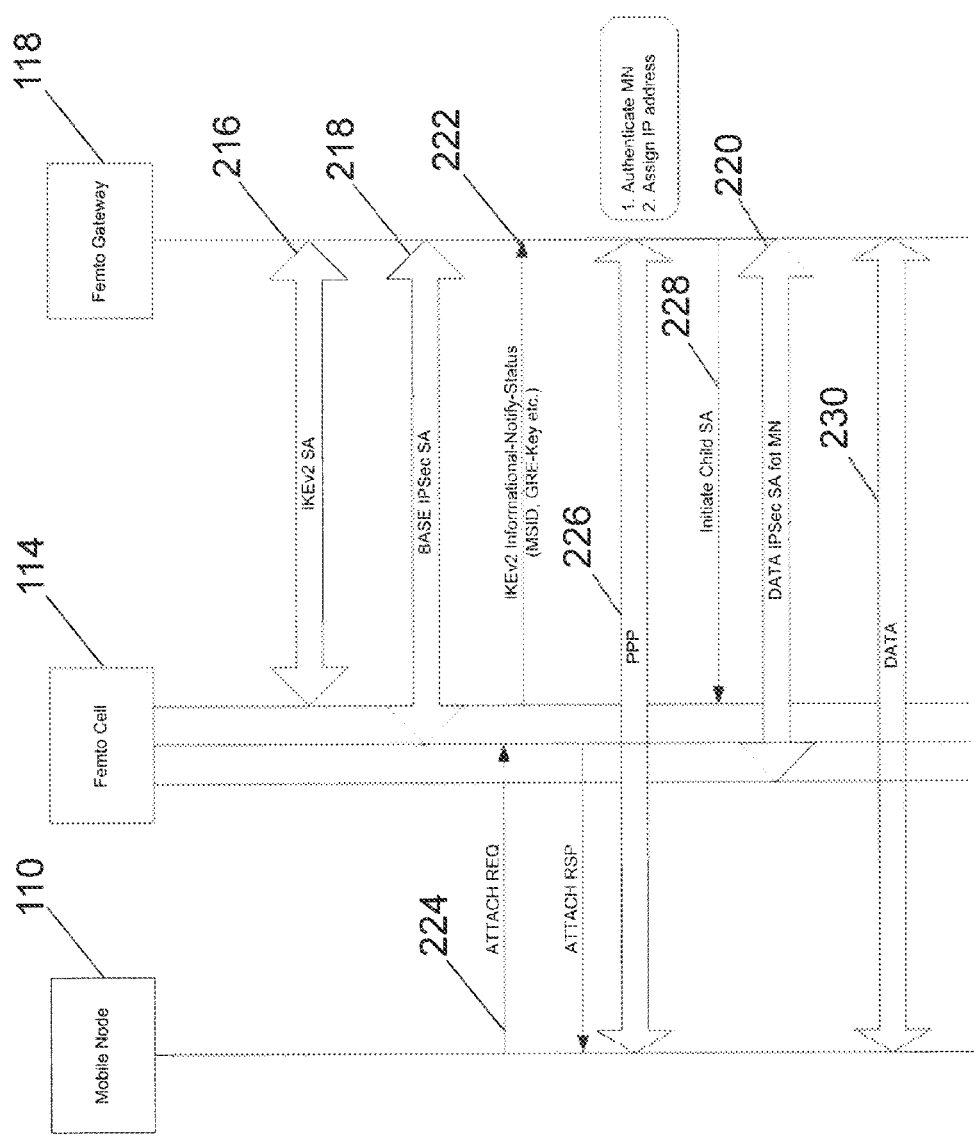
FIG. 5 illustrates a call flow diagram where a common protocol provides protocol independent communication in accordance with certain embodiments.

FIG. 5 illustrates a call flow diagram where a common protocol provides protocol independent communication in accordance with certain embodiments. FIG. 5 includes a mobile node 110, a femto cell 114, and a femto network gateway 118. Femto cell 114, in some embodiments, uses tunnels such as internet key exchange (IKE) and internet protocol security (IPSec) to send and receive information with femto network gateway 118, which can provide for protocol independent communication. An IKEv2 security association (SA) 216 can be used to authenticate femto cell 114 and allow the setup of one or more IPSec security associations (such as Base IPSec 218 and Data IPSec 220). Depending on the embodiment, a single IPSec SA can be used, or multiple IPSec SAs can be used. Using multiple IPSec SA allows for differentiated quality of service (QoS) for each mobile node. As shown, IKEv2 Informational-Notify-Status messaging 222 can be used to exchange information to setup a session for mobile node 110. When an attach request 224 is received from a mobile node, femto cell 114 can send an IKEv2 222 message to femto network gateway 118. A point to point protocol (PPP) session 226 is setup between mobile node 110 and femto gateway 118, which can involve authentication of the mobile node and assignment of an IP address. The femto network gateway 118 can initiate a child security association 228 to provide an additional secure tunnel. Data 230, which can include voice and other information, then flows from the mobile node 110 to the femto network gateway 118 for routing and/or processing.

Figure 6:
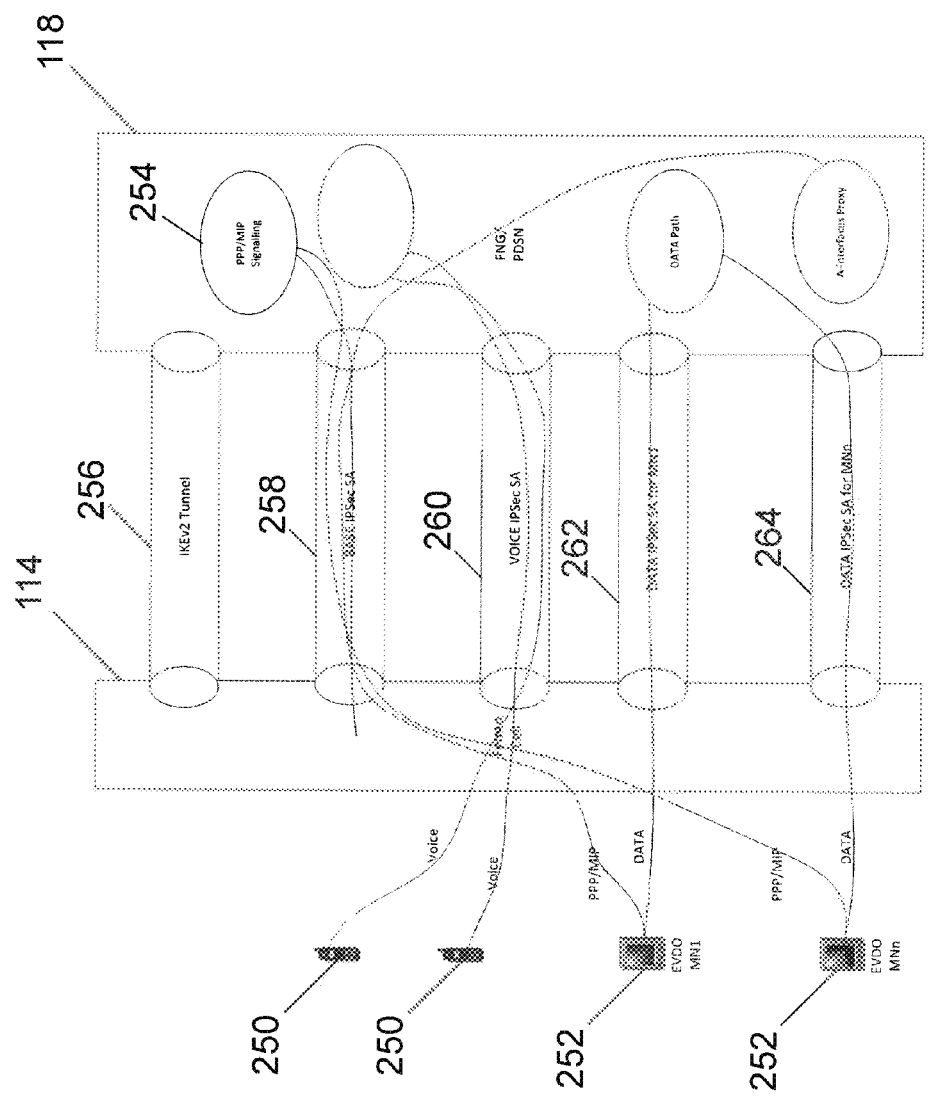
FIGS. 6, 7, and 13 illustrate a common protocol tunneling setup in accordance with certain embodiments.

FIG. 6 illustrates how packet flows can be handled where multiple tunnels and a common protocol is used with the femto network gateway. As shown, mobile nodes based on different air interface technologies may be used, and mobile nodes with different capabilities can be used. Voice capable mobile nodes 250 send voice data over an air interface to femto cell 114. This voice data can be sent in TDM (time division multiplex) using a CDMA (code division multiple access) air interface technology. Mobile nodes 252 send both PPP/mobile IP (MIP) signaling and data packets to femto cell 114 over an evolution data only air interface. Although not shown, other air interface technologies such as UMTS, LTE, WiMAX, WiFi, and GSM can be used along with the attendant signaling protocols of each air interface technologies. The use of a common protocol, which can handle different air interface technologies and protocols for mobile communications, provides flexibility for the femto cell, while still maintaining secure communications.

More than one tunnel can be setup between femto cell 114 and femto network gateway 118. For example, an IKEv2 tunnel 256 can be setup to allow for key exchange and exchange of information, such as setup or registration information. A base IPSec SA 258 can be used to communicate PPP/MIP signaling from mobile nodes 252 to PPP/MIP signaling module 254. Femto cell 114 can also communicate commands and other information regarding handoffs and other events through base IPSec tunnel 258. Voice data, which may be packetized voice, but not voice over IP (VoIP) from mobile nodes 250 can be communicated over a voice IPSec tunnel 260. The voice data can be converted to VoIP on femto network gateway 118 or sent to another server for conversion. The voice data can also be processed for sending using protocols other than VoIP. Packet data can also be communicated over one or more data IPSec tunnels such as 262 and 264.

Figure 7:
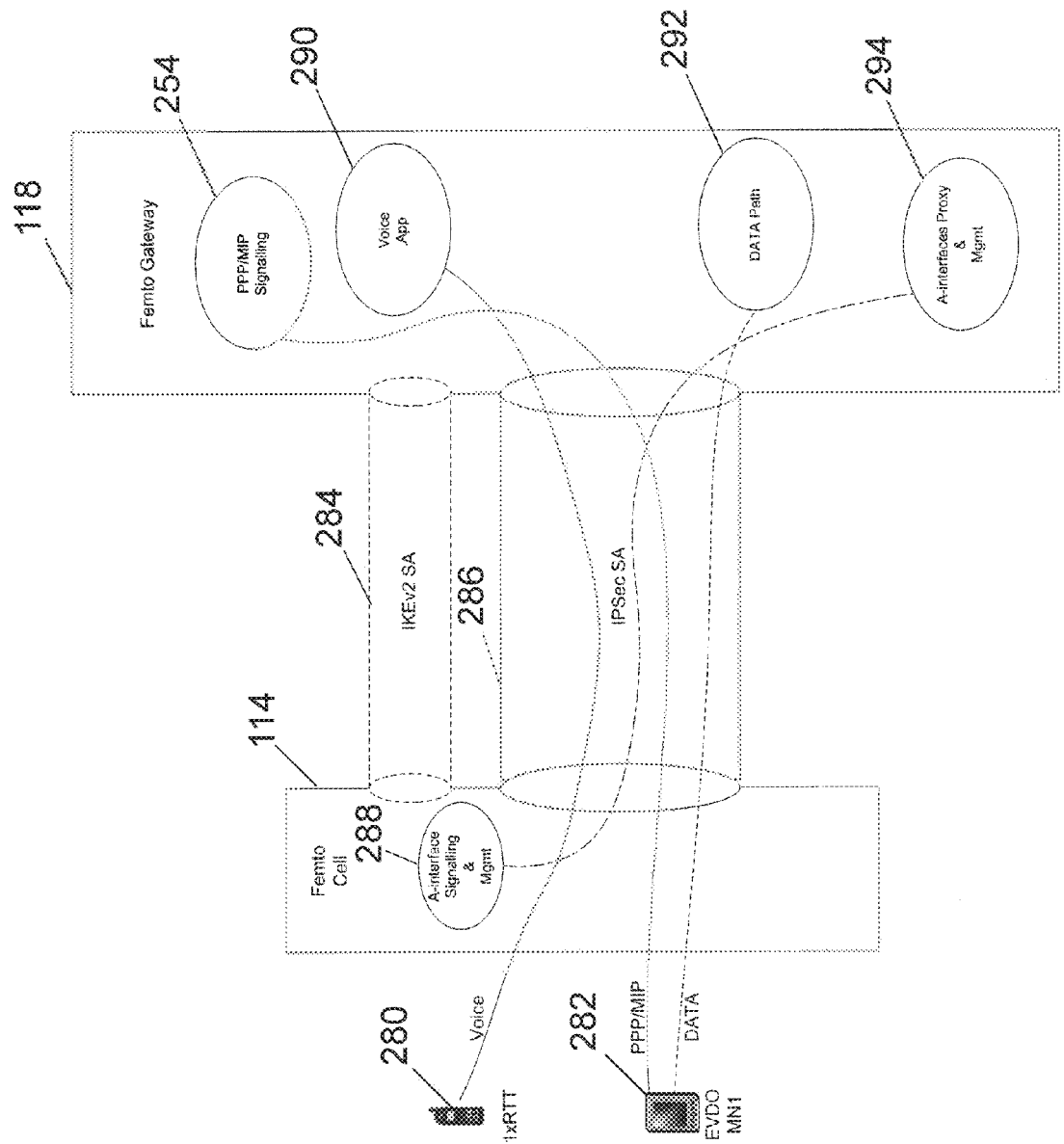

In some embodiments, one IPSec SA can be used to communicate a variety of information. Generic routing encapsulation (GRE) can be used to create multiple tunnels within the IPSec SA so that more than one type of data from more than one mobile node can be communicated using the IPSec SA. In some embodiments, a GRE key can be used to different among the packet flows and to direct the packets to the mobile node at the femto cell or the function at the femto gateway. FIG. 7 illustrates a 1xRTT mobile node 280 (where 1xRTT is a CDMA wireless technology) and an EVDO mobile node 282 in communication with a femto cell 114 and a femto network gateway 118 in accordance with certain embodiments. An IKEv2 SA 284 can be used to exchange information such as security keys and can be used to setup an IPSec SA 286. As shown, multiple packet flows are communicated within IPSec SA 286. Femto network gateway 118 can use hardware and software to direct these packet flows. For example, a hash can be setup in a network processor in femto network gateway 118 so that when a packet including certain criteria or information passes through the hash it is directed to a particular piece of software or application. Other packets can be directed using a software module called a demux manager. The demux manager can be used to determine how to pass along the packet(s). Other software and hardware functions can be implemented in femto network gateway, in certain embodiments.

Gateway 118, which can include femto gateway functionality, can further implement a PPP/MIP signaling functionality 254, a voice application functionality 290, a data path 292, and an A-interface proxy and management 294. The PPP/MIP signaling functionality 254 manages a point to point protocol link between mobile node 282 and gateway 118 and the forwarding MIP signaling to the home agent. The PPP/MIP signaling functionality can also setup and teardown sessions with mobile node 282 and perform any processing necessary on the data. The voice application 290 can handle voice calls, for example, voice sent from the mobile in TDM including the setup of call and the teardown of the call. The data path 292 can handle data sessions such as email content, VoIP, web surfing, or any other content delivery. The data path can forward the data on towards its destination and manage the providing of services or processing of the data. The services can include services provided inline on the gateway. Additional information regarding providing inline services on a gateway is provided in published application Ser. No. 11/942,446, which is hereby incorporated by reference herein in its entirety. If call localization is implemented on gateway 118, then the various functionalities communicate with a database on the gateway. This database includes information about the sessions and if the gateway detects that at least the call sessions of two mobile nodes are passing through the gateway, it will perform any necessary processing on the call session and bridge the sessions removing the backhaul link.

The A-interfaces proxy and management 294 is a function that communicates with a management function 288 on femto cell 114. The proxy functionality allows the femto gateway to hide one or more femto cells from the core network. The gateway 118 communicates with the core network as if it was a single radio access network (RAN) and can forward all the signaling and data flows onto the core network in a single protocol or a set of protocols used with a single radio access network. This reduces the complexity of having the core network recognize a number of femto cells at the edge of the network and further reduces the complexity necessary to implement the femto cell. The femto cell can be managed by management function 288, which is in communication with proxy and management function 294 on gateway 118.

Figure 8:
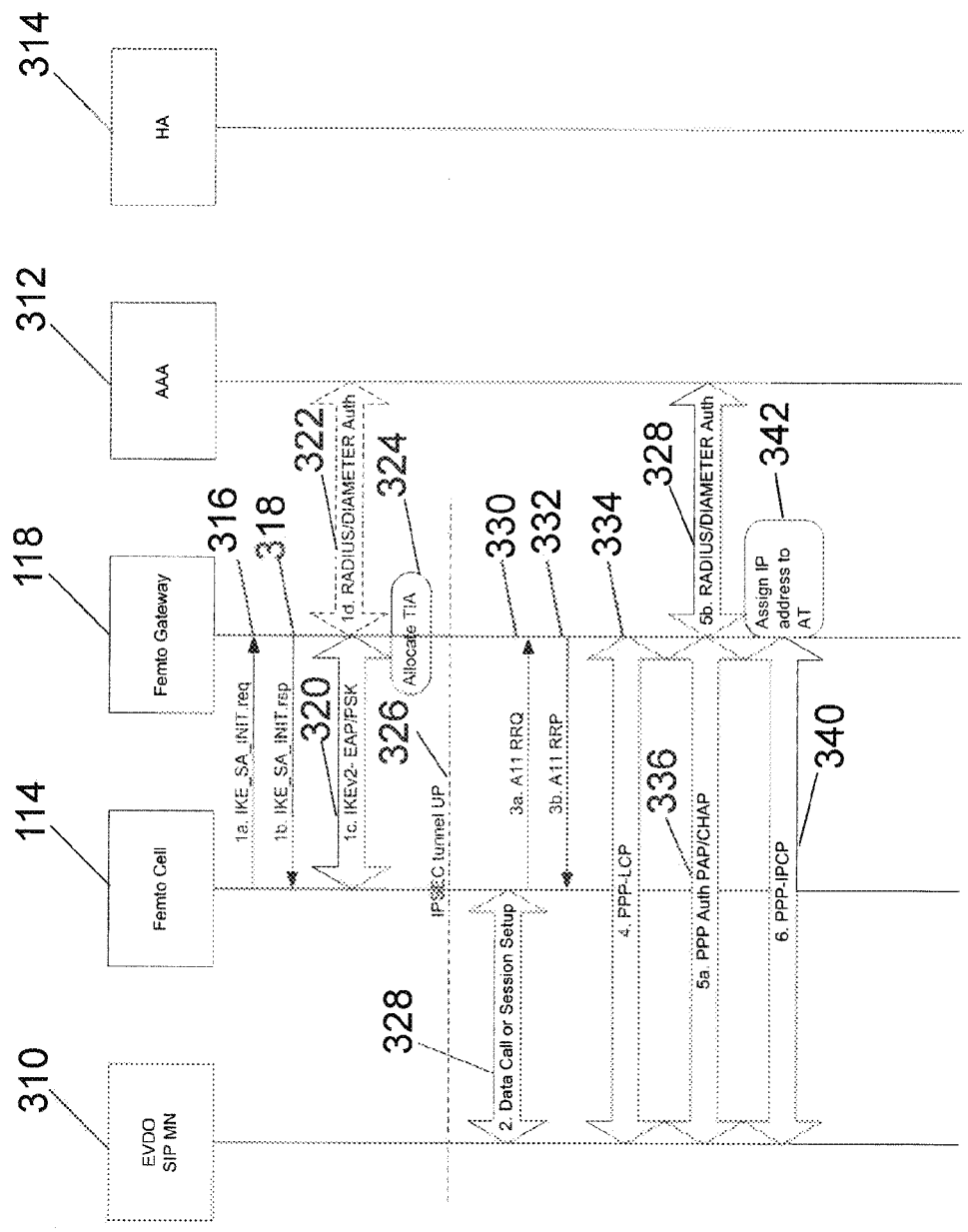
FIG. 8 illustrates a signaling diagram for a simple IP session setup in accordance with certain embodiments.

FIG. 8 is a diagram illustrating simple IP signaling for a mobile node that desires to setup a session in accordance with certain embodiments. FIG. 8 includes a mobile node 310, a femto cell 114, a gateway providing a femto gateway 118, an authentication, authorization, and accounting (AAA) server 312, and a home agent (HA) 314. First, the femto cell 114 can perform a DNS lookup to get an IP address of femto gateway 118. An IKE initialization request 316 is sent from femto cell 114 to femto gateway 118 to setup an IKE security association. The IKE initialization request 316 includes information used by femto gateway 118 to setup the association. An IKE initialization response 318 is sent from femto gateway 118 to femto cell 114 to provide information and allow for a IKE SA 320 to be setup. An optional step 322 is to authenticate femto cell 114 with AAA 312. At 324, femto gateway 118 allocates a tunnel internal address (TIA) and an IPSec tunnel is setup 326. A data call or session setup 328 is initiated between mobile node 310 and femto cell 114. Femto cell 114 sends an A11 registration request 330 and receives a registration reply 332 to setup a PPP-link control protocol (LCP) 334. At this time, in certain embodiments, femto cell 114 is acting like a PCF and FNG 118 is acting like PDSN for the A11 interface messaging. PPP authentication 336 signaling includes password authentication protocol (PAP) and challenge-handshake authentication protocol (CHAP). Radius/Diameter authentication 338 can occur between FNG 118 and AAA 312 to authenticate mobile node 310. PPP-internet protocol control protocol (IPCP) 340 can be used to configure, enable and disable internet protocol (IP) elements on the ends of a PPP link. In 342, an IP address is assigned to the mobile node 310.

Figure 9:
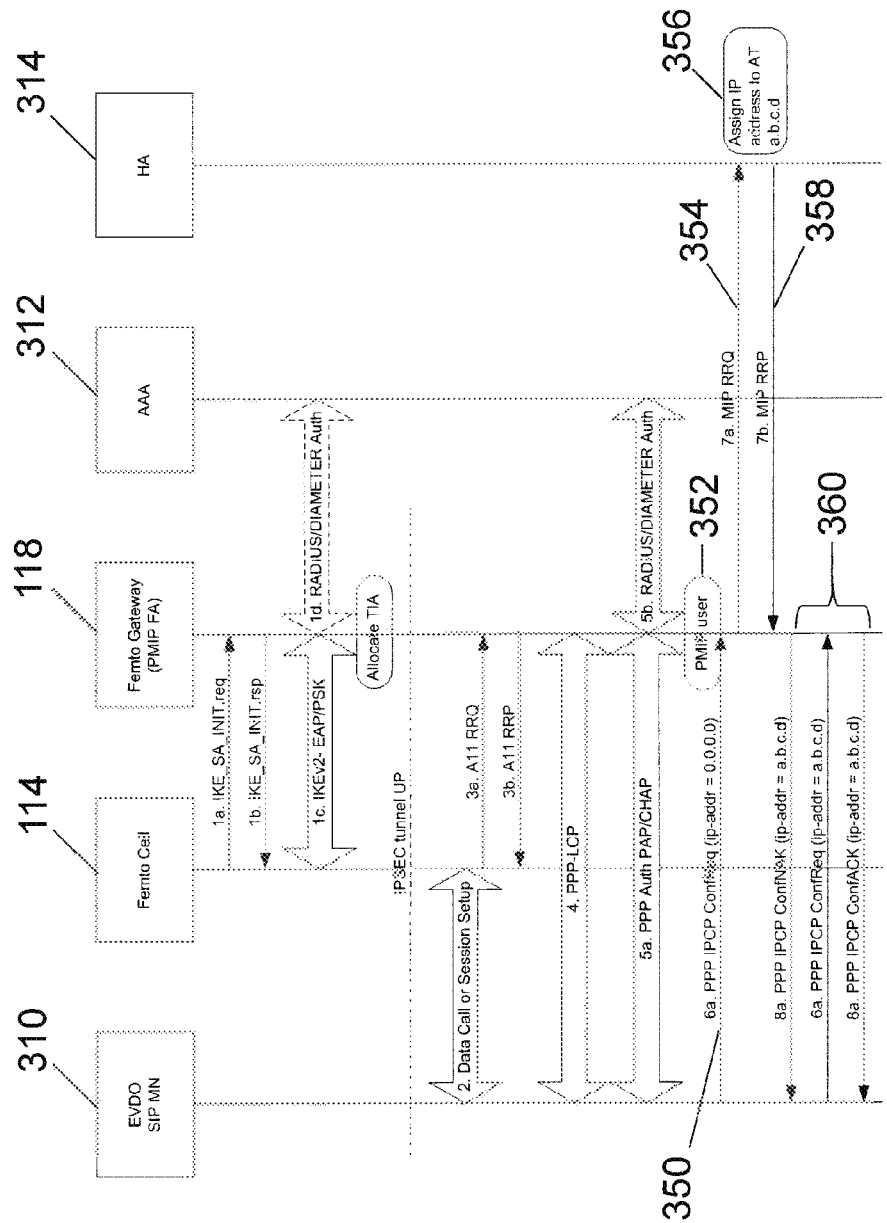
FIG. 9 illustrates a signaling diagram for a proxy mobile IP session setup in accordance with certain embodiments.

FIG. 9 is a diagram illustrating proxy mobile IP (PMIP) signaling for a mobile node that desires to setup a session in accordance with certain embodiments. FIG. 9 includes a mobile node 310, a femto cell 114, a gateway providing a femto gateway 118, an authentication, authorization, and accounting (AAA) server 312, and a home agent (HA) 314. Femto gateway 118 can implement a PMIP foreign agent (FA) for the purposes of signaling and communication in the network. As shown, some of the signaling was explained in conjunction with FIG. 8. Mobile node 310 sends a PPP IPCP configuration request message 350 to PMIP user 352 within gateway 118. A mobile IP registration request 354 is sent to HA 314 and HA 314 assigns an IP address in step 356 to mobile node 310. The assigned IP address can be communicated in a MIP registration reply 358. PPP IPCP signaling 360 negotiates the IP address assigned by HA 314, to provide mobile node 310 with an IP address.

Figure 10:
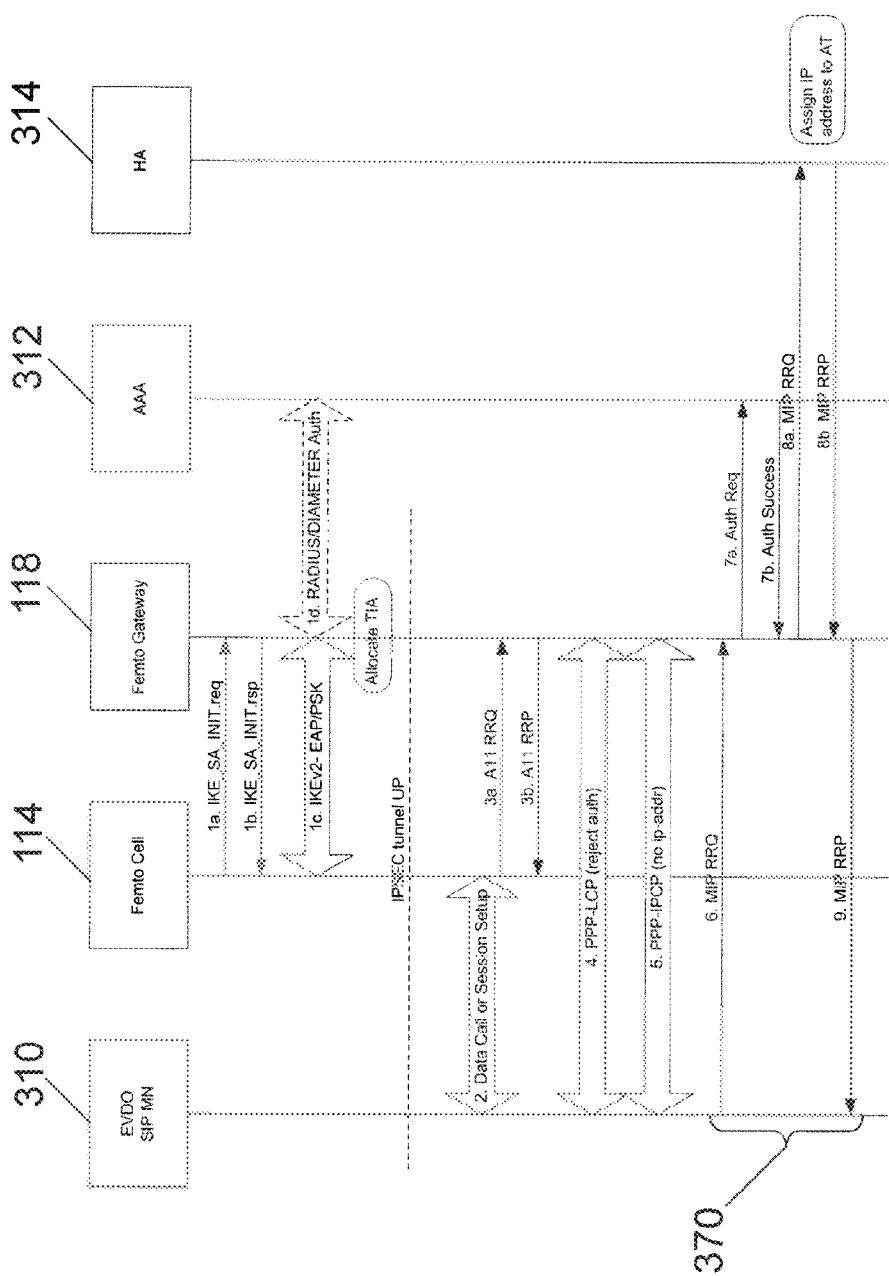
FIG. 10 illustrates a signaling diagram for a mobile IP session setup in accordance with certain embodiments.

FIG. 10 is a diagram illustrating mobile IP (MIP) signaling for a mobile node that desires to setup a session in accordance with certain embodiments. FIG. 10 includes a mobile node 310, a femto cell 114, a gateway providing a femto gateway 118, an authentication, authorization, and accounting (AAA) server 312, and a home agent (HA) 314. As shown, some of the signaling was explained in conjunction with FIG. 8. Signaling 370 can be performed to obtain an IP address for mobile node 310 from HA 314.

Femto gateway also facilitates fast handoffs, in some embodiments. The fast handoff can be inter-technology as well as between a macro cell, a nano cell, or a femto cell. In some embodiments, for example, in a CDMA embodiment, the femto gateway can act like a packet data serving node (PDSN) to the femto cell and a PPP session terminates at the femto network gateway. This allows the femto gateway to use fast handoff procedures of a PDSN when there is a handoff. The femto gateway allows handoffs between femto cells, for example, within an office building for mobile nodes such as a Blackberry. Handoffs in other embodiments are also possible. For example, the femto gateway can act like a packet data network gateway (PDN gateway) or a serving gateway (S-GW) in an evolved packet core (EPC).

Figure 11:
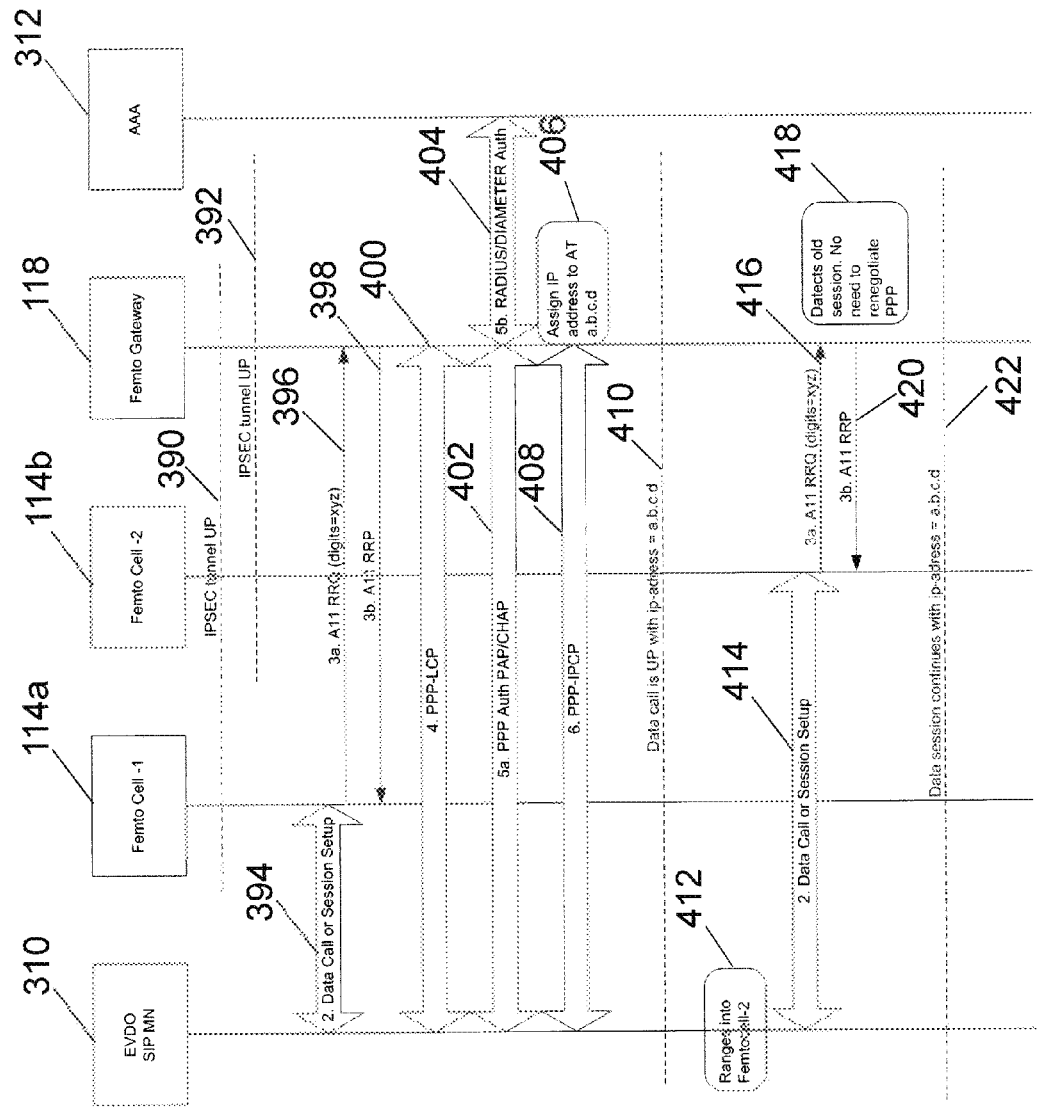
FIG. 11 illustrates a femto cell to femto cell fast handoff in accordance with certain embodiments.

FIG. 11 is a diagram illustrating a femto cell to femto cell fast handoff in accordance with certain embodiments. FIG. 11 includes a mobile node 310, a femto cell 1 114a, a femto cell 2 114b, a gateway providing a femto gateway 118, and an authentication, authorization, and accounting (AAA) server 312. In FIG. 11, IPSec tunnels are already established between femto cell 1 114a and femto gateway 118 with IPSec tunnel 390 as well as femto cell 2 114b and femto gateway 118 with IPSec tunnel 392. A data call or session startup signaling 394 between mobile node 310 and femto cell 114a is used to startup the session or call. Femto cell 114a sends an A11 registration request 396 with the phone number, for example, in digits. Femto gateway 118 sends an A11 registration reply 398. PPP-LCP signaling 400 can begin between mobile node 310 and femto gateway 118. PPP authorization signaling 402 along with radius/diameter authorization signaling 404 is used to authenticate the mobile node 310. Femto gateway 118 assigns an IP address to mobile node 310 at step 406. PPP-IPCP signaling 408 can then establish an IP session with the IP address, in certain embodiments. The session is up and packet flow over the connection using the IP address in 410. At 412, mobile node 310 ranges into femto cell 2 114b. A data call or session setup 414 is begun between mobile node 310 and femto gateway 118. An A11 registration request 416 is sent to femto gateway 118. At 418, femto gateway 118 detects the old session and there is no need to renegotiate PPP. A registration reply 420 is sent to femto cell 114b providing it with information for the data session to continue with the same IP in 422. Because PPP renegotiation is avoided, call setup latency is greatly reduced, and the same IP address can be used. This provides a fast handoff.

Figure 12:
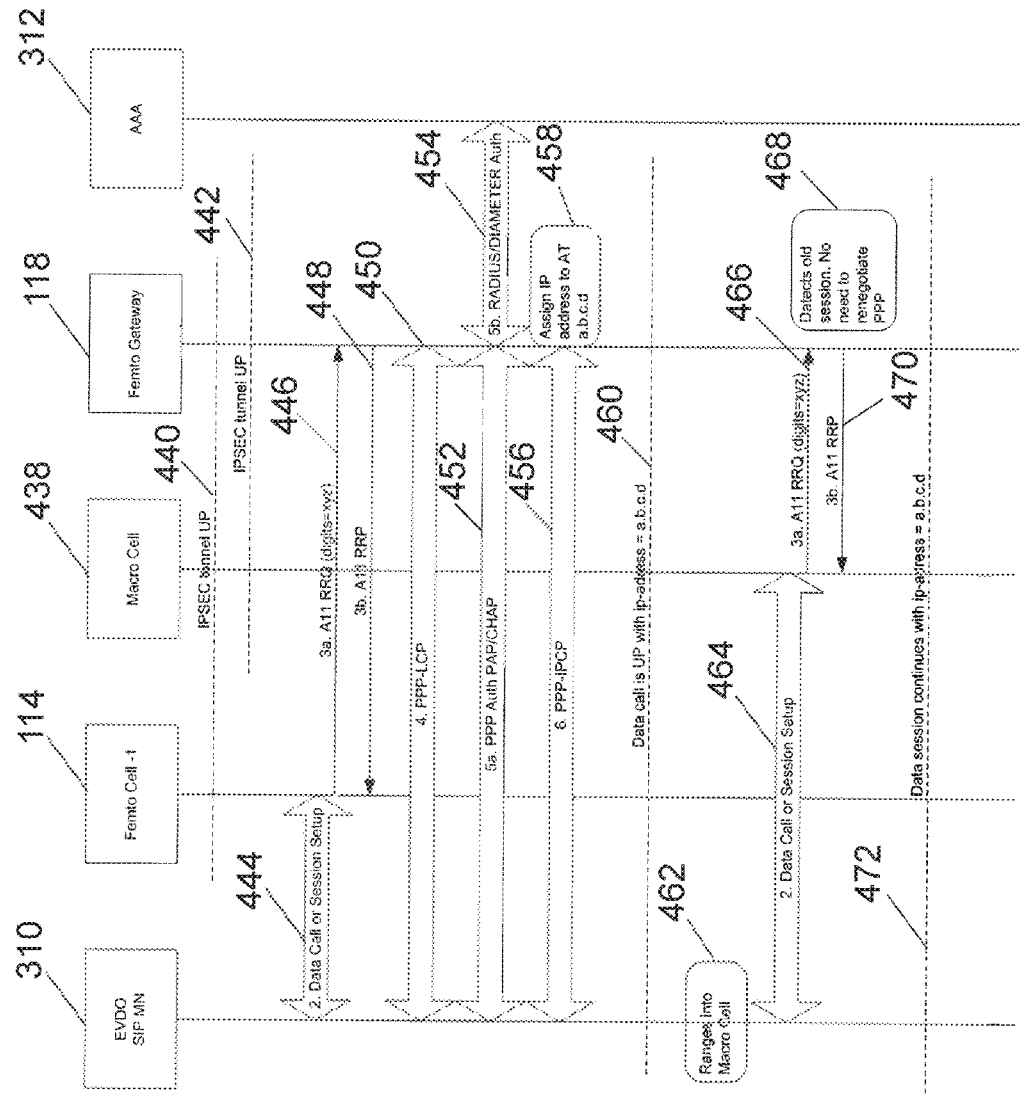
FIG. 12 illustrates a femto cell to macro cell fast handoff in accordance with certain embodiments.

FIG. 12 is a diagram illustrating a femto cell to macro cell fast handoff in accordance with certain embodiments. FIG. 12 includes a mobile node 310, a femto cell 114, a macro cell 438, a gateway providing a femto gateway 118, and an authentication, authorization, and accounting (AAA) server 312. As shown, IPSec tunnel 440 between femto cell 114 and femto gateway 118 as well as IPSec tunnel 442 between macro cell 438 and femto gateway 118 are already setup. A data call or session startup signaling 444 between mobile node 310 and femto cell 114 is used to startup the session or call. Femto cell 114 sends an A11 registration request 446 with information relating to mobile node 310. Femto gateway 118 sends an A11 registration reply 448.

As shown, PPP-LCP signaling 450 begins between mobile node 310 and femto gateway 118. PPP authorization signaling 452 along with radius/diameter authorization signaling 454 is used to authenticate the mobile node 310. Femto gateway 118 assigns an IP address to mobile node 310 at step 456. PPP-IPCP signaling 458 can then establish an IP session with the IP address, in certain embodiments. The session is up and packet flow over the connection using the IP address in 460. At 462, mobile node 310 ranges into macro cell 438. A data call or session setup 464 is begun between mobile node 310 and femto gateway 118. An A11 registration request 466 is sent to femto gateway 118. At 468, femto gateway 118 detects the old session and there is no need to renegotiate PPP. A registration reply 470 is sent to femto cell 438 providing it with information for the data session to continue with the same IP in 472. A fast handoff is provided as the same IP address is maintained and PPP parameters do not need to be renegotiated, in some embodiments.

In some embodiments, for a handoff, the femto cell acts like a PCF and the femto gateway acts like a PDSN. PPP renegotiation can be the most time consuming because of the authentication that takes place and the other messaging involved with setting up a PPP session. When terminating in the core, rather than at the edge, more handoffs will be with the same PDSN (or femto gateway) so this can reduce the number of setup steps the might otherwise need to occur in renegotiation, causing delay. The femto gateway can receive raw voice (simply packetized voice) and convert for session initiation protocol (SIP) or real-time transport protocol (RTP). Voice getting converted in the femto gateway allows for a simpler routing to a traditional network, in some embodiments.

In certain embodiments, the femto gateway simulates other network elements to act as a proxy for the femto cell. This can allow the femto gateway to hide one or more femto cells from the network and allow the femto cell to be a simpler device. The femto cell can send the femto gateway commands and other information, for example, a simplified command set and the femto gateway can use that information to simulate a logical component to communicate with other network elements. Providing a femto gateway that proxies commands for a number of femto cells also allows for scalability on the service provider's network. Exposing the femto cells to the network would not likely scale well in the network because there is likely to be many femto cells given each femto cell's small coverage area relative to a macro cell's coverage area. By having the femto gateway proxy commands this allows for scalability to deploy a number of femto cells in the network. For example, a femto gateway can proxy as a PCF and communicate with a real PCF. The real PCF would not know that the femto gateway was proxying as a PCF, but only a single IP address can be exposed to the network. The femto gateway can also proxy as an enhanced NodeB (eNB), a nodeB, a radio network controller (RNC), an evolved-UMTS terrestrial radio access network (E-UTRAN), a base transceiver station (BTS), and a base station controller (BSC).

Figure 13:
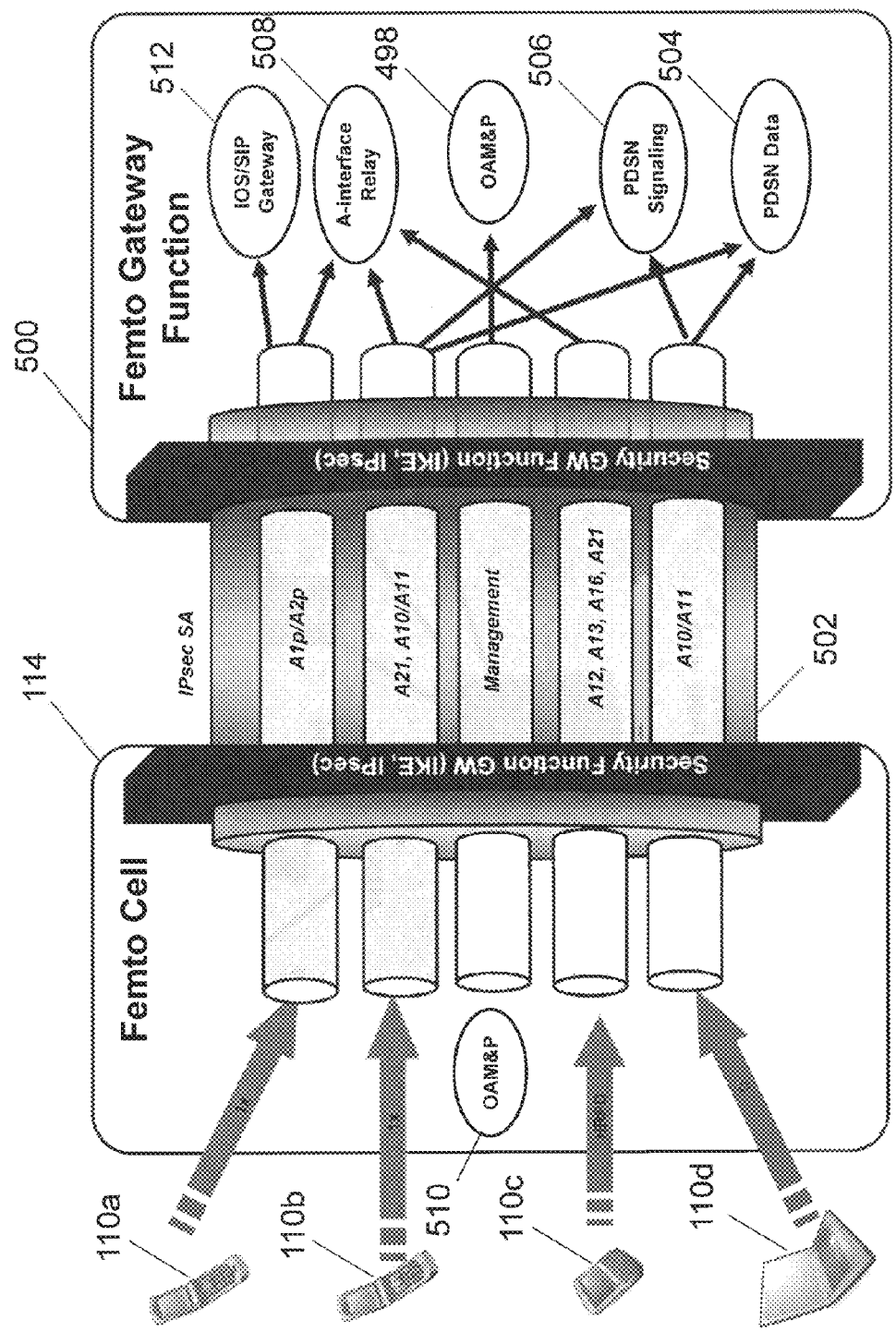

FIG. 13 is a diagram illustrating how some of the proxy functions might look in a gateway providing a femto gateway function, in accordance with certain embodiments. FIG. 13 includes 1xRTT mobile node 110a, 1xRTT mobile node 110b, a high rate packet data (HRPD) mobile node 110c, a HRPD mobile node 110d, a femto cell 114, and a femto network gateway function 500. As shown, interoperability specification (IOS) based signaling can be used for each mobile node through an IPSec tunnel. Each mobile node can use one or more tunnels within IPSec 502. These one or more tunnels within map to the mobile node at the femto cell 114 and route the messaging to the function in the femto gateway function 500. For example, A10/A11 is mapped to a PDSN data function 504 which handles data and to a PDSN signaling function 506 to handle information from the mobile nodes. An A-interface proxy 508 can be used to communicate with other network elements such as a PCF or an AN. A-interface proxy 508 can act like an abstraction for the other A-interfaces that do not really terminate on the femto gateway function and the femto gateway proxies to other network elements. Operations, administrative, maintenance, and provisioning (OAM&P) 498 can be used to manage and track things going on as well as allow for repairs, upgrades, accounting, and statistics. OAM&P 510 can also provide statistics, accounting, upgrades, and error notification, but may also be used in conjunction with OAM&P 498 to manage the proxy aspect of femto cell 114. The OAM&P 510 in communication with OAM&P 498 can allow for configuration of a femto cell 114 when initializing in the network and can provide plug-in-play ability of the femto-cell 114. An IOS/SIP gateway function 512 to interwork IOS signaling to SIP signaling is also provided.

Figure 14:
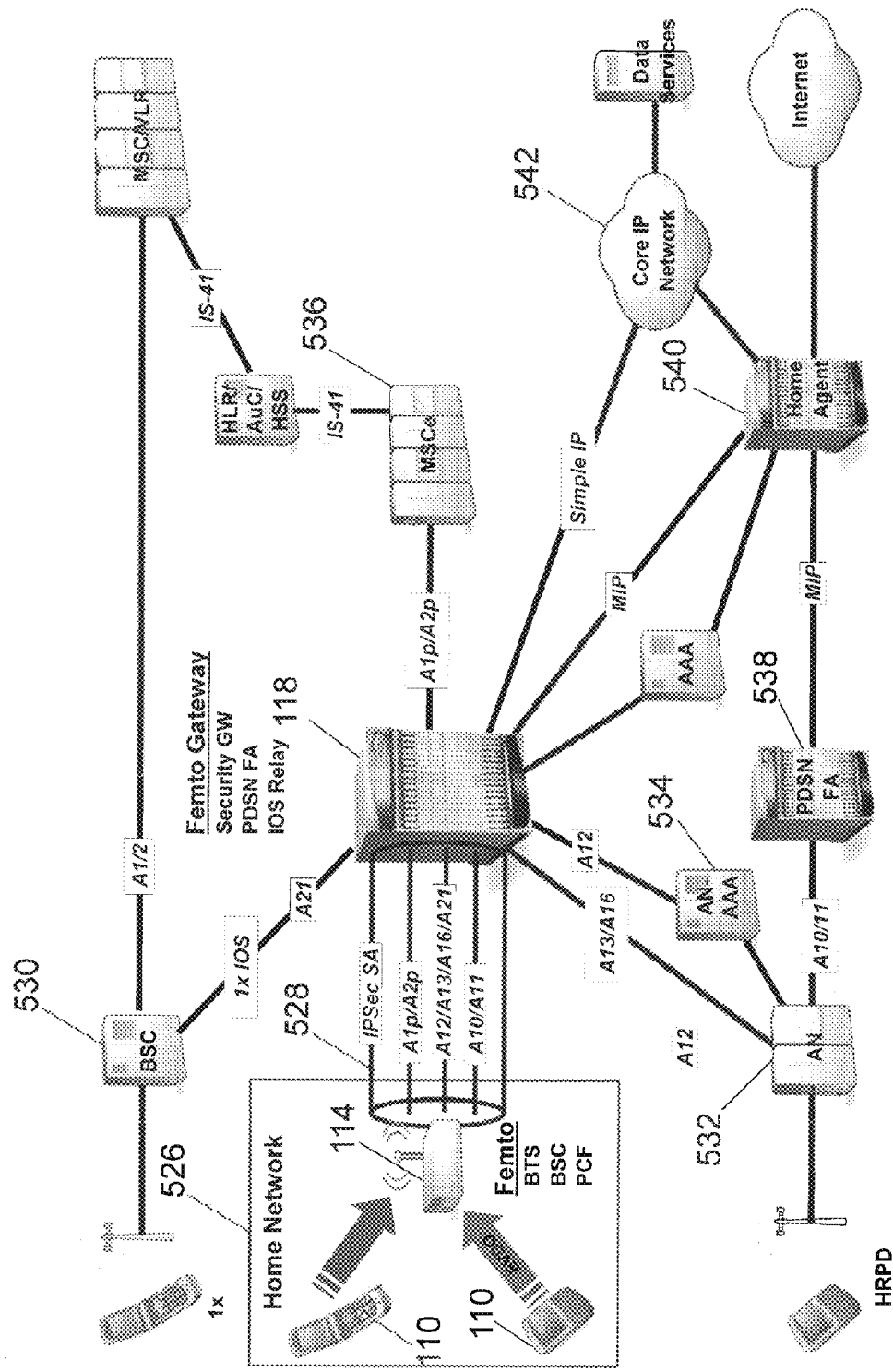

FIG. 14 is a diagram illustrating an IOS model for a femto system architecture in accordance with some embodiments. As shown, in the home network 526, mobile nodes 110 can communicate with a femto cell 114. The femto cell 114 can implement one or more of a base station transceiver (BTS), a base station controller (BSC), an eNodeB, and a packet control function (PCF). Communication with a femto network gateway can include a number of A-interfaces using a IPSec SA 528. The functions shown in FIG. 13 are then used to communicate with various network elements, in some embodiments. For example, A-interface proxy 508 communicates with BSC 530, AN 532, AN-AAA 534, and a CDMA softswitch center (MSCe) 536. Other functions, such as PDSN data function 504 and PDSN signaling function 506 (of FIG. 13) can communicate with network elements such as PDSN/FA 538, home agent 540, and core IP network 542.

Figure 15:
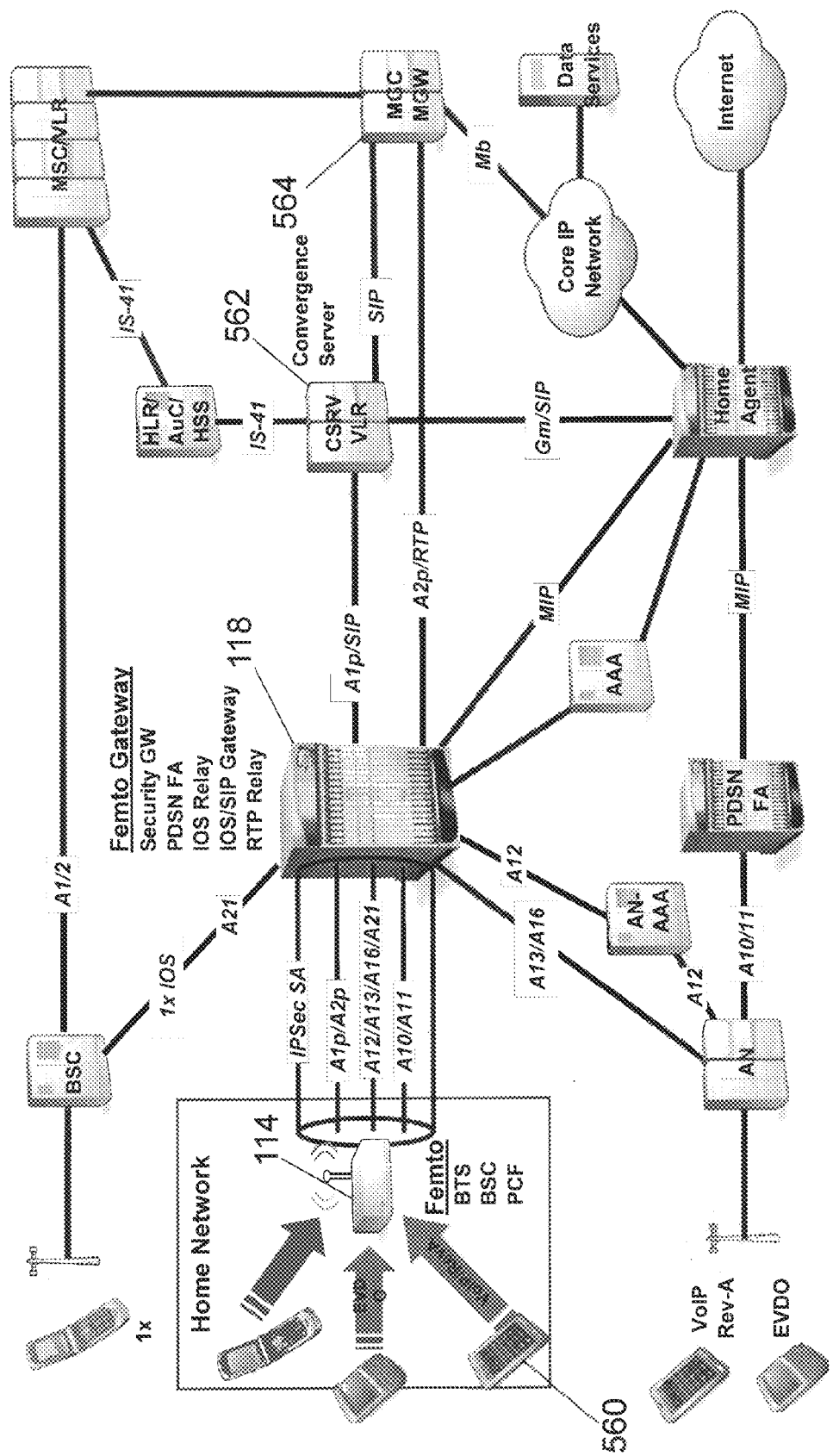
Figure 16:
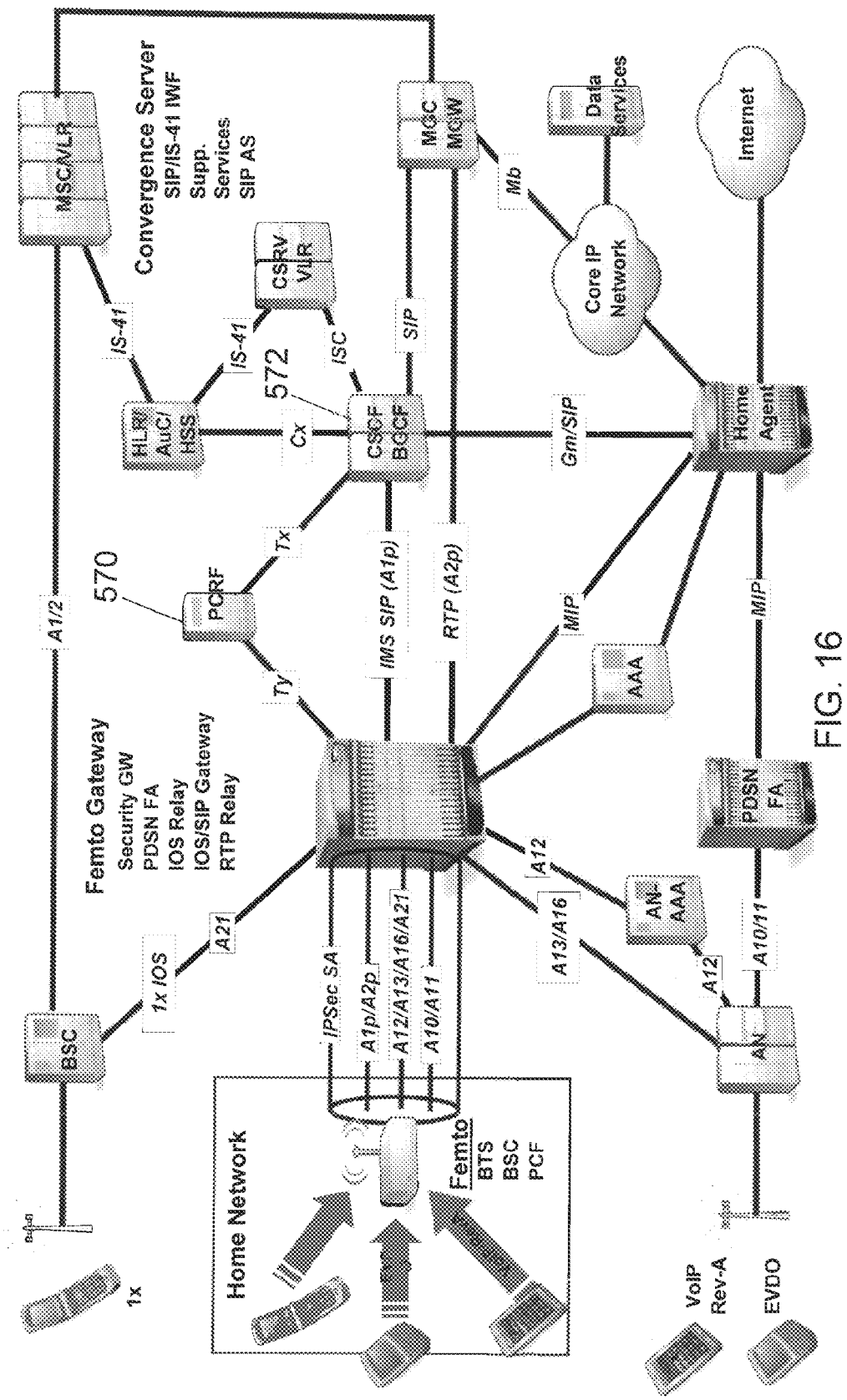

FIG. 15 is a diagram illustrating a session initiation protocol (SIP) model for a femto system architecture in accordance with some embodiments. In a SIP implementation, mobile nodes that are voice over IP (VoIP) enabled such as mobile node 560 can communicate to femto cell 114 in VoIP. Further, IOS/SIP gateway function 512 (FIG. 13) can be used to communicate with SIP network elements such as a convergence server 562. In some embodiments, the VoIP data can be sent over RTP to a media gateway controller (MGC)/media gateway (MGW) 564. FIG. 15 is a diagram illustrating a internet multimedia subsystem (IMS) module for a femto system architecture in accordance with some embodiments. FIG. 16 illustrates a IP Multimedia Subsystem (IMS) model for a femto system architecture in accordance with some embodiments. FIG. 16 includes a policy and charging rule function (PCRF) 570 and a call session control function (CSCF)/border gateway control function (BGCF) 572. In some embodiments, IOS/SIP gateway function 512 (FIG. 13) can be used to communicate with CSCF/BGCF 572.

Figure 17:
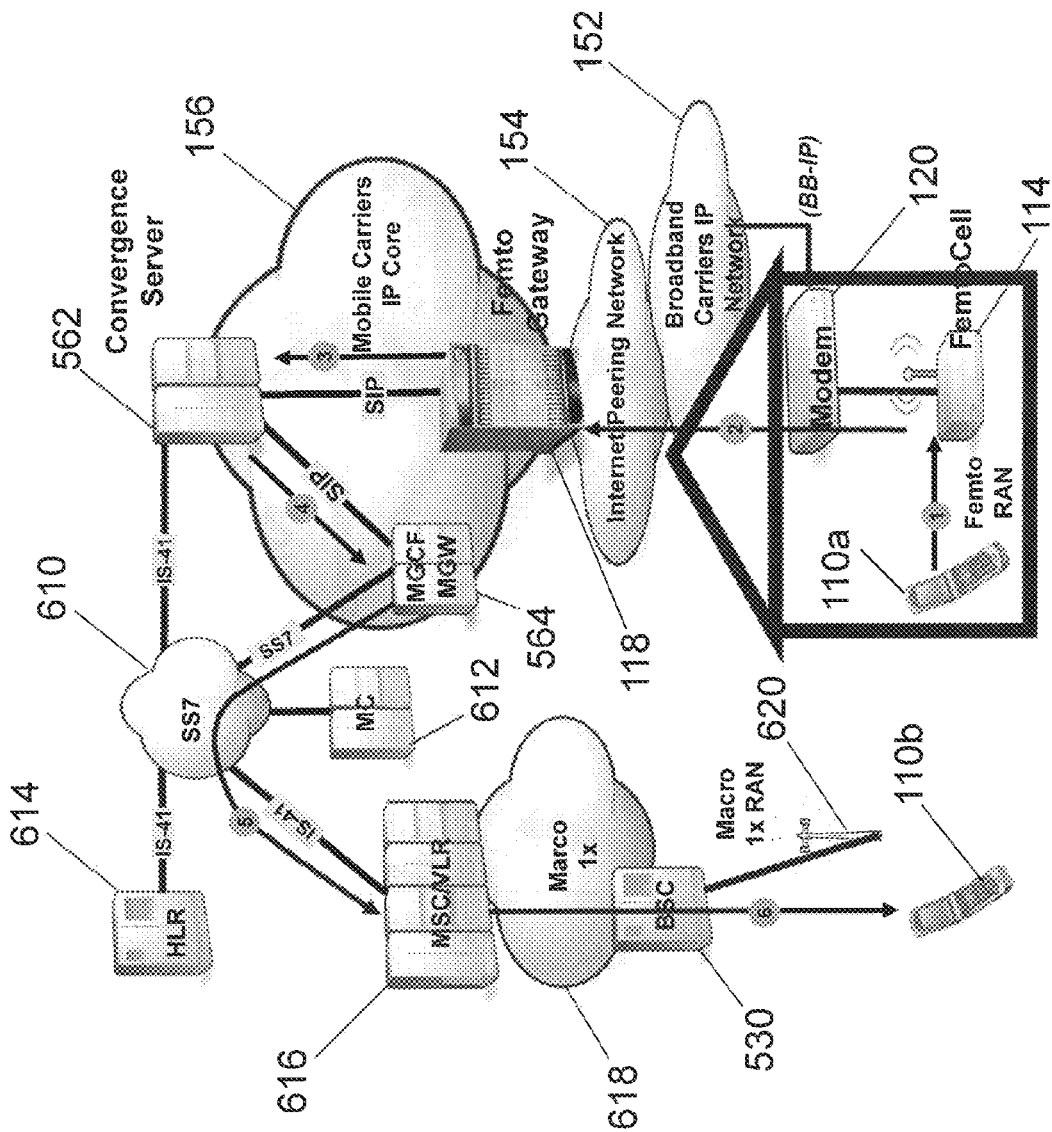
FIG. 17 illustrates call flow from a femto based mobile node to a macro based mobile node in accordance with some embodiments.

FIG. 17 illustrates a call flow from a femto based mobile node to a macro based mobile node in an IOS/SIP model in accordance with some embodiments. FIG. 17 includes a CDMA capable mobile nodes 110a and 110b, a femto cell 114, a modem 120, a broadband carrier's IP network 152, an internet peering network 154, a femto gateway 118, a mobile carrier's IP core 156, a convergence server 562, a media gateway control function (MGCF) and media gateway (MGW) 564, an SS7 network 610, a media controller (MC) 612, a home location register (HLR) 614, a mobile switching center (MSC)/visitor location registry (VLR) 616, a macro network 618, a base station controller (BSC) 530, and a macro radio access network (RAN) 620. In call flow part 1, the mobile node sends a origination message to the femto cell. The femto cell sends an A1p content management (CM) service request message to the femto gateway over a GRE/IPsec tunnel, in call flow part 2. In call flow part 3, the femto gateway terminates the GRE/IPSec tunnel and converts the A1p CM service request to a SIP invite request and sends the SIP invite request to the convergence server. The convergence server terminates the SIP invite send a SIP invite to the MGCF after checking the supplementary service profile of the mobile in call flow part 4. In call flow part 5, the media control function routes the call to a terminating MSC via SS7. The terminating MSC and BSC deliver the call to the mobile node on the macro cellular network in call flow part 6.

Figure 18:
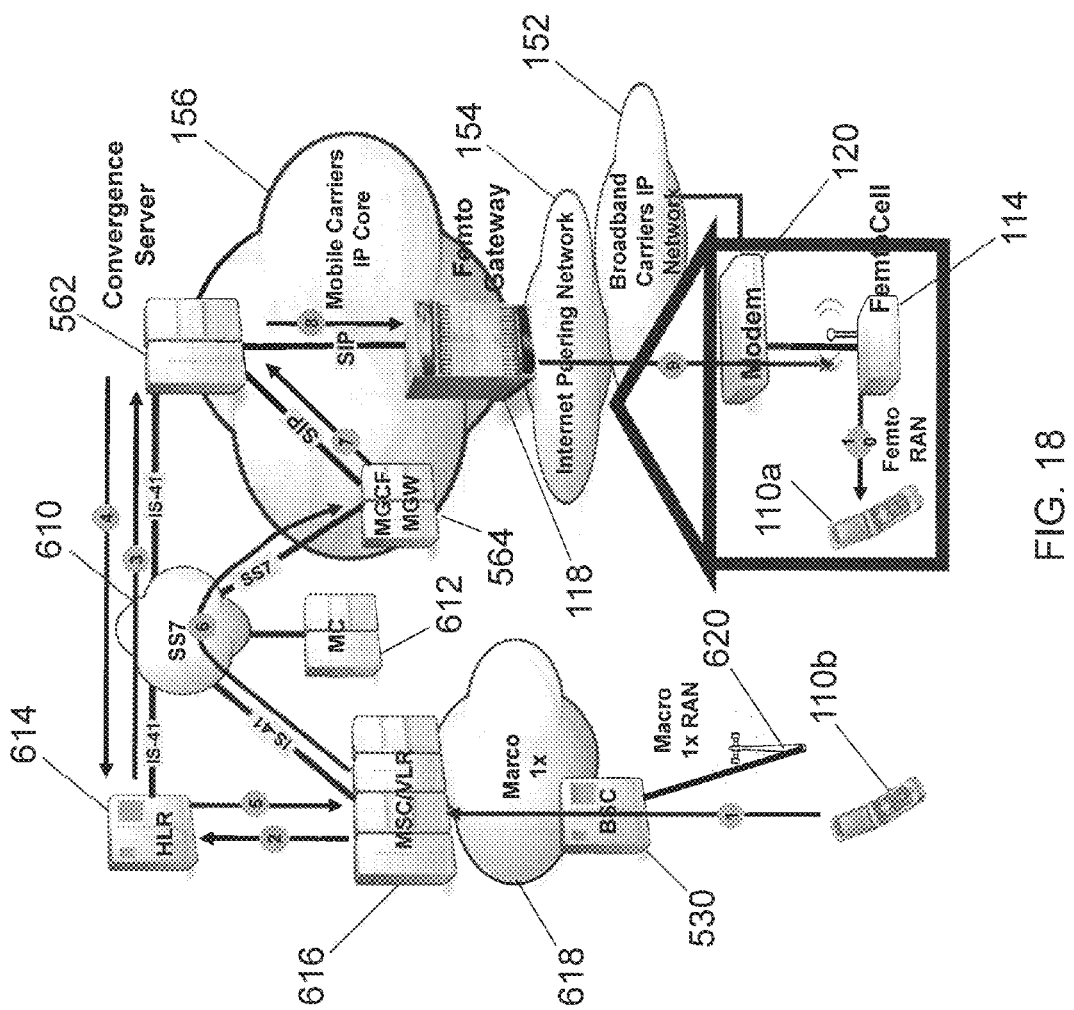
FIG. 18 illustrates call flow from a macro based mobile node to a femto based mobile node in accordance with some embodiments.

FIG. 18 illustrates call flow from a macro based mobile node to a femto based mobile node in an IOS/SIP model in accordance with some embodiments. FIG. 18 includes CDMA capable mobile node 110a, a femto cell 114, a modem 120, a broadband carrier's IP network 152, an internet peering network 154, a gateway including femto gateway functionality 118, a mobile carrier's IP core 156, a convergence server 562, a media gateway control function (MGCF) and media gateway (MGW) 564, an SS7 network 610, a mobile switching center (MSC)/VLR 616, a home location registrar (HLR) 614, a macro network 618, a base station controller (BSC) 530, a macro radio access network (RAN) 620, and a mobile node communicating with the macro RAN 110b. In call flow part 1, the mobile node in the macro network initiates a call to a mobile in the femto cell network. The serving MSC sends a LOCREQ message (location request) to the HLR in call flow part 2. The HLR sends a ROUTREQ messages (route request) to the convergence server in call flow part 3. In call flow part 4, the convergence server provides a TLDN (top level domain name or temporary location directory number) to reach the destination mobile node in the ROUTREG response message. In call flow part 5, the HLR sends the TLDN to the serving MSC in the LOCREQ response message. The MSC sends a ISUP (IAM) with the TLDN to the MGCF through the SS7 network in call flow part 6. The MGCF sends a SIP invite message that includes the TDLN to the convergence server in call flow part 7. In call flow part 8, the convergence server replaces the TDLN with a MDN (mobile directory number) of the destination mobile and sends the SIP invite message with the MDN to the femto gateway. In call flow part 9, the femto gateway converts the SIP invite to an A1p paging request message and forwards the message to the femto cell over a GRE/IPsec tunnel. The femto cell terminates the GRE/IPsec tunnel and A1p paging request message and sends a page message to the mobile node in the femto network.

Figure 19:
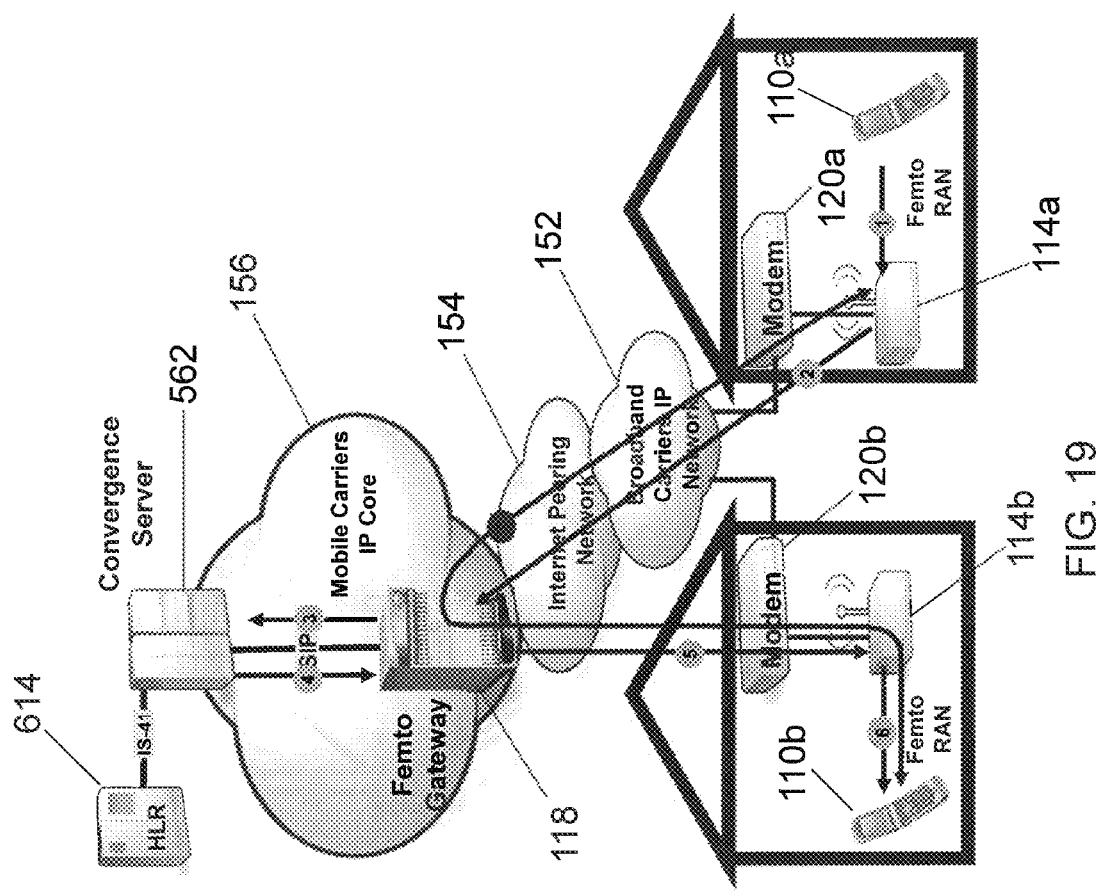
FIG. 19 illustrates a call flow between two femto cell based mobile nodes in accordance with certain embodiments.

FIG. 19 illustrates a call flow between two femto cell based mobile nodes in accordance with certain embodiments. FIG. 19 includes two CDMA capable mobile nodes 110a and 110b, two femto cells 114a and 114b, two modems 120a and 120b, a broadband carrier's IP network 152, an internet peering network 154, a gateway including femto gateway functionality 118, a mobile carrier's IP core 156, a convergence server 562, and a home location registrar (HLR) 614. In call flow part 1, the mobile node sends an origination message to the femto cell. The femto cell sends an A1p CM service request message to the femto gateway over a GRE/IPsec tunnel in call flow part 2. In call flow part 3, the femto gateway terminates the GRE/IPsec tunnel and converts the A1p CM service request to a SIP invite request message and sends the SIP invite message to the convergence server. The convergence server terminates the SIP invite message and sends a second SIP invite to the femto gateway after checking the supplementary service profile of the mobile node in call flow part 4. The second SIP invite can include information obtained from the supplementary service profile of the mobile node. The femto gateway converts the SIP invite message to an A1p paging request messages and forwards the message to the second femto cell over a GRE/IPsec tunnel in call flow part 5. In call flow part 6, the femto cell terminates the GRE/IPsec tunnel and A1p paging request message and sends a page message to the mobile node in the second femto network. In call flow part 7, an RTP voice path is routed locally within the femto gateway between the femto cells.

Figure 20:
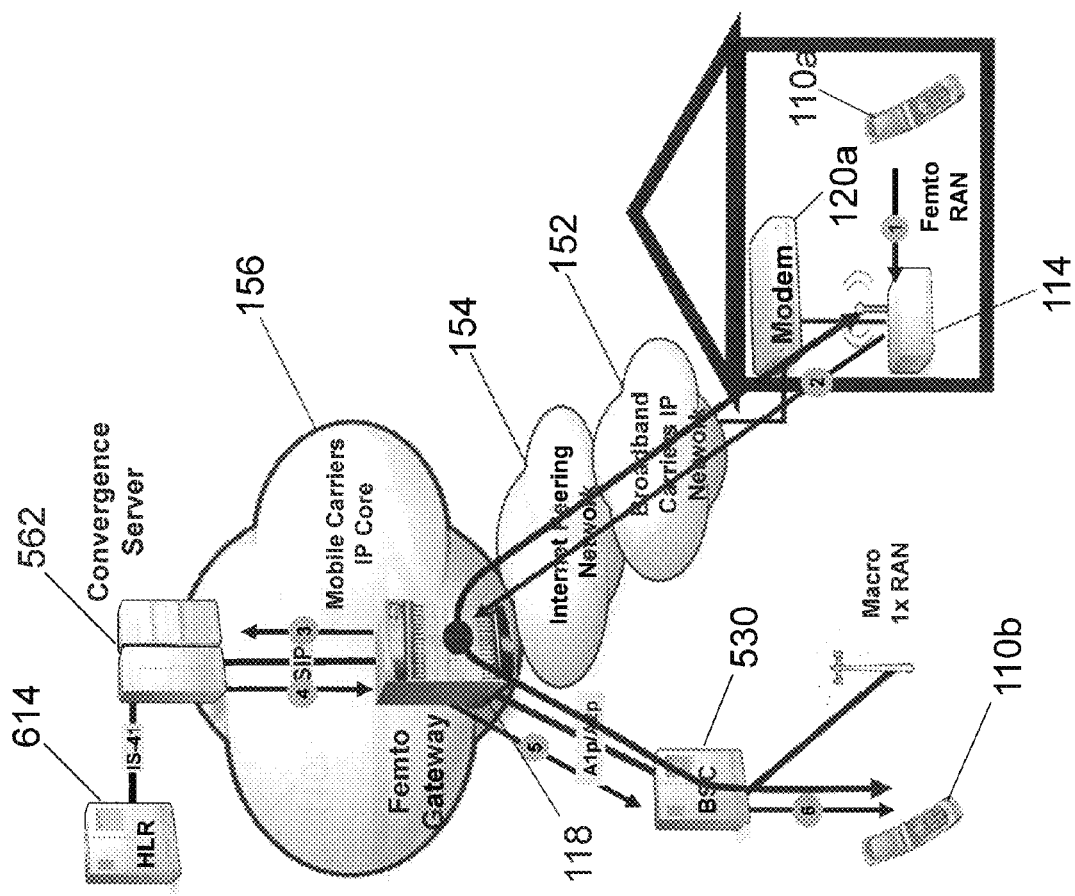
FIG. 20 illustrates termination of a call flow between a femto cell based mobile node and a macro cell based mobile node in accordance with certain embodiments.

FIG. 20 illustrates termination of a call flow between a femto cell based mobile node and a macro cell based mobile node in accordance with certain embodiments. FIG. 20 includes CDMA capable mobile node 110a, a femto cell 114, a modem 120, a broadband carrier's IP network 152, an internet peering network 156, a gateway including femto gateway functionality 118, a mobile carrier's IP core 152, a convergence server 562, and a home location registrar (HLR) 614, a base station controller (BSC) 530, and a mobile node in the macro RAN 110b. In call flow part 1, the mobile node sends an origination message to the femto cell. The femto cell sends an A1p CM service request message to the femto gateway over a GRE/IPsec tunnel in call flow part 2. In call flow part 3, the femto gateway terminates the GRE/IPsec tunnel and converts the A1p CM service request to a SIP invite request message and sends the SIP invite message to the convergence server. The convergence server terminates the SIP invite message and sends a second SIP invite to the femto gateway after checking the supplementary service profile of the mobile node in call flow part 4. The second SIP invite can include information obtained from the supplementary service profile of the mobile node. In call flow part 5, the femto gateway converts the SIP invite to an A1p paging request message and forwards this message to the BSC supporting A1p. The BSC sends a page message to the mobile node in the macro RAN in call flow part 6. In call flow part 7, a two-way A2p (RTP) voice path is routed locally within the femto gateway between the macro network and the femto cell.

Figure 21:
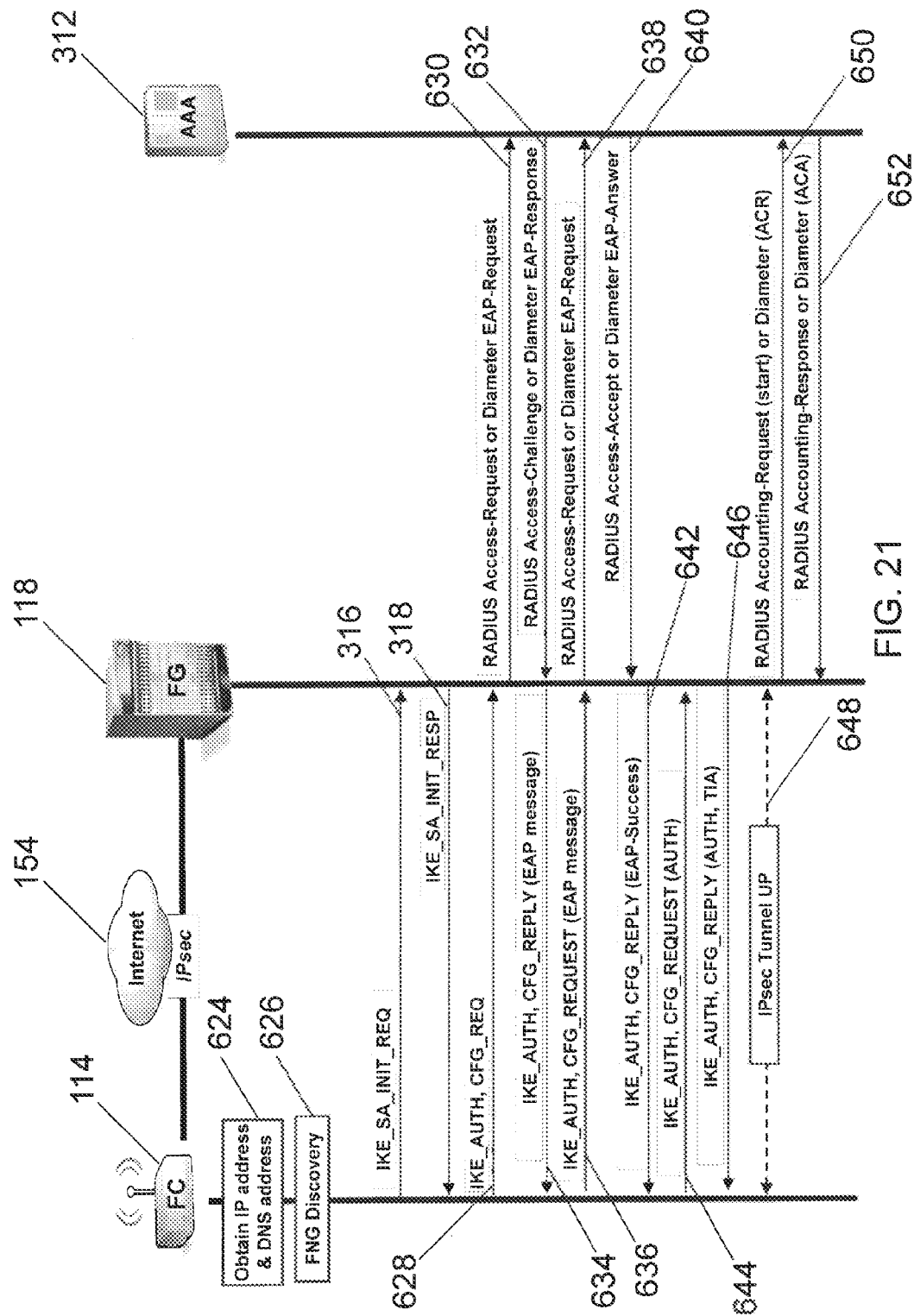
FIG. 21 illustrates signaling is used in femto cell authentication in accordance with certain embodiments.
Figure 22:
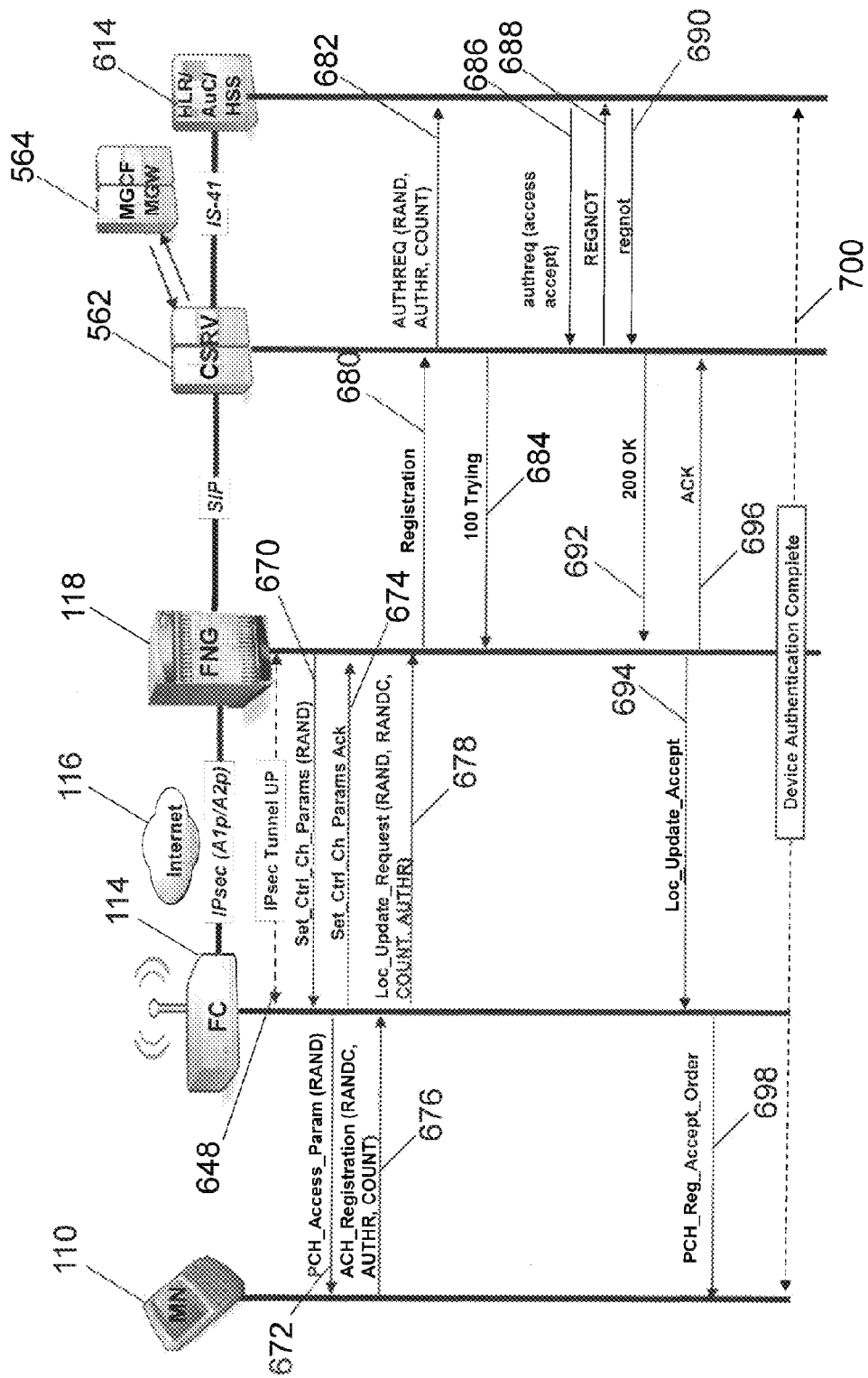
FIG. 22 illustrates signaling for mobile node authentication including a global challenge and a location update in accordance with certain embodiments.
Figure 23:
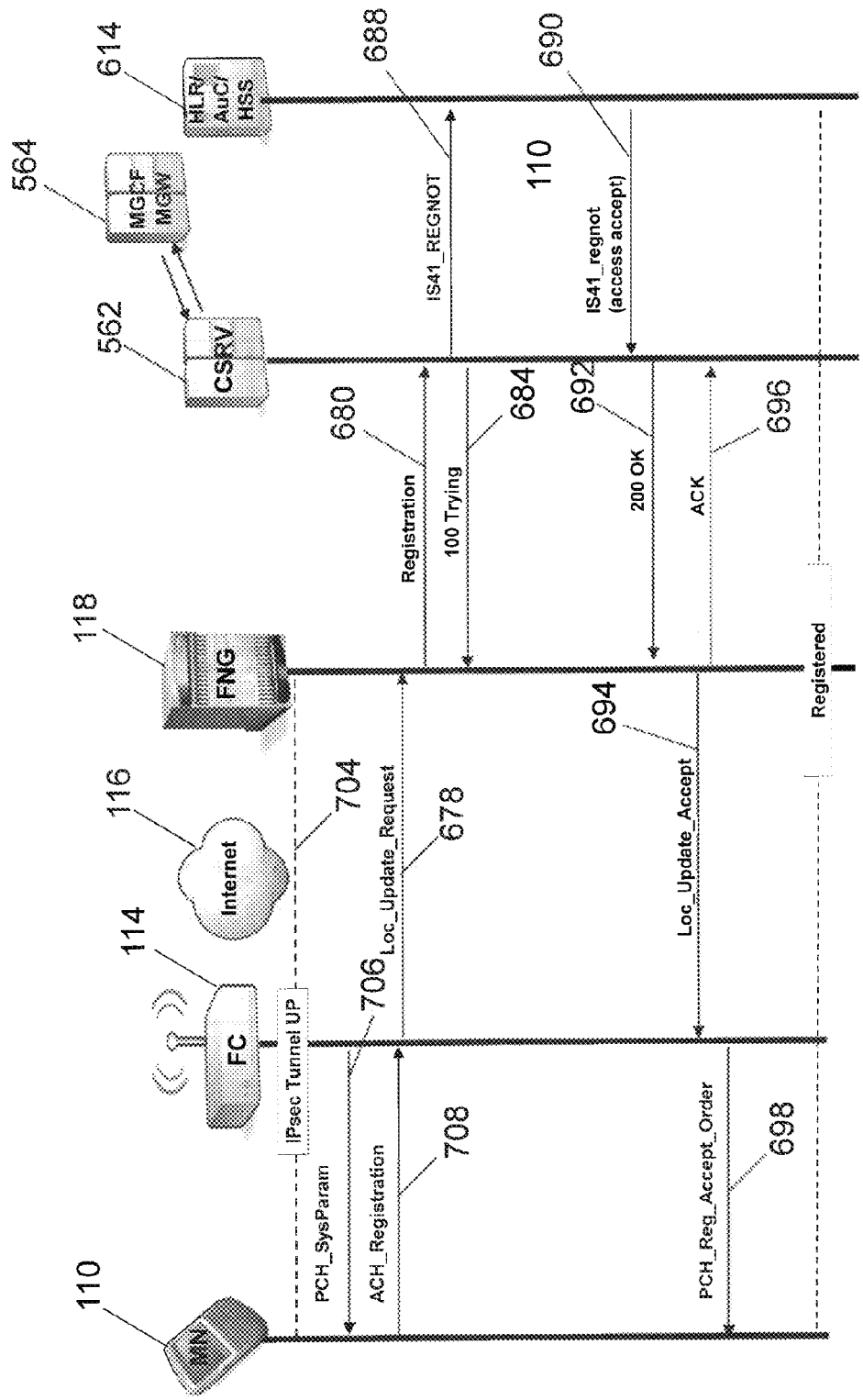
FIG. 23 illustrates registration of a mobile node through a convergence server in accordance with certain embodiments.

FIGS. 21, 22, and 23 illustrate authentication and registration in accordance with some embodiments. In this process generally a tunnel is setup, a channel is setup, a location update occurs, SIP registration occurs, and authentication/registration notification occurs. In tunnel setup, the femto cell and the gateway communicate to setup a secure tunnel. This secure tunnel can be an IPSec tunnel over a broadband network. The femto cell communicates with the mobile node to setup a channel between the mobile node and the femto cell. After the channel is setup, the femto cell updates the network about the location of the mobile node (and its attachment point to the network). SIP registration of the mobile node occurs between gateway 118 and convergence server 526. Authentication and registration notification communication occurs between the convergence server 562 and the home location register (HLR)/authentication center (AuC)/home subscriber service (HSS) 614.

FIG. 21 illustrates signaling is used in femto cell authentication in accordance with certain embodiments. FIG. 21 includes a femto cell (FC) 114, an internet 154, a gateway 118, an IPsec tunnel, and an authentication, authorizing, and accounting (AAA) server 312. The gateway can include a security gateway function (not shown) that can receive and transmit messages relating to secure transmissions and authentication. The femto gateway can communicate with the AAA server 312 to provide identifying information that is received from the femto cell 114 to the AAA server 312 to verify and provide the femto cell with key information from the AAA server to setup a secure tunnel. A femto cell 114 can be plug-in-play capable by performing discovery and obtaining an IP address from the network. In 624, femto cell 114 obtains an IP address from the network and a domain name server (DNS) address.

The network, including gateway 118 in some embodiments, can provide femto cell 114 with a gateway address for the femto cell 114 to attach. To provide security across an otherwise insecure broadband network, femto cell 114 communicates with gateway 118 to setup a secure tunnel. An internet key exchange (IKE) security association (SA) initialization request message 316 can be sent to gateway 118 to setup a security association to secure the broadband network. An IKE SA initialization response 318 sent from the gateway 118 to the femto cell 114 can prompt the femto cell to send authentication information to the gateway. The femto cell can send an IKE Authentication and configuration request message 628. Gateway 118 in response to message 628 sends a RADIUS or DIAMETER request 630 to AAA server 312. AAA server 312 responds with a RADIUS or DIAMETER response 632 and gateway 118 responds to femto cell 114 with IKE authentication and configuration response message 634. The configuration response message 634 can include challenge information from AAA server 312. The femto cell 114 supplies the requested information in IKE authentication and configuration message 636 to gateway 118. Gateway 118 sends the information in a RADIUS or DIAMETER message 638. AAA server 312 responds with a RADIUS accept or DIAMETER answer message 640. Gateway sends configuration reply or EAP success message 642 to femto cell 114 to inform the femto cell of the successful security association negotiation. Messaging 644 and 646 is used to exchange information such as a TIA to setup IPSec tunnel 648 between femto cell 114 and gateway 118. Gateway 118 then sends a RADIUS or DIAMETER message 650 to start accounting procedures at AAA server 312 and receives a confirmation message 652.

FIG. 22 illustrates signaling for mobile node authentication including a global challenge and a location update in accordance with certain embodiments. FIG. 22 includes a mobile node (MN) 110, a femto cell (FC) 114, an internet 116, a gateway including a femto gateway (FG) 118, a convergence server 562, a media gateway control function/media gateway (MGCF/MGW) 564, and a home location register (HLR) 614. The authentication and location update is shown in a network architecture using a convergence server 562 and a gateway 118 to provide interworking to a SIP protocol. Gateway 118 sends a set control channel parameters message 670 to femto cell 114, which prompts femto cell 114 to send a access parameter message 672 to mobile node 110. Mobile node sends a registration message 676 to femto cell 114 with information such as RANDC, AUTHR, and COUNT. Femto cell 114 sends a location update request message 678 including this information to gateway 118. Gateway 118 performs interworking on the message and changes the message to a SIP registration message 680, which is sent to convergence server 562. The convergence server 562 sends authorization request to HLR/AuC/HSS 614. A SIP 100 trying message 684 is sent from the convergence server 562 to the gateway 118. The HLR/AuC/HSS 614 sends an authentication access accept message 686 back to the convergence server 562. Convergence server 562 sends a registration notification (regnot) message 688 to HLR/AuC/HSS and receives a regnot access accept message 690 back. Convergence server 562 sends a SIP 200 OK message 692 to gateway 118, which triggers interworking at the gateway and a sending of a location update accept message 694 to femto cell 114. A SIP acknowledgement message 696 is sent to convergence server 562. Femto cell 114 sends a registration accept order 698 to mobile node 110. In 700, mobile node authentication is complete.

FIG. 23 illustrates registration of a mobile node through a convergence server in accordance with certain embodiments. FIG. 23 includes a mobile node 110, a femto cell 114, a broadband network 116, a gateway 118 including a femto gateway functionality 118, a convergence server 562, a HLR/AuC/HSS 614, and media gateway control function (MGCF)/media gateway (MGW) 564. As shown, an IPSec tunnel is setup 704 between mobile node 110 and gateway 118, which provides secure communications between the devices. Femto cell 114 sends a channel negotiation message 706 to mobile node 110 and the mobile node 110 sends a registration message 708 back to femto cell 114. This triggers an update request to register the mobile node with HLR/AuC/HSS 614 as described in connection with FIG. 22.

Figure 24:
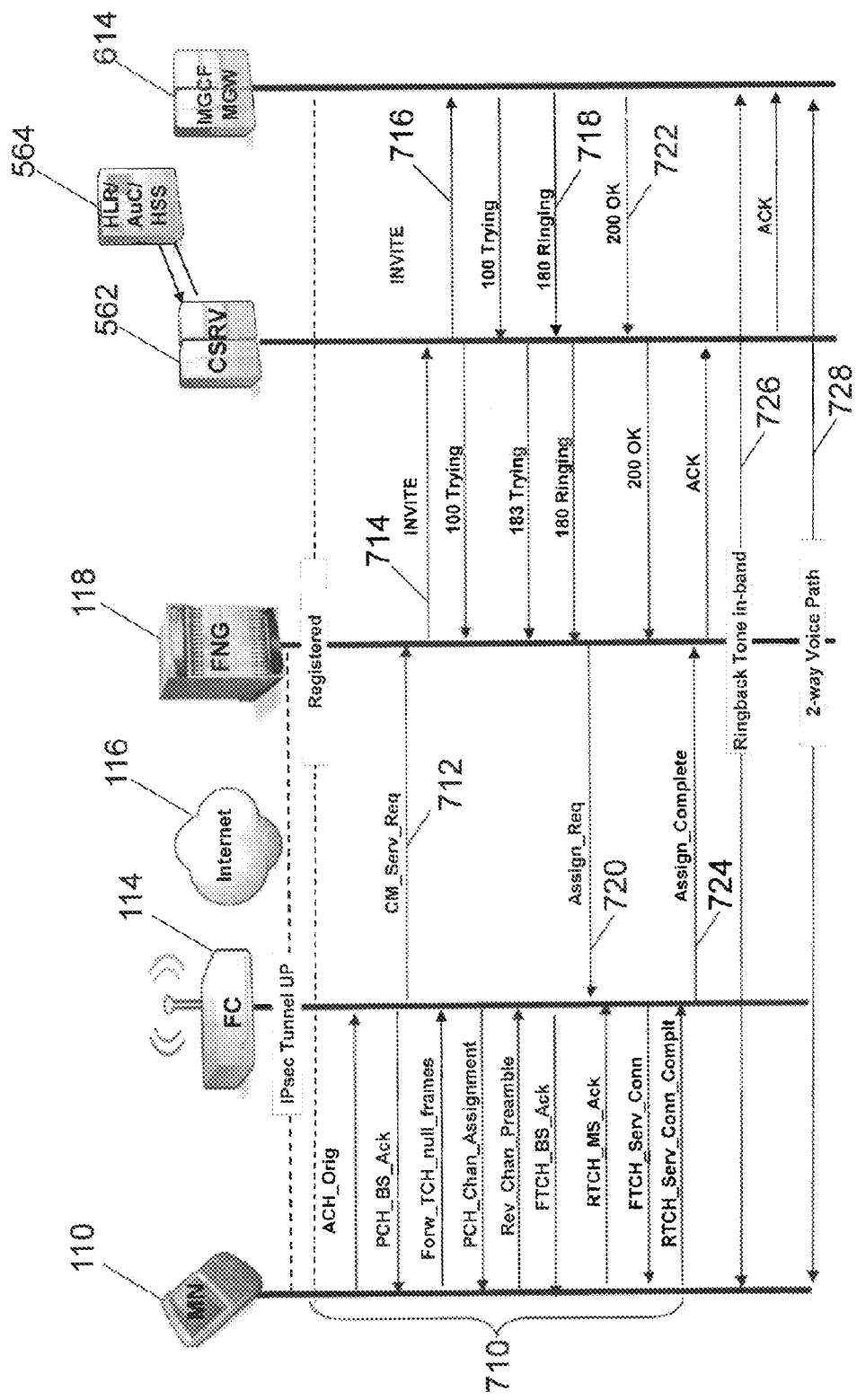
FIG. 24 illustrates setup of a voice path through a convergence server in accordance with some embodiments.

FIG. 24 illustrates setup of a voice path through a convergence server in accordance with some embodiments. FIG. 24 includes a mobile node 110, a femto cell 114, a broadband network 116, a gateway 118 including a femto gateway functionality 118, a convergence server 562, a HLR/AuC/HSS 614, and media gateway control function (MGCF)/media gateway (MGW) 564. The convergence server, HLR, and MGCF/MGW can be included in the NGN soft MSC core in some embodiments. As shown in the signaling diagram of FIG. 24, the femto gateway can convert direct transfer application part (DTAP)/base station management application part (BSMAP) to SIP messaging. The femto gateway can also aggregate two or more femto cells hiding the femto cells from the core network as part of the interworking the femto gateway provides.

In FIG. 24, a voice call is being setup from a phone that is attached to the network via a femto cell 114. An IPSec tunnel is already setup between mobile node 110 and gateway 118 and the mobile node is registered with the network as well. When a voice call is going to be placed from mobile node 110, channel negotiation/setup messaging 710 begins between femto cell 114 and mobile node 110. Femto cell 114 also sends a service request message 712 to gateway 118 to setup a voice path. Gateway 118 provides interworking from DTAP/BSMAP to SIP messaging and sends SIP invite 714 to the convergence server 562. The convergence server 562 sends a SIP invite message 716 to the MGCF/MGW 564. A SIP ringing message 718 is sent from the MGCF/MGW 564 which can provide information to setup the voice path, e.g., assignment information. The gateway 118 receives SIP ringing message 720 and provides interworking to change the message to an assignment request message 722 which is sent to femto cell 114. The femto cell uses this information in setting up the service connection to the mobile node 110. An assignment complete message 724 is sent from the femto cell 114 to indicate when the process is complete. A ringback tone is sent from the mobile node 110 in 726 and a voice path between the mobile node 110 and the MGCF/MGW is setup in 728.

Figure 25:
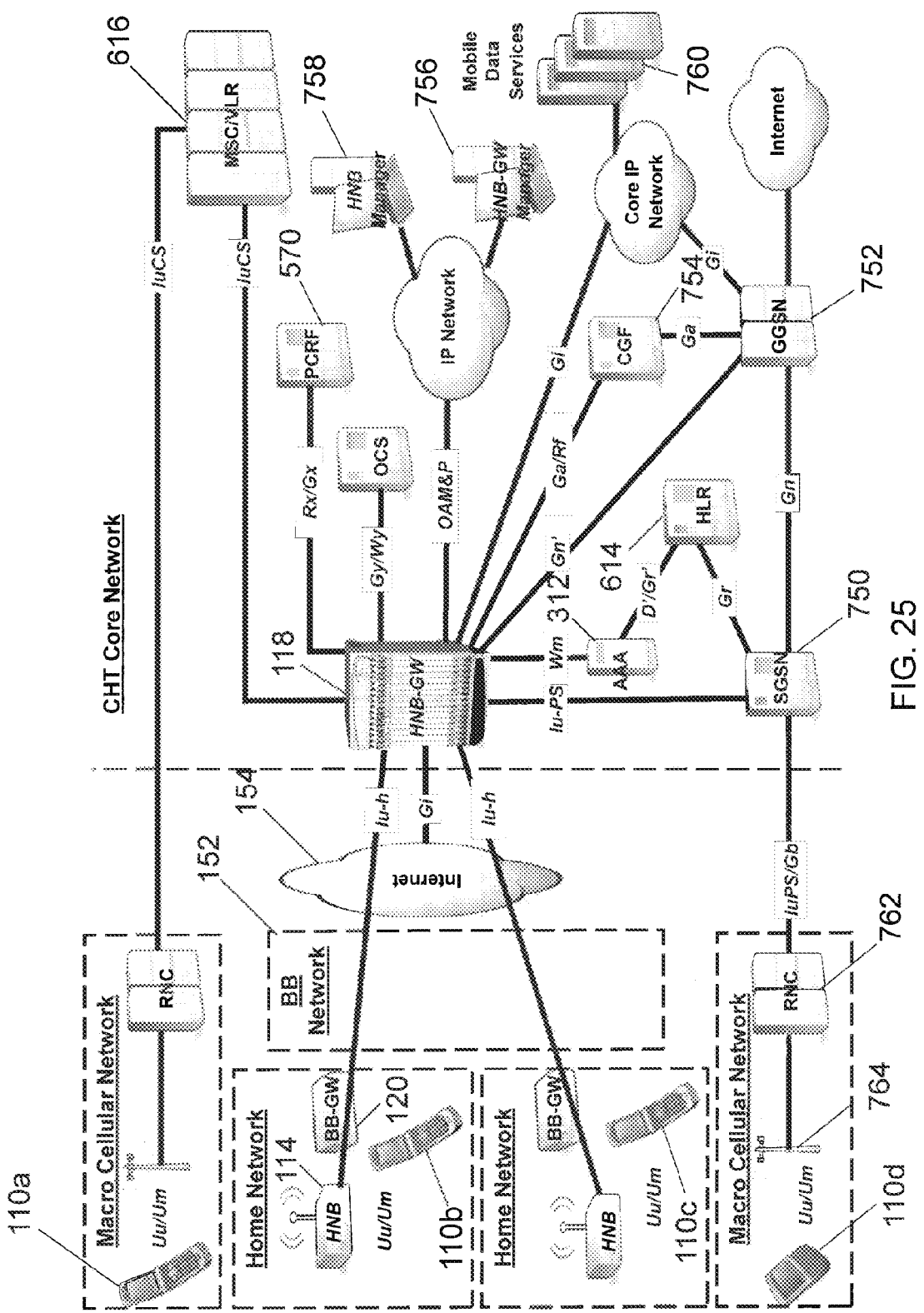

FIG. 25 illustrates a network architecture for a UMTS based network femtocell implementation in accordance with certain embodiments. FIG. 25 includes mobile nodes 110a, 110b, 110c, and 110d, a UTMS capable femto cell 114, a home gateway 120, a broadband network 152, an internet 154, a gateway 118 implementing various functions, a policy and charging rules function 570, a serving gateway support node (SGSN) 750, a gateway GPRS support node (GGSN) 752, a charging gateway function 754, a home nodeB gateway manager 756, a home nodeB manager 758 a mobile data services server 760, a radio network controller 762, a nodeB 764, an AAA server 312, a HLR 614, and a MSC/VLR 616. The gateway 118 provides a femto gateway functionality which provides network connectivity of the femto cell 114 or home NodeB (HNB) to the core network. The gateway 118 appears as a legacy radio network controller (RNC) to the core network (using existing Iu interfaces for core network connectivity) and connects the femto cell 114 using the Iu-h interface. Functionalities, such as the management of the legacy UTRAN identifiers (LAI, SAI, RND-Id, etc) towards the core network, and Iu-h interface management, are performed by gateway 118.

The femto cell 114 acting as a HNB can provide a standard radio interface (Uu) for mobile node connectivity. Femto cell 114 uses the Iu-h interface over un-trusted IP networks to provide access to the core network through gateway 118. Femto cell 114 supports both the BTS and RNC like functions in a low cost plug-n-play form factor. The femto cell 114 can also support GSM based mobile nodes. The functionality provided by gateway 118 can also be split to allow other network devices to provide the functionality such as management of the femto cell or other services. The femto cell manager 758 can be provided for management of the gateway and femto cell using the Iu-hm reference point to communicate with the femto cell via the gateway. In other embodiments, this functionality is provided in the gateway 118. The Iu-hm reference point can use existing device management techniques as described in DSL Forum technical specifications TR-069, in some embodiments. Also as shown, gateway 118 can communicate with many different network devices. For example, gateway 118 can provide access to the circuit switched network through the IuCS interface, can provide access to the packet switched network through the Iu-PS, and can communicate with a GGSN 752 through the Gn' interface.

Figure 26:
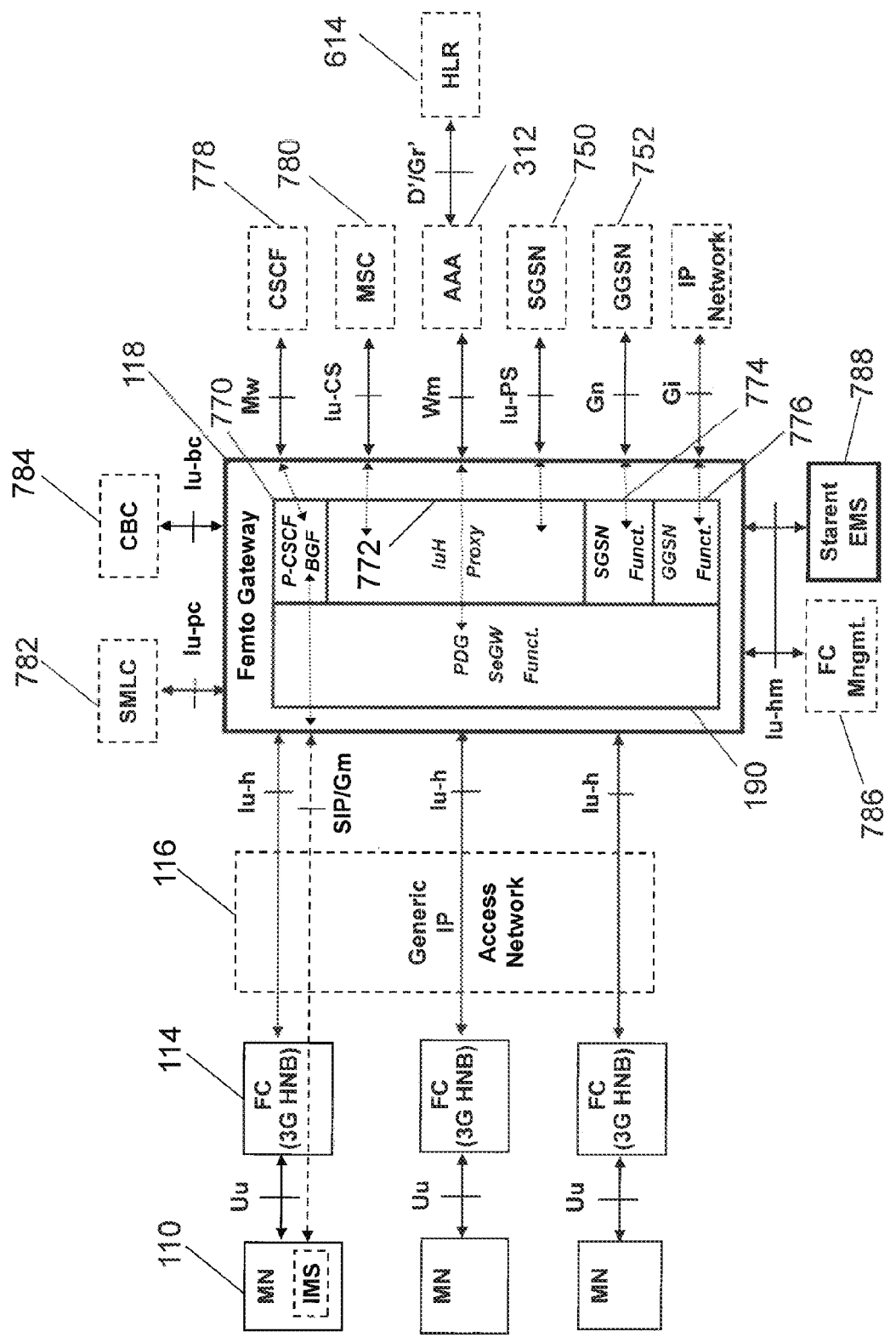

FIG. 26 illustrates a functional view of an integrated gateway that provides femto services in accordance with some embodiments. FIG. 26 includes a mobile node 110, a femto cell (FC) 114, a broadband network 116, a gateway 118 that provides many functionalities, a call session control function (CSCF) 778, a mobile switching center (MSC) 780, an AAA server 312, a SGSN 750, a GGSN 752, a HLR 614, a serving mobile location center (SMLC) 782, cell broadcast center (CBC) 784, femto cell manager 786, and element management system (EMS) 788. The gateway provides a number of functionalities including a security gateway (SeGW) 190, a proxy-call session control function (P-CSCF)/border gateway function (BCF) 770, a IuH Proxy 772, a SGSN function 774, and a GGSN function 776. The P-CSCF/BGF 770, IuH proxy 772, SGSN function 774, and GGSN function 776 can act as proxies for the femto cells by aggregating signals and communicating on behalf of the femto cells to hide the femto cells from the core network, while performing other functions as well.

The SMLC 782 is either a separate network element or integrated functionality in the BSC (Base Station Controller) that contains the functionality required to support LCS (LoCation Services). The SMLC 782 can manage the overall co-ordination and scheduling of resources needed for the location of a mobile. It also calculates the final location estimate and estimates the achieved accuracy. The SMLC 782 may control one or more LMU (Location Measurement Unit) for the purpose of obtaining radio interface measurements to locate or help locate the mobile node subscribers in the area that it serves. The CBC 784 is the functional entity within the network that is responsible for the generation of cell broadcast information. The Starent Web Element Management System, or EMS 788, is a centralized service and network element management functionality that can controls the multimedia core platforms in a gateway. Starent Web EMS is a multi-service element manager, which provides fault, configuration, accounting, performance and security functions through a graphical user interface. Starent Web EMS enables mobile operators to monitor, manage and control the performance of the ST16 and ST40, as well as integrate and interoperate with other components and network management systems. The Starent Web EMS also provides a variety of performance and operation records based on mobile operator defined parameters.

Figure 27:
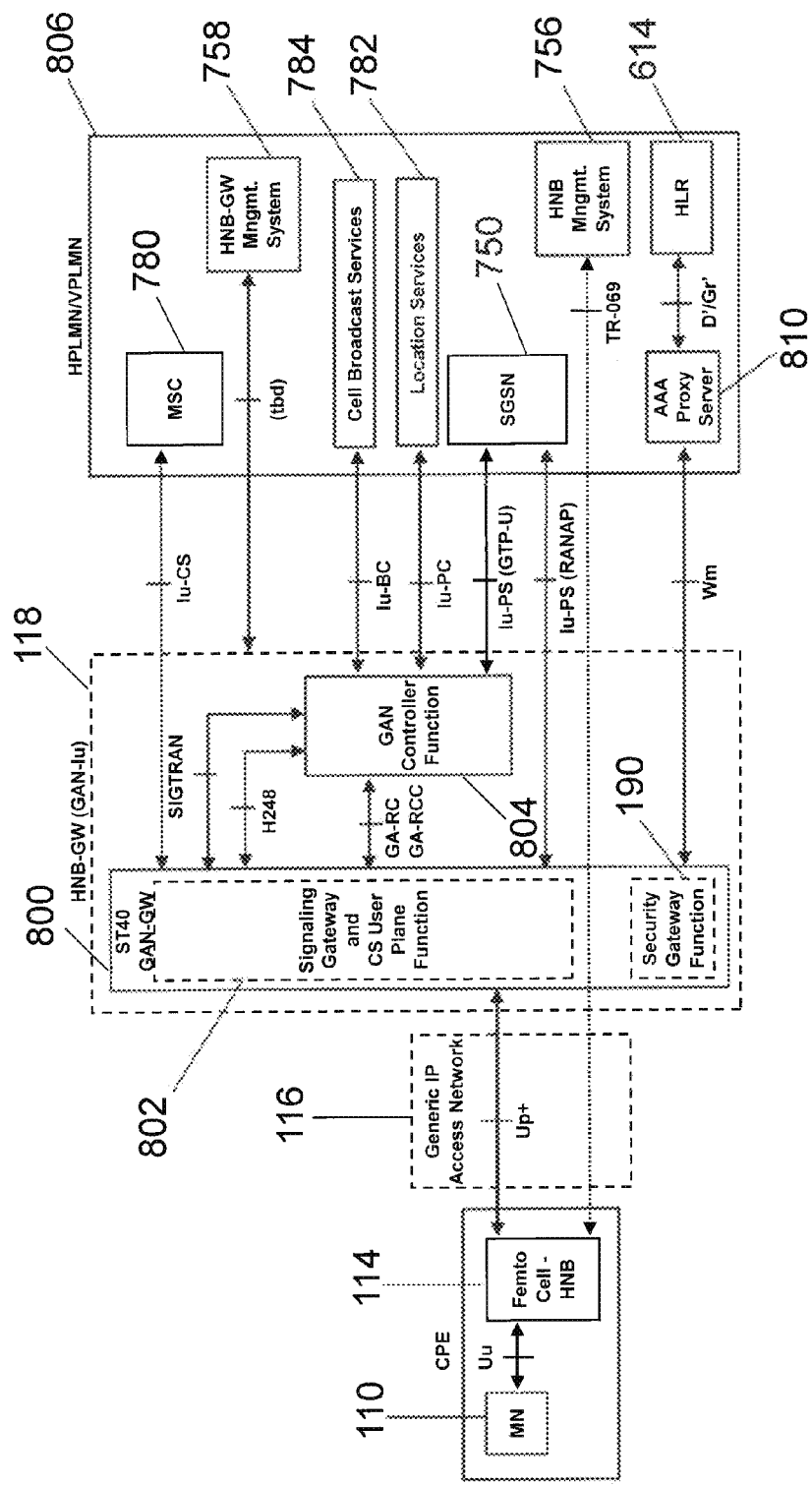

FIG. 27 illustrates a functional view of a gateway that provides femto services using a controller function in accordance with certain embodiments. FIG. 27 includes a mobile node 110, a femto cell (FC) 114, a broadband network 116, a gateway 118 that provides many functionalities, a home public land mobile network (HPLMN)/visited public land mobile network (VPLMN) 806, a mobile switching center (MSC) 780, a proxy AAA server 810, a SGSN 750, a HLR 614, location services 782, cell broadcast services 784, femto cell manager 756, and femto gateway manager 758. Gateway 118 can provide functionalities such as generic access controller gateway (GAN-GW) signaling gateway and circuit switched user plane function 802, security gateway 190, and GAN controller function 804. The basis of the architecture of the FIG. 27 is a functional architecture utilizing generic access network (GAN) Iu interface mode. In this embodiments, the femto cell providing HNB (home NodeB) services is responsible for the radio aspects and the gateway 118 is responsible for CN (core network) connectivity. Further, the femto gateway is decomposed into two functional elements, where the GAN Gateway (GAN-GW) 802 provides Security Gateway Function 190 and CS/PS Bearer Function 802, and a GAN Controller (GAN-C) 804 provides CS/PS (circuit switch/packet switch) control function.

The architecture of FIG. 27 provides co-existence with the UMTS Terrestrial Radio Access Network (UTRAN) and interconnection with the Core Network (CN) via the standardized interfaces defined for UTRAN: a Iu-cs interface for circuit switched services, Iu-ps interface for packet switched services, Iu-pc interface for supporting location services, and Iu-bc interface for supporting cell broadcast services. The femto cell implementing a HNB provides a standard radio interface (Uu) for mobile node connectivity and provides the radio access network connectivity to the mobile node using the GAN Iu mode Up interface as defined in TS 43.318, which is incorporated by reference herein. The gateway utilizes a Generic Access Network Controller (GAN-C) defined for GAN Iu operation. The functionality of the GAN-C defined for GAN Iu operation is modified to allow a the HNB (as opposed to a dual mode mobile node) to be connected over the generic IP access network.

The gateway provides interworking between the Iu interfaces and the GAN Iu mode Up interface using the following control plane and user plane functionality. The gateway provides security gateway function 190 for the set-up of a secure IPSec tunnel to the femto cell for mutual authentication, encryption and data integrity, and a SEGW Encapsulating Security Payload (ESP) processing of Up interface control plane packets. The gateway and GAN controller 804 can provide GAN Discovery support and Default gateway assignment. The GAN-C 804 can provide GAN Registration support including provision of GAN system information to the femto cell and possible redirection to a different gateway (e.g., Serving HNB-GW), management of GAN bearer paths for CS and PS services, including the establishment, administration, and release of control and user plane bearers between through the interworking of Up and IuCS/PS control plane (e.g. RANAP), support for paging and handover procedures, and transparent transfer of L3 messages (i.e., NAS protocols) between the mobile node and core network.

In the user plane functionality, the gateway can provide Encapsulating Security Payload (ESP) processing of Up interface user plane packets, interworking of CS bearers between the Up interface (RTP/AMR) and the Iu-CS user plane interface Iu-UP, and interworking of packet switched user data between the Up interface and the Iu-PS interface (GTP-U). GAN Gateway 800 can also provide interworking between RTP/UDP and the CS bearers over the Iu-CS interface which supports either ATM (AAL2) or IP (RTP) transport. This inter-working is controlled by the GAN-Controller 804 via H.248.1 protocol and relevant packages.

As shown in FIG. 27, transaction control (e.g. CC, SM) and user services are provided by the core network (e.g. MSC/VLR and the SGSN/GGSN), however in some embodiments, as shown in FIG. 26, these features can be provided by the gateway in an integrated fashion. AAA server 810 is used to authenticate the femto cell when it sets up a secure tunnel and the Wm interface can be used for these communications. The femto cell management system (HNB mngmt. System) 756 manages the configuration of femto cells in a scalable manner and can be channeled via the Up interface's secure tunnel.

The GAN operation is modified to support an interface between the HNB femto cell and the gateway. For example, the GA-RC REGISTER REQUEST message is modified with an additional IE to include HNB femto cell identity (e.g. IMSI). The GAN Classmark IE is updated with additional device types for femto cell/femto cell-MN and also an Emergency Call request flag (for unauthorized MN emergency call registration). The RAB Configuration attribute in GA-RRC ACTIVATE CHANNEL and GA-RRC ACTIVATE CHANNEL ACK message is extended to transparently relay radio attributes between HNB femto cell and CN via the gateway. The GA-RRC RELOCATION INFORMATION message is extended to relay radio attributes between HNB femto cell and the gateway. The GA-RRC SECURITY MODE COMMAND is extended to include CK, IK so that the HNB femto cell can protect the air interface. Additionally, the use of a single IPSEC tunnel between HNB femto cell and gateway for multiplexing separate mobile node sessions is provided.

Figure 28:
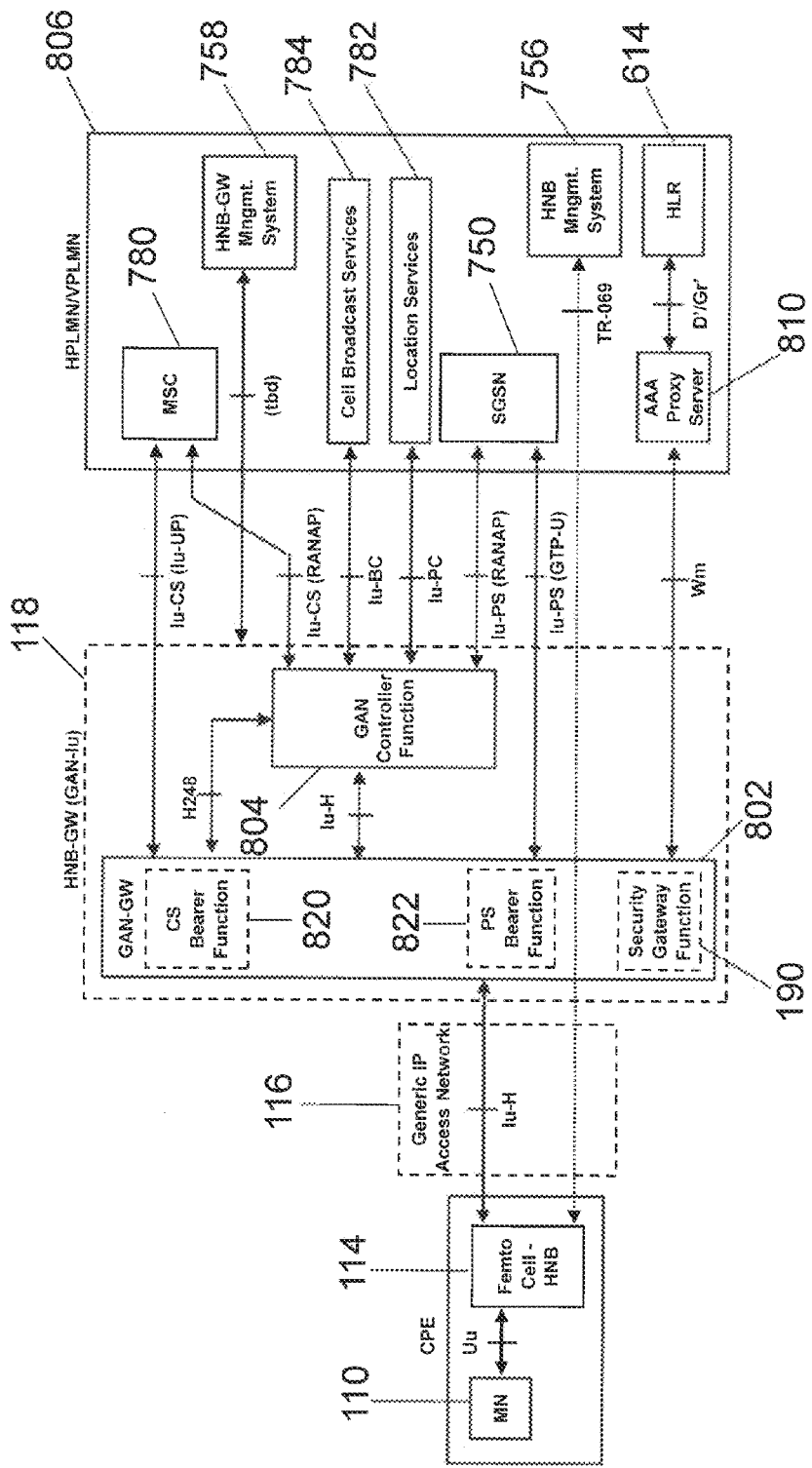

FIG. 28 illustrates a functional view of a gateway that provides femto services using a controller function and a Iu-H interface in accordance with certain embodiments. FIG. 28 includes a mobile node 110, a femto cell (FC) 114, a broadband network 116, a gateway 118 that provides many functionalities, a home public land mobile network (HPLMN)/visited public land mobile network (VPLMN) 806, a mobile switching center (MSC) 780, a proxy AAA server 810, a SGSN 750, a HLR 614, location services 782, cell broadcast services 784, femto cell manager 756, and femto gateway manager 758. Gateway 118 can provide functionalities such as generic access controller gateway (GAN-GW) function 802, security gateway 190, GAN controller function 804, CS bearer function 820, and PS bearer function 822. In FIG. 28 a Iu-H interface is used between femto cell 114 and gateway 118 along with the GAN controller. Additionally, a circuit switched (CS) bearer function is provided for handling CS bearer traffic to the core network and a packet switched (PS) bearer function is provided for handling PS bearer traffic to the core network. The GAN controller functions in the way described above with reference to FIG. 27 and gateway 118 interacts with the core network (HPLMN/VPLMN) in a similar fashion.

In some embodiments, a gateway discovery mechanism is provided. The gateway discovery mechanism provides an automatic way for the gateway and femto cell to determine the most appropriate serving gateway to provide femto gateway services in the HPLMN of the femto cell. The serving gateway is the gateway handling a particular femto cell. The discovery mechanism accounts for parameters such as the femto cell identity and location. The gateway discovery service is one of the functions provided by all or a subset of the gateways in the service provider network. Both the gateway and femto cell can be pre-configured with the network address associated with the gateway discovery service (e.g., an FQDN that is DNS-resolved to the IP address of one of the gateways providing gateway discovery services). It is also possible to derive the gateway discovery service network address using the femto cell credentials such as the IMSI or other information, in some embodiments.

Figure 29:
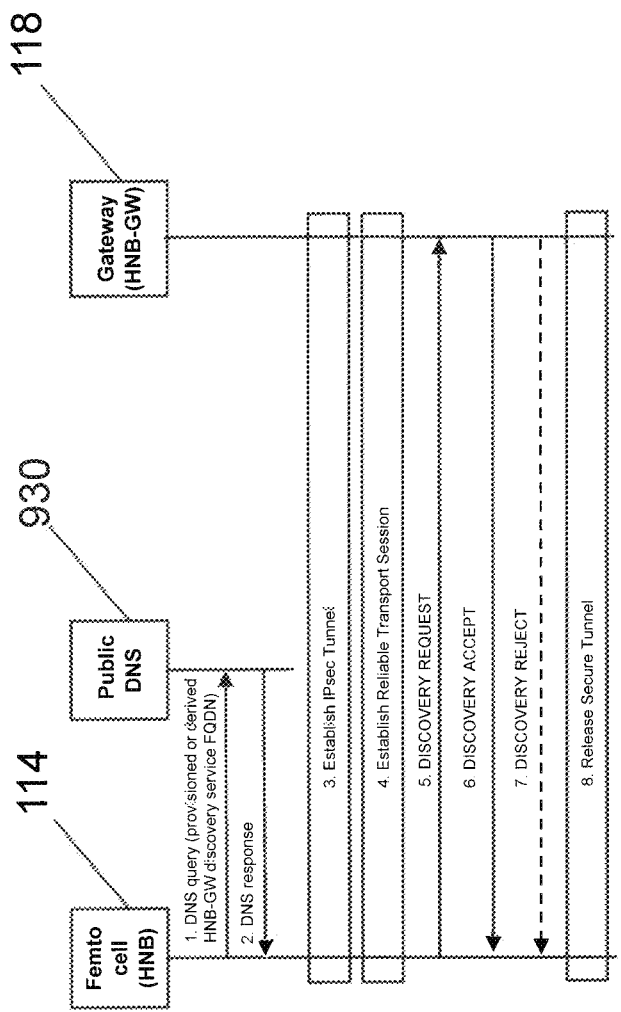
FIG. 29 illustrates femto cell discovery when the femto cell has no stored gateway address and performs a gateway discovery procedure in accordance with some embodiments.

FIG. 29 illustrates femto cell discovery when the femto cell has no stored gateway address and performs a gateway discovery procedure in accordance with some embodiments. FIG. 29 includes a femto cell 114, a public DNS 930, and a gateway 118. In messaging 1, the femto cell 114 may derive a FQDN of the gateway discovery service, and perform a DNS query (via the generic IP access network interface) to resolve the FQDN to an IP address. In messaging 2, the DNS Server returns a response including the IP Address of a gateway that provides gateway discovery service. Alternatively, if the femto cell 114 already has the IP address for the gateway discovery service, the messaging 1 and 2 may be omitted. In step 3, the femto cell establishes a secure tunnel to the gateway utilizing IPsec. In messaging 4, the femto cell sets up a reliable transport session to a port on the gateway. If a GAN interface is used, the transport session is TCP and if IuH is used, SCTP is the transport session protocol. In messaging 5, the femto cell queries the gateway with the discovery service for the address of the serving gateway, using the DISCOVERY REQUEST message. There are differences between Up and IuH interface embodiments. In the IuH interface, the femto cell provides location information via use of one or more of the following mechanisms: 1) detected macro coverage information (e.g. GERAN or UTRAN cell information), 2) geographical co-ordinates (e.g. via use of GPS, etc), 3) Internet connectivity information (e.g. IP address or DSL Line Identifier). It is possible that none of the aforementioned information is available, so the discovery mechanism supports femto cell assignment to a default gateway for such cases. Alternately, discovery of serving gateway can be denied until valid location information is provided. In messaging 6, the gateway returns the DISCOVERY ACCEPT message, using the information provided by the femto cell to determine the address of the most appropriate serving gateway. The DISCOVERY ACCEPT message may also indicate whether the serving gateway address information is stored by the femto cell for future access (i.e., versus performing gateway discovery each time the femto cell is power-cycled). Alternatively, if the gateway cannot accept the DISCOVERY REQUEST message in messaging 7, the gateway returns a DISCOVERY REJECT message indicating the reject cause. In messaging 8, the secure tunnel to the gateway is released.

After the femto cell determines the serving gateway to establish a femto session with, the femto cell attempts to register with that serving gateway. Registration can inform the serving gateway that a femto cell is now connected and is available at a particular IP address when the interface IuH is used between the femto cell and the gateway. If GAN-Iu is used, then the femto cell can inform the GAN-Controller of the serving gateway. The serving gateway or GAN-Controller provides the femto cell with the network operating parameters (such as LAI, RNC-Id, network operating mode, etc) associated with the femto cell service at the current location which is coordinated between the femto cell and serving gateway. The femto cell utilizes the information to transmit these network operating parameters to the mobile node as part of the System Information Broadcast. This allows the access network to provide a network based service access control (SAC) (e.g., femto cell restriction and location verification). It also provides a mechanism to redirect the femto cell to a different serving gateway (e.g. based on incoming location, current load on the gateway, etc).

Figure 30:
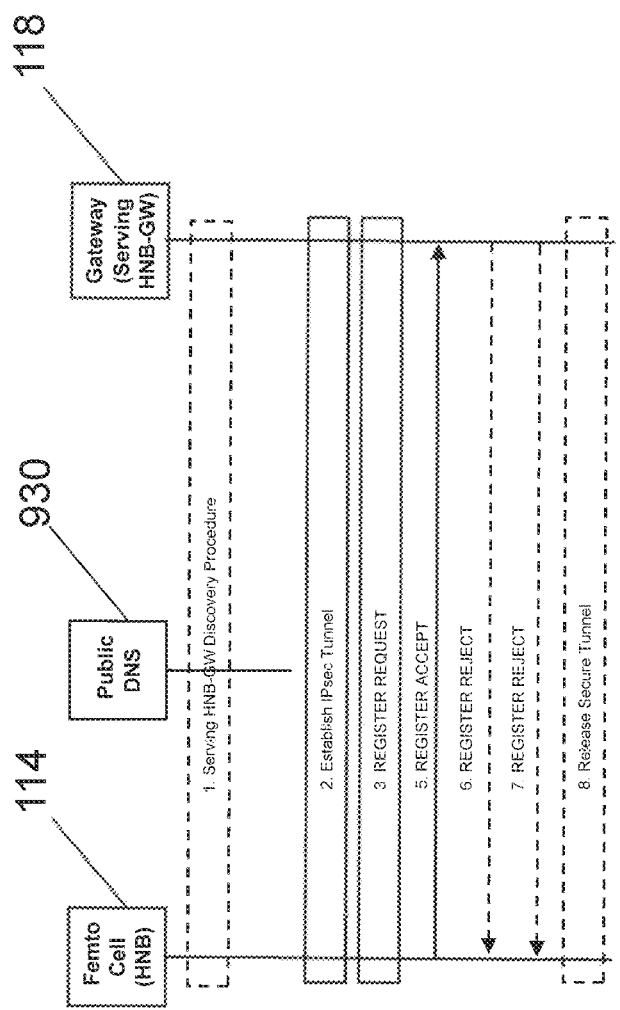
FIG. 30 illustrates a femto cell registering with a serving gateway in accordance with certain embodiments.

FIG. 30 illustrates a femto cell registering with a serving gateway and obtains network operating parameters based on a specific location and specific serving gateway in accordance with certain embodiments. FIG. 30 includes a femto cell 114, a public DNS 930, and a gateway 118. In messaging 1, if the femto cell 114 does not have stored information on the serving gateway 118, it performs the gateway discovery procedure as described with reference to FIG. 29. In messaging 2, the femto cell 114 establishes a secure tunnel to the serving gateway 118. This step may be omitted if a secure tunnel is being reused from an earlier discovery or registration procedure. In messaging 3, the femto sets up a reliable transport session (TCP or SCTP connection) to a well-defined port on the serving gateway 118. The femto cell 114 then attempts to register with the serving gateway using a REGISTRATION REQUEST message. The message includes registration type, location information, and femto cell identity. The registration type indicates the end device being registered. The location information indicates physical location and can provide the information using one of the following mechanisms: detected macro coverage information, geographical co-ordinates, internet connectivity information. The femto cell 114 identity is, for example, the IMSI of the (U)SIM associated with the femto cell. In messaging 5, the gateway may use the information from the REGISTER REQUEST message to perform access control of the femto cell (e.g. whether a particular femto cell is allowed to operate in a given location, etc). If the gateway accepts the registration attempt it shall respond with a REGISTER ACCEPT message and includes the necessary system information for the femto cell functionality (e.g. Location Area information, network operation mode, etc). In messaging 6, the gateway may reject the request (e.g. due to network congestion, blacklisted HNB, unauthorized location, etc). In this case, it shall respond with a REGISTER REJECT indicating the reject cause. Alternatively, in messaging 7, if the gateway is going to redirect the femto cell to (another) serving gateway (not shown), it responds with a REGISTER REDIRECT message to provide information about the target gateway. In messaging 8, the femto cell 114 releases the transport session as well as the secure tunnel if it does not receive a REGISTER ACCEPT message in response.

Registration of the mobile node to a serving gateway by a femto cell serves the following purposes. It informs the gateway that a mobile node is now connected through a particular femto cell and is available at a particular IP address. The gateway keeps track of this information for the purposes of "directed paging" (e.g. for mobile-terminated calls). Registration of the mobile node allows the gateway to provide network based service access control (SAC) functionality. The gateway provides authorization and enforcement based on the operator's service access control polices. Network based SAC can be used to insure that a particular mobile node is indeed authorized service over a particular femto cell. It allows the gateway to provide mobile node specific service parameters to the femto cell (e.g. differentiated billing for home users versus guest users). Registration of the mobile node provides a mechanism for indicating emergency service. With this explicit indication, the gateway can override the normal service access controls for this mobile node but the gateway may still restrict the mobile node to only emergency services for fraud prevention. In addition, this emergency services indicator allows the gateway to support emergency call-backs by targeting the correct femto cell over which the emergency call originated.

Figure 31:
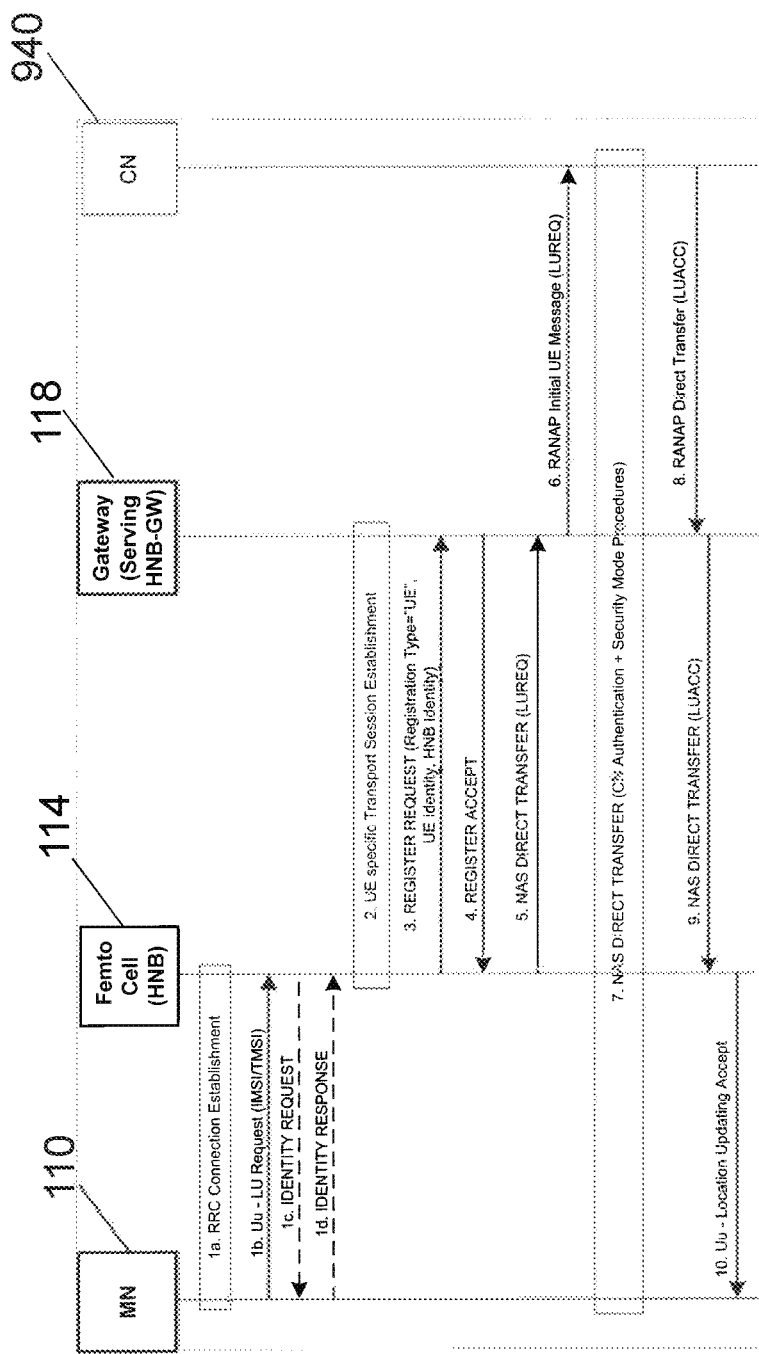
FIG. 31 illustrates a registration of a mobile node in accordance with certain embodiments.

FIG. 31 illustrates a registration of a mobile node in accordance with certain embodiments. FIG. 31 includes a mobile node 110, a femto cell 114, a serving gateway 118, and a core network. The registration can be triggered when the mobile node attempts to access the femto cell the first time with an initial NAS (network access server) message (i.e., Location Update Request). In messaging 1, the mobile node 110 initiates a LU (location update) procedure by establishing an RRC (radio resource control) connection with the femto cell (it is assumed that the femto cell has a location area that is distinct from its neighboring femto cell and macro cells to trigger an initial message upon camping on the femto cell). The mobile node then transmits a NAS message carrying the Location Updating Request message with some form of identity (IMSI/TMSI). The femto cell requests the IMSI (or other identity information) of the mobile node in an identity request message. (Note: For networks supporting network mode 1, the mobile node could trigger a combined Routing Area and Location Area update request instead of the initial LU request). The femto cell may also optionally perform local access control for faster rejection of those mobile nodes not authorized to access the particular femto cell. Unauthorized mobile node are permitted registration with the gateway.

In messaging 2, the femto cell establishes a separate reliable transport session (e.g. TCP or SCTP connection) for each mobile node. In messaging 3, the femto cell attempts to register the mobile node 110 on the serving gateway 118 over the mobile node specific transport session by transmitting the REGISTER REQUEST. The message can include registration type, mobile node identity, and femto cell identity. In messaging 4, the serving gateway 118 may perform access control for the particular mobile node attempting to utilize the specific femto cell. If the serving gateway accepts the registration attempt it responds with a REGISTER ACCEPT message back to the femto cell. In messaging 5, the femto cell does a NAS relay of the Location Updating Request message from the mobile node to the serving gateway 118 via the mobile node transport session established in messaging 2. In messaging 6, the serving gateway 118 establishes a SCCP connection to the core network and forwards the Location Update request (or the combined RA/LA update request) NAS PDU to the core network using the RANAP Initial UE Message. Subsequent NAS messages between the mobile node and core network are sent between the serving gateway 118 and core network using the RANAP Direct Transfer message. In messaging 7, the core network authenticates the mobile node using standard authentication procedures. The core network also initiates the Security Mode Control procedure. The NAS messages are relayed transparently by the serving gateway 118 and femto cell 114 between the mobile node and the core network. In messaging 8, the core network indicates it has received the location update and it will accept the location update using the Location Update Accept message to the serving gateway 118. In messaging 9, the serving gateway 118 relays the LU accept NAS message to the femto cell. In messaging 10, the femto cell 114 relays the LU accept message over the air interface to the mobile node.

Figure 32:
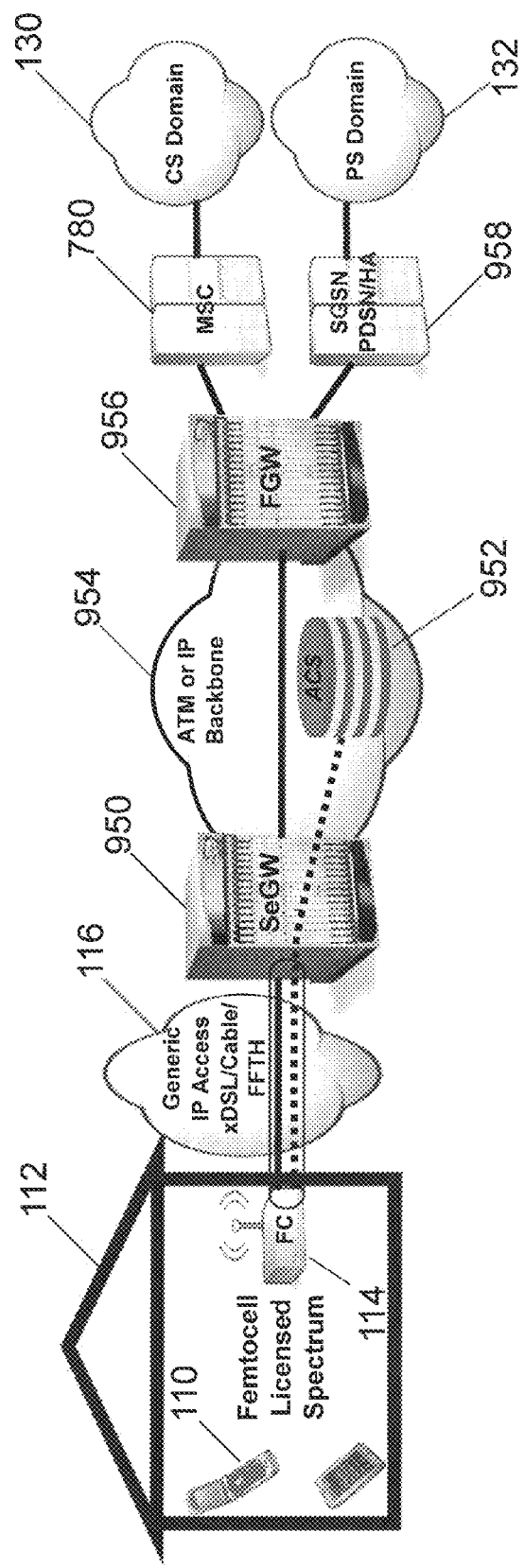

FIG. 32 illustrates a decomposed architecture where one gateway acts as a security gateway and another gateway implements a femto gateway in accordance with certain embodiments. FIG. 32 includes a mobile node 110, a femto cell 114, a broadband network 116, a gateway implementing a security gateway 950, an auto-configuration server (ACS) 952, an ATM or IP backbone network 954, a gateway implementing a femto gateway 956, a MSC 780, a SGSN/PDSN/HA 958, a circuit switched domain 130, and a packet switched domain 132. The security gateway 950 can provide secure communications over an un-secure broadband network. In some embodiments, an ACS 952 is used to auto-configure the femto cell when plugged in. The ACS 952 can utilize TR-069 to setup femto cells connected to the network and can provide plug-in-play capabilities. The ACS can enforce location and direct the femto cell to the appropriate gateway (such as gateway 956). In other embodiments, as mentioned above, this functionality can be handled by a gateway. The femto gateway 956 can provide connectivity to the CS domain 130 through MSC 780 and the PS domain 132 through SGSN/PDSN/HA 958. The decomposed architecture of FIG. 32 can be implemented with two gateways with only some functionalities enabled in each gateway device to implement the decomposed architecture.

Figure 33:
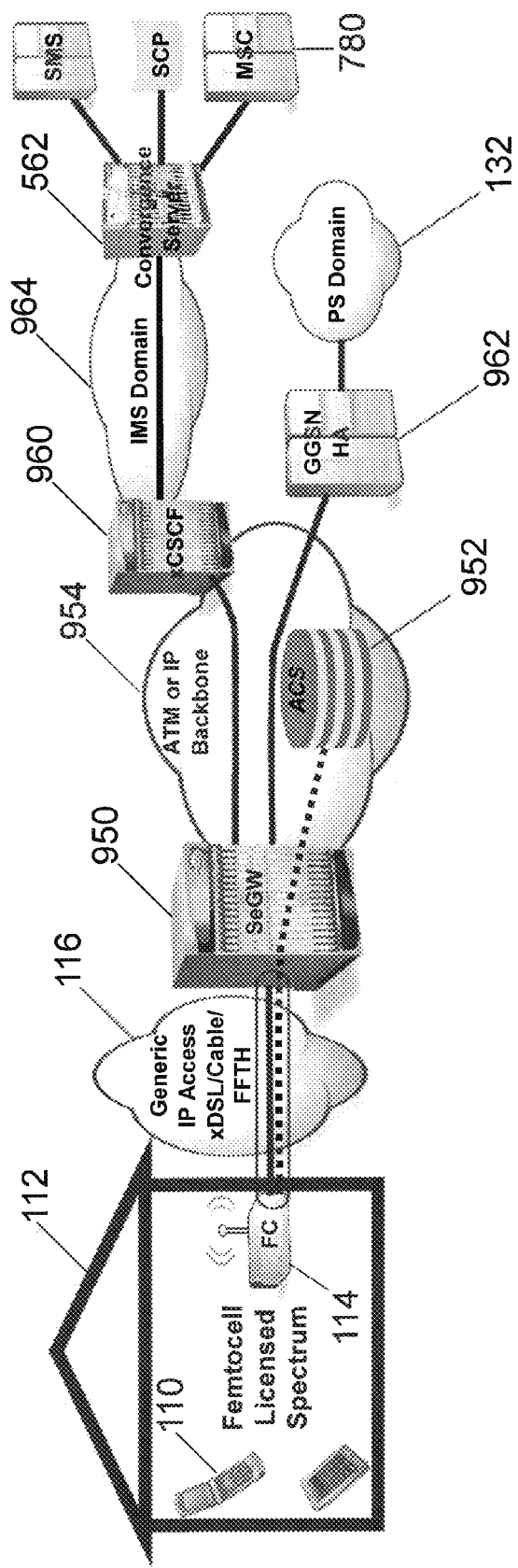

FIG. 33 illustrates a security gateway architecture in communication with an IMS domain in accordance with certain embodiments. FIG. 33 includes a mobile node 110, a femto cell 114, a broadband network 116, a gateway implementing a security gateway 950, an auto-configuration server (ACS) 952, an ATM or IP backbone network 954, a call session control function (CSCF) 960, a GGSN/HA 962, a PS domain 132, an IMS domain 964, a convergence server 562, and a MSC 780. The security gateway 950 can communicate with a CSCF 960, which can be implemented in a gateway, and establish connectivity to the IMS domain 964. A convergence server 562, which can also be implemented in a gateway, can establish connectivity with various network devices such as MSC 780. The security gateway 950 can also communicate with a GGSN/HA 962 to establish connectivity to a PS domain. A gateway, which provides various functionalities such as a security gateway 950, can also implement a SGSN or a PDSN functionality to allow connectivity directly to a GGSN/HA 962.

Figure 34:
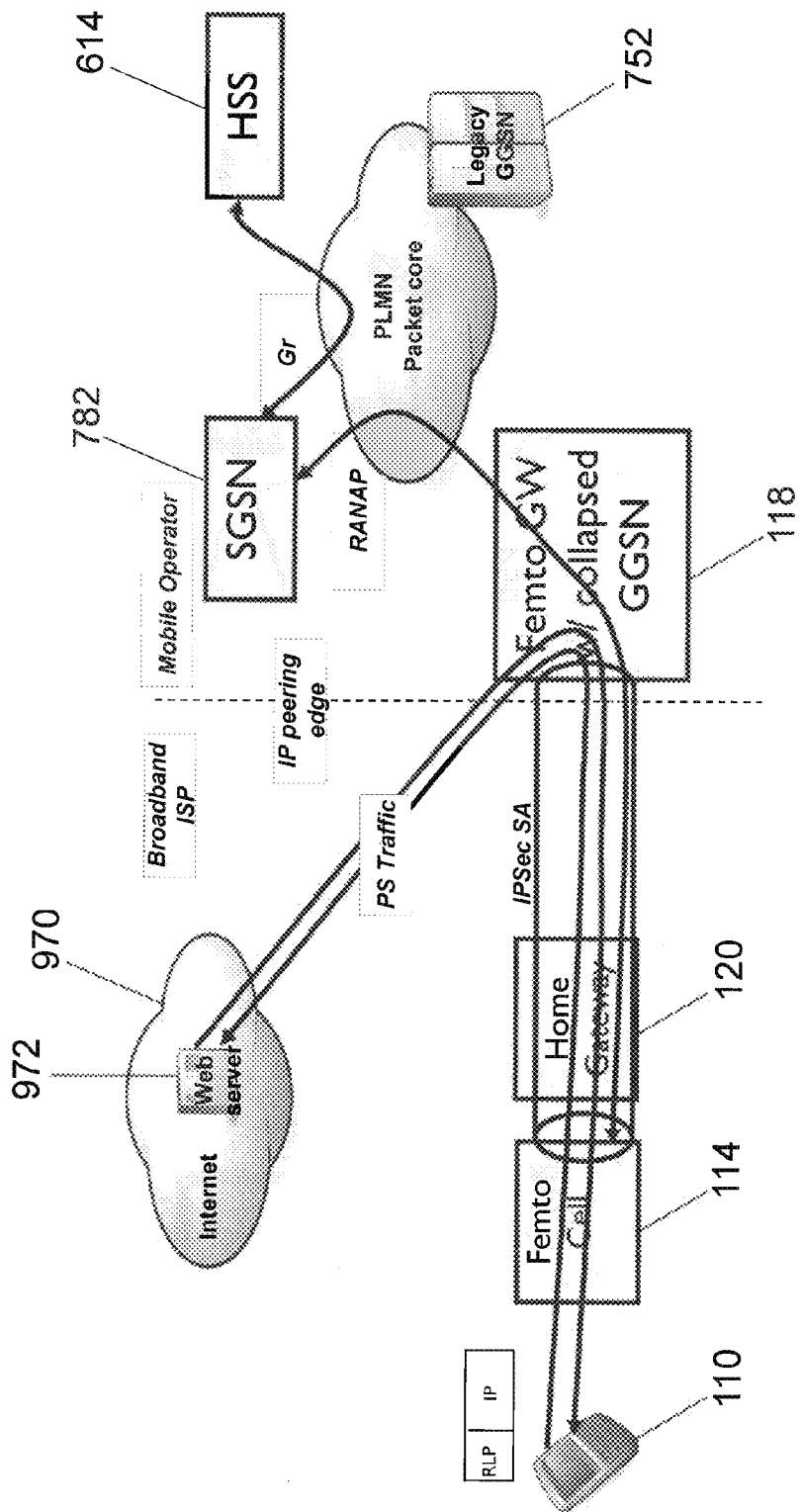
FIG. 34 illustrates another femto based architecture that supports legacy GSM networks in accordance with certain embodiments.

FIG. 34 illustrates another femto based architecture that supports legacy GSM networks in accordance with certain embodiments. FIG. 34 includes mobile node 110, femto cell 114, home gateway 120, gateway 118, internet 970, web server 972, SGSN 782, HSS 614, and legacy GGSN 752. A secure tunnel is established between femto cell 114 and gateway 118, which allows communications from mobile node 110 to the mobile operator and the internet 970. The gateway 118 can direct packet switched (PS) traffic to internet 970 and web server 972. The gateway 118 can also direct call session traffic to the mobile operator's PLMN and provide registration of the mobile node.

The challenges inherent in using packet networks for interactive voice communications arise from the real-time characteristics of speech. The three most important factors that affect speech quality are packet loss, delay, and jitter. The very nature of public infrastructure such as the Internet implies that the level of packet loss and the amount of delay and jitter vary greatly with the network, location, and time. Packet losses can create gaps in the voice communication resulting in clicks and muted or unintelligible speech. Packet loss may be caused by several sources. For example, a router may intentionally discard a packet because it was damaged during transmission or timed out of a queue due to congestion problems. Congestion can also contribute to latency and jitter, which can make two-way voice conversation difficult. Such QoS problems inherent to voice-over-Internet, can be improved by providing robustness to packet loss, delay, and jitter at the edge devices in the femto cell and gateway. Some functionalities provided by the femto cell and gateway to provide QoS are providing a payload format supporting transmission of multiple channels, multiple frames per payload, and use of fast codec. Error correction codes (e.g., forward error correction (FEC), RTP redundancy, and frame inter-leaving) implemented by the femto cell and gateway can provide robustness against packet loss. Unequal error protection and detection (UEP and UED) can be used to provide robustness against bit errors over IP networks.

In some embodiments, the consumer broadband connection may have a limitation on the uplink bandwidth that it can support, which can restrict the number of simultaneous mobile nodes communicating through the secure tunnel. This can be solved by multiplexing multiple mobile node sessions over the same secure tunnel by transporting several RTP/NbFP/codec payloads of different user plane connections within one packet. The multiplexing can occur with packets of the same destination address and DiffServ class. Additional bandwidth reduction can be accomplished by supporting RTP header compression. Another option is to attempt to hand-out voice calls that are not supported by uplink restrictions to other suitable neighboring cells (i.e., other macro or femto cells) that are available. The gateway can initiate the hand-out based on the degradation of the voice quality (e.g., packet loss). The gateway also supports a policy server interface to control provide QoS policies across a population of femto subscribers.

Figure 35:
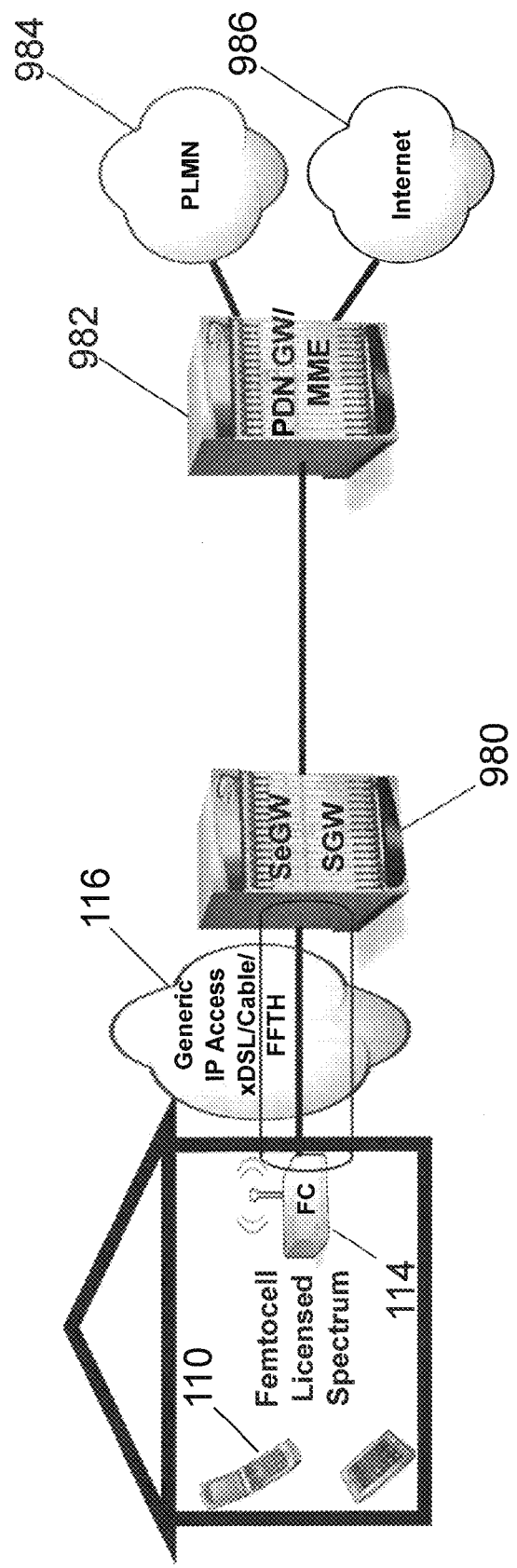

FIG. 35 illustrates a femto architecture that supports long term evolution (LTE) networks in accordance with certain embodiments. FIG. 35 includes mobile node 110, femto cell 114, a gateway implementing a security gateway and serving gateway 980, a gateway implementing a packet data network gateway (PDN GW)/mobility management entity (MME) 982, public land mobile network (PLMN) 984, and Internet 986. The gateway can implement a serving gateway that is in communication with a PDN GW/MME 982 to provide access to an evolved UMTS terrestrial radio access network (E-UTRAN). In this embodiments, femto cell 114 is providing eNobeB coverage to mobile nodes and providing access to the E-UTRAN over a broadband network. In some embodiments, security gateway can provide a secure tunnel to provide connectivity to a serving gateway function over a broadband network 116. Other features provided by a gateway, described herein are also available for the gateway providing LTE architecture connectivity.

The gateway described above is implemented in a chassis in some embodiments. This chassis can implement multiple and different integrated functionalities. In some embodiments, an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

Figure 36:
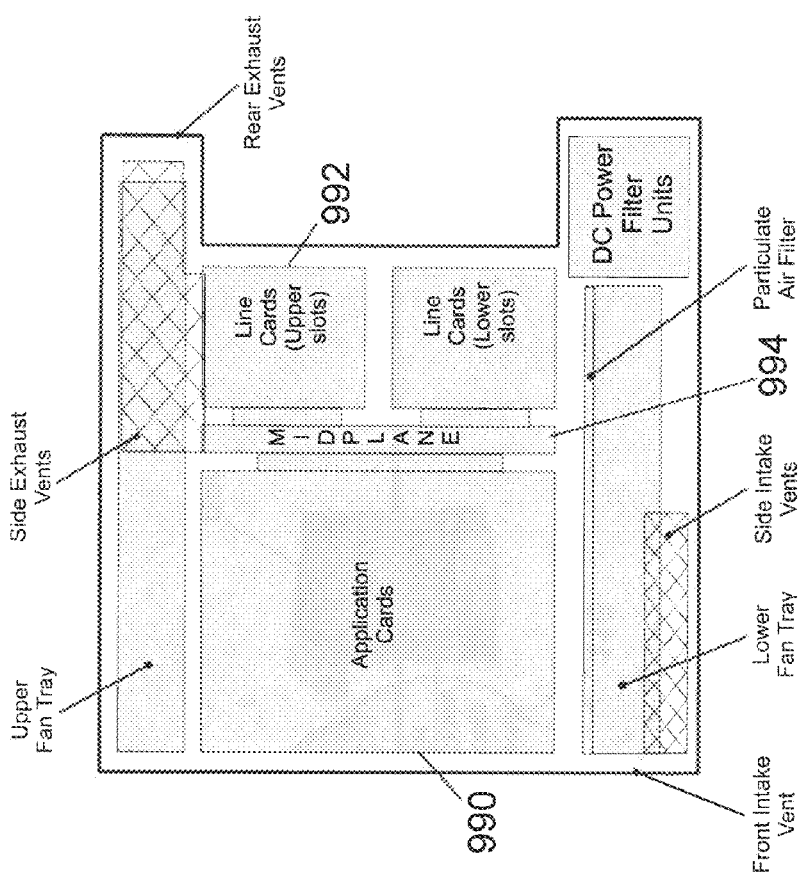
FIG. 36 illustrates positioning of cards in the chassis in accordance with some embodiments.

The features of a chassis that implements a gateway, in accordance with some embodiments, are further described below. FIG. 36 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least four types of application cards: a switch processor card, a system management card, a packet service card, and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations. The system management card is a system control and management card for managing and controlling other cards in the gateway device. The packet services card is a high-speed processing card that provides multi-threaded point-to-point, packet data processing, and context processing capabilities, among other things.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDN GW, SGW, PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A method comprising:
receiving, at a femto gateway, a service request from a first femto cell on behalf of a first mobile device coupled to the first femto cell, the service request requesting the femto gateway to provide a communication channel between the first mobile device and a second mobile device coupled to an access point, wherein the service request is received through a secure tunnel established over a fixed broadband network between the femto gateway and the first femto cell;
identifying, at the femto gateway, that the access point is coupled to the femto gateway; and
establishing, by the femto gateway, the communication channel locally such that the communication channel passes through the first femto cell and the access point but not a core network coupled to the femto gateway.

2. The method of claim 1, wherein identifying that the access point is coupled to the femto gateway comprises:
sending, by the femto gateway, a first call initiation message to a convergence server in response to the service request; and
receiving, by the femto gateway, a second call initiation message from the convergence server to cause the femto gateway to establish the communication channel between the first mobile device and the second mobile device.

3. The method of claim 1, further comprising sending, by the femto gateway, a paging request message to the access point to which the second mobile device is coupled in order to initiate the establishment of the communication channel.

4. The method of claim 1, wherein the access point includes a femto cell.

5. The method of claim 4, wherein the communication channel includes a Real Time Protocol (RTP) voice path.

6. The method of claim 1, wherein the access point includes a base station.

7. The method of claim 6, wherein the communication channel includes a two-way A2p voice path.

8. The method of claim 2, wherein the second call initiation message includes a supplementary service profile of the first mobile device.

9. The method of claim 2, wherein the first call initiation message and the second call initiation message include a Session Initiation Protocol (SIP) invite message.

10. The method of claim 1, wherein receiving the service request from a first femto cell includes receiving a A1p content management service request message.

11. The method of claim 10, wherein the A1p content management service request message is received over a generic routing encapsulation (GRE)/Internet Protocol Security (IPSec) tunnel.

12. A gateway comprising:
a femto gateway functionality configured to receive a service request from a first femto cell on behalf of a first mobile device coupled to the first femto cell, the service request requesting the femto gateway functionality to provide a communication channel between the first mobile device and a second mobile device coupled to an access point, identify that the access point is coupled to the femto gateway, and establish the communication channel locally such that the communication channel passes through the first femto cell and the access point but not a core network coupled to the gateway, wherein the service request is received through a secure tunnel established over a fixed broadband network between the femto gateway functionality and the first femto cell.

13. The gateway of claim 12, wherein the femto gateway functionality is configured to send a first call initiation message to a convergence server in response to the service request, and receive a second call initiation message from the convergence server to cause the femto gateway to establish the communication channel between the first mobile device and the second mobile device.

14. The gateway of claim 12, wherein the femto gateway functionality is configured to send a paging request message to the access point to which the second mobile device is coupled in order to initiate the establishment of the communication channel.

15. The gateway of claim 12, wherein the access point includes a femto cell.

16. The gateway of claim 15, wherein the communication channel includes a Real Time Protocol (RTP) voice path.

17. One or more non-transient computer readable media comprising logic that when executed is to:
receive, at a femto gateway, a service request from a first femto cell on behalf of a first mobile device coupled to the first femto cell, the service request requesting the femto gateway to provide a communication channel between the first mobile device and a second mobile device coupled to an access point, wherein the service request is received through a secure tunnel established over a fixed broadband network between the femto gateway and the first femto cell,
identify that the access point is coupled to the femto gateway, and
establish the communication channel locally such that the communication channel passes through the first femto cell and the access point but not a core network coupled to the femto gateway.

18. The media of claim 17, wherein the logic when executed further performs the steps of sending a first call initiation message to a convergence server in response to the service request, and receiving a second call initiation message from the convergence server to cause the femto gateway to establish a communication channel between the first mobile device and the second mobile device.

19. The media of claim 17, wherein the logic when executed further performs the steps of sending a paging request message to the access point to which the second mobile device is coupled in order to initiate the establishment of the communication channel.

20. The media of claim 17, wherein the access point includes a femto cell.

21. The method of claim 1, wherein the secure tunnel established over the fixed broadband network between the femto gateway and the first femto cell is an Internet Protocol Security (IPSec) tunnel.

22. The method of claim 1, wherein the first femto cell comprises a home base transceiver station (BTS), a nodeB, or an e-nodeB.

23. The method of claim 1, wherein the femto gateway is deployed in a network of a mobile operator that is different from a service provider that provides the broadband network.

* * * * *